United States Patent
Yoneyama et al.

(10) Patent No.: US 7,758,956 B2
(45) Date of Patent: *Jul. 20, 2010

(54) ANTIREFLECTION FILM AND POLARIZING PLATE AND IMAGE DISPLAY DEVICE USING SAME

(75) Inventors: Hiroyuki Yoneyama, Minami-Ashigara (JP); Yasuhiro Okamoto, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/355,078

(22) Filed: Feb. 16, 2006

(65) Prior Publication Data
US 2006/0182945 A1    Aug. 17, 2006

(30) Foreign Application Priority Data
Feb. 16, 2005    (JP) ............................. 2005-039263

(51) Int. Cl.
*B32B 27/20*    (2006.01)
(52) U.S. Cl. .............. 428/319.3; 428/319.7; 428/319.9; 428/317.9; 359/586; 359/883
(58) Field of Classification Search .............. 428/319.3, 428/319.7, 317.9, 319.9; 359/883, 586
See application file for complete search history.

(56) References Cited

U.S. PATENT DOCUMENTS

| | | | | |
|---|---|---|---|---|
| 5,112,393 | A * | 5/1992 | Engel et al. | 106/2 |
| 2004/0156110 | A1 * | 8/2004 | Ikeyama | 359/603 |
| 2005/0181146 | A1 * | 8/2005 | Yoneyama et al. | 428/1.31 |
| 2006/0093786 | A1 * | 5/2006 | Ohashi et al. | 428/131 |
| 2006/0164740 | A1 * | 7/2006 | Sone et al. | 359/883 |

FOREIGN PATENT DOCUMENTS

| | | |
|---|---|---|
| JP | 6-3501 A | 1/1994 |
| JP | 7-48527 A | 2/1995 |
| JP | 2001-233611 A | 8/2001 |

OTHER PUBLICATIONS

Translation of JP 2001-233611, Nishida et al, "Silica-Based Microparticle, Method Producing Dispersion with the Same, and Base Material with Coating Film", Aug. 28, 2001.*

* cited by examiner

*Primary Examiner*—Hai Vo
(74) *Attorney, Agent, or Firm*—Buchanan Ingersoll & Rooney PC

(57) ABSTRACT

An antireflection film comprises: at least one layer containing fine pores; and an antistatic layer, wherein the antistatic layer and one of said at least one layer containing fine pores are the same or different; and wherein, when a surface of the antireflection film is brought into contact with water for 15 minutes, a wiped portion of the surface shows a chromaticity change, ΔE, of 0.45 or less in the CIE 1976 L*a*b* color space measured under a standard illuminant D65.

10 Claims, No Drawings

ANTIREFLECTION FILM AND POLARIZING PLATE AND IMAGE DISPLAY DEVICE USING SAME

BACKGROUND OF THE INVENTION

1. Field of the Invention

The present invention relates to an antireflection film, a polarizing plate and an image display device.

2. Description of the Related Art

Antireflection film is generally disposed in an image display device such as cathode ray tube display device (CRT), plasma display panel (PDP), electroluminescence display (ELD) and liquid crystal display device (LCD) on the outermost surface of the display device where the reflectance is reduced by using the principle of optical interference so as to prevent reflection of external light which causes reduction in the contrast or reflection of an image.

Such antireflection film can be prepared by forming a low refractive index layer having a suitable thickness on the outermost surface of a support and, in some cases, a high refractive index layer, a middle refractive index layer or a hard coat layer between the support and the low refractive index layer. In order to realize a low refractive index, a material having a refractive index as low as possible is desired as a material for the low refractive index layer. Also, since the antireflection film is used on the outermost surface, it is expected to also function as a protective film for a display device. Further, the antireflection film is required to resist adhesion of stain or dust and, even when suffered adhesion, permit easy removal thereof, and have a strong scratch resistance under any storage condition.

In order to reduce refractive index of a material, there are, for example, a technique of introducing a fluorine atom-containing organic group into a binder and a technique of reducing density of the layer (introducing voids). In the case of introducing a fluorine atom-containing organic group into the binder, there arises a tendency that cohesive force of the binder itself is decreased and, in order to compensate for the decrease of cohesive force, it becomes necessary to introduce a binding group. Thus, there exist a practical limit as to reduction of refractive index, and it has been difficult to reduce it to a level of 1.40 or less. On the other hand, a technique of reducing the refractive index by introducing microvoids into the low refractive index layer enables to attain a refractive index less than 1.40. This technique, however, has such defects as that film strength of the layer is weak and that stains such as fingerprints or oil easily invade thereinto.

For example, JP-A-6-3501 discloses low refractive index layers wherein fine pores are formed in a binder. Also, JP-A-7-48527 discloses a technique of reducing refractive index by using porous silica.

Further, JP-A-2001-233611 discloses an antireflection film containing hollow silica particles in a low refractive index layer.

However, all of the techniques described in JP-A-6-3501 and JP-A-7-48527 are not practically satisfactory in the points of film strength and resistance to fingerprint stain. Also, antireflection films using these materials have been found to have a tendency of suffering reduction in film strength under ozone exposure which simulates long-term use in a usual room.

Also, although antireflection films containing hollow silica particles in a low refractive index layer as described in JP-A-2001-233611 truly have improved scratch resistance and resistance to adhesion of stains such as fingerprints in comparison with conventional antireflection films, there have been found problems that the film is destroyed by saponification upon preparation of a polarizing plate and that, when water drops newly deposit thereon, their traces remain.

SUMMARY OF THE INVENTION

Since an antireflection film is used on the outermost surface of a display, water drops can deposit thereon in daily use of the display. Hence, in view of imparting practical durability, it is necessary to improve so that no trances of such water drops remain.

Also, it has been found that, when an antistatic layer is provided in order to improve removability of dust, traces of water deposition become worse and that reduction in film strength after exposure to ozone increases.

An object of the invention is to provide an antireflection film which has a low reflectance, which difficultly leaves traces of water deposition, and which has excellent dust removability, scratch resistance and ozone resistance and, further, to provide a polarizing film or a image display device using such antireflection film.

As a result of intensive investigations, the inventor has found that the above-mentioned problems can be solved by the antireflection film of the following constitution, a polarizing plate, and an image display device using the same.

(1) An antireflection film comprising: at least one layer containing fine pores; and an antistatic layer, wherein the antistatic layer and one of said at least one layer containing fine pores are the same or different; and wherein, when a surface of the antireflection film is brought into contact with water for 15 minutes, a wiped portion of the surface shows a chromaticity change, $\Delta E$, of 0.45 or less in the CIE 1976 $L^*a^*b^*$ color space measured under a standard illuminant D65.

(2) The antireflection film as described in (1) above, wherein at least one of said at least one layer containing fine pores comprises at least one kind of porous or hollow inorganic fine particles.

(3) The antireflection film as described in (2) above, wherein at least one of said at least one kind of porous or hollow inorganic fine particles has an adsorbed water amount of 6.1% by weight or less and has a particle size of from 5 to 100 nm.

(4) The antireflection film as described in (2) or (3) above, wherein the porous or hollow inorganic fine particles comprises hollow silica fine particles having a refractive index of 1.40 or less.

(5) The antireflection film as described in any one of items (2) to (4), wherein the porous or hollow inorganic fine particles have surfaces covered with an electrically conductive compound.

(6) The antireflection film as described in any one of (1) to (5), which comprises a low refractive index layer, wherein the low refractive index layer and one of said at least one layer containing fine pores are same or different; and the low refractive index layer comprises a component having at least one of a fluoroalkyl moiety and a dialkylsiloxane moiety.

(7) A polarizing plate comprising: a polarizing film; and a protective film, wherein the protective film is the antireflection film described in any one of (1) to (6).

(8) An image display device comprising the antireflection film described in any one of (1) to (6) above or a polarizing plate described in (7) above.

DETAILED DESCRIPTION OF THE INVENTION

The invention will be described in detail below. Additionally, in this specification, in the case where numerical values represent physical values or characteristic values, "(numerical value 1) to (numerical value 2)" means "from (numerical value 1) to (numerical value 2) inclusive". Also, the term "polymerization" as used herein in the invention means to include copolymerization. Further, the phrase "on a support" or "on an orienting film" means to include both the case of direct surface of the support or the orienting film and the case where the surface is a surface of some layer (film) provided on the support or the like.

<Antireflection Film>

The antireflection film of the invention is characterized in that, when the surface of the side having an antireflective layer is brought into contact with water for 15 minutes, the wiped portion thereof shows a chromaticity change, $\Delta E$, of 0.45 or less in the CIE 1976 L*a*b* color space measured under the standard illuminant D65. To achieve $\Delta E$ of 0.45 or less, the characteristics of the layer containing fine pores can be arbitrarily controlled, and preferably, the amount of adsorbed water on pore-containing fine particles and the content of the pore-containing fine particles are controlled as described later.

(Evaluation of Traces of Deposited Water Droplets)

Specifically, water droplet traces were evaluated in the following manner.

A sample of antireflection film or polarizing plate or the outermost surface of the image display device on the antireflection film side was horizontally placed. Subsequently, the sample was left for 30 minutes or longer at 25° C. and 55% RH, and then 2.0 mL of deionized water was dropwise applied thereonto in about 2 seconds using a pipette (manufactured by Eppendorf Co.). The water droplet was spread to a circle of about 1.5 to 2.5 cm in diameter though the spreading degree varies depending upon the properties of the surface of individual antireflection film. After leaving for 15 minutes, the water droplet was wiped off with "BEMCOT" (manufactured by Asahi Kasei Fibers Corp.). A reflection spectrum of the antireflection film was measured before and after dropwise application of the water droplet. In the measurement, chromaticity change ($\Delta E$) in the CIE 1976 L*a*b* color space under the standard illuminant D65 was determined by using a spectrophotometer of "Model V-550UV/Vis" manufactured by Nihon Bunko K.K.

As to $\Delta E$, a smaller value is more preferred, and $\Delta E$ is required to be 0.45 or less, more preferably 0.35 or less, still more preferably 0.20 or less, most preferably 0.10 or less. Functional tests on a plurality of subjects revealed that, when $\Delta E$ was 0.60 or more, traces of water droplets could sufficiently be recognized and, when $\Delta E$ exceeded 1.0, they recognized it as a trouble.

[Introduction of Fine Pores into an Antireflection Film-Constituting Layer]

In the invention, it is preferred to introduce fine pores into a layer in order to adjust mainly the refractive index of the layer having an antireflective function (antireflective layer) in the antireflection film. The method for the introduction is not particularly limited, and there can be illustrated, for example, a method of generating bubbles in the layer and curing the layer-forming binder to thereby fix the bubbles; a method of introducing particles into the layer and utilizing voids formed between the stacked particles; a method of introducing porous fine particles into the layer; and a method of introducing hollow fine particles. From the standpoint of production stability, a method of introducing porous fine particles into the layer and a method of introducing hollow fine particles are preferred.

The fine pores are introduced particularly preferably into a low refractive index layer. Reduction of reflectance can be attained by decreasing refractive index by the fine pores. Also, in the invention, the fine pores may be introduced into a layer other than the low refractive index layer, such as a middle refractive index layer, an antistatic layer, a hard coat layer or a glare-reducing layer to thereby adjust refractive index and reduce reflectance and uneven interference.

The amount of fine pores to be introduced into the low refractive index layer is preferably from 1 to 80% by volume, more preferably from 5 to 60% by volume, most preferably from 10 to 50% by volume. A larger introduction amount of pores leads to a larger reduction in refractive index. As long as the introduction amount is smaller than the upper limit, there arise no inconveniences such as reduction in film strength, thus such a large introduction amount being preferred. In the case when the fine pores are used in a layer other than the low refractive index layer, the introduction amount is not particularly limited as long as it is an amount necessary for adjusting refractive index, and is preferably from 1 to 80% by volume, more preferably from 1 to 50% by volume.

[Porous or Hollow Fine Particles]

(Void Ratio of Hollow Fine Particles)

With hollow fine particles, the void ratio x is represented by the following numerical formula (1):

$$x=(r_i/r_o)^3 \times 100 \, (\%) \quad (1)$$

wherein $r_i$ represents a radius of hollow space within the particle, and $r_o$ represents a radius of outer shell of the particle.

The void ratio of the above-mentioned hollow particles is preferably from 10 to 80%, more preferably from 20 to 60%, most preferably from 30 to 60%. From the standpoint of realizing a low refractive index and maintaining durability of the particles, it is preferred to adjust the void ratio of the hollow fine particles within the above-mentioned range.

There are no limits as to structure and kind of the porous or hollow fine particles (hereinafter also inclusively referred to as pore-containing fine particles) upon use thereof, and porous or hollow inorganic fine particles or organic fine particles are preferred, with hollow organic polymer or inorganic fine particles being more preferred. With the inorganic fine particles, fine particles containing aluminum oxide, silicon oxide or tin oxide as a major component are preferred. In particular, hollow silica fine particles are preferred in view of giving a low refractive index, imparting film strength and reducing traces of water droplet deposition.

[Preparation of Pore-Containing Fine Particles]

A preferred process for producing hollow fine particles is described below.

A first step is formation of core particles which can be removed by after-treatment, a second step is formation of a shell layer, a third step is dissolution of the core particles and, if necessary, a forth step is formation of an additional shell phase. Specifically, hollow particles can be produced according to the process for producing hollow silica fine particles described in, for example, JP-A-2001-233611.

A preferred process for producing porous particles is a process which comprises a first step of producing core particles by controlling the degree of hydrolysis or condensation of alkoxide and controlling the kind and the amount of coexisting substances, and a second step of forming a shell layer on the surface of each core particle. Specifically, the porous particles can be produced according to processes described in, for example, JP-A-2003-327424, JP-A-2003-335515, JP-A-2003-226516 and JP-A-2003-238140.

In the invention, it is preferred to reduce the amount of water adsorbed on inorganic fine particles which is described below. The adsorption amount can be controlled by changing the particle size and shell thickness and properly selecting conditions for hydrothermal treatment. Also, the amount of adsorbed water can be reduced by baking the particles.

(Covered Particle)

By thickening the shell thickness, the absorption site of the particle surface can be reduced to preferably lower the amount of water absorption. Additionally, when the shell is formed with an electrically conductive substance, electrical conductivity also can be preferably imparted to the particle. Is particularly preferred a case where silica porous or hollow particles are used as core particles and at least any of $ZnO_2$, $Y_2O_3$, $Sb_2O_5$, ATO, ITO and $SnO_2$ is used as the shell. Among them, antimony oxide is preferably combined. Antimony oxide-coated silica fine particles, which are particularly preferable, will be described below.

The antimony oxide-coated silica fine particle according to the present invention has such a construction that a porous silica fine particle or a silica fine particle having a hollow space therein is covered with an antimony oxide coating layer.

The foregoing porous silica fine particle comprises a porous silica fine particle and a composite oxide fine particle mainly comprising silica. Can be preferably used a composite oxide fine particle of a nanometer size having a low refractive index wherein a porous inorganic oxide fine particle is coated on its surface with, e.g., silica as disclosed in JP-A-7-133105.

As the silica fine particle having a hollow space therein, also can be preferably used a silica fine particle of a nanometer size having a low refractive index, which is composed of silica and an inorganic oxide other than silica and has a hollow space inside of the particle, as disclosed in JP-A-2001-233611.

Such a silica porous fine particle or a silica fine particle having a hollow space inside of the particle preferably has an average particle diameter of 4 to 270 nm, more preferably 8 to 170 nm. When the silica fine particle has an average particle diameter of 4 nm or more, the silica fine particle can be obtained without causing any problem during the production. The resulting particle is sufficiently stable and the problem wherein a monodisperse antimony oxide-coated silica fine particle cannot be obtained, which can occur in using a small sized-particle, is not caused. While, when the silica fine particle has an average particle diameter of 270 nm or less, the resulting antimony oxide-coated silica fine particle can have a suppressed average particle diameter of 300 nm or less. Thus, problems of decreased transparency and elevated haze, which can occur when a transparent film is formed using a large-sized antimony oxide-coated silica fine particle, can be preferably avoided.

The foregoing silica porous fine particle or silica fine particle having a hollow space inside of the particle preferably has a refractive index of 1.45 or less which is the refractive index of silica, more preferably 1.40 or less. Although a nonporous silica fine particle having a refractive index of 1.45 to 1.46 can be singly used, a silica porous fine particle or a silica fine particle having a hollow space inside of the particle is preferably used in view of an antireflection performance.

The foregoing silica fine particle is preferably coated with antimony oxide at an average thickness of the coating layer of 0.5 to 30 nm, preferably 1 to 10 nm. When the average thickness of the coating layer is 0.5 nm or more, preferably the silica fine particle can be completed covered and also the resulting antimony oxide-coated silica fine particle is to have a sufficient electrical conductivity. When the thickness of the coating layer is 30 nm or less, an improvement effect in electrical conductivity can be sufficiently obtained. Namely, a problem of an insufficient refractive index in a case where an antimony oxide-coated silica fine particle has a small average particle diameter can be preferably suppressed.

The antimony oxide-coated silica fine particle according to the present invention preferably has an average particle diameter of 5 to 300 nm, more preferably 10 to 200 nm. When the antimony oxide-coated silica fine particle has an average particle diameter of 5 nm or more, preferably the silica fine particle can be obtained without causing any problem during the production and the particle obtained is prevented from aggregation. Additionally, can be preferably eliminated problems of insufficient transparency, coating strength and adhesion with a substrate, and undesirable haze, which are caused by an insufficient dispersibility of a small particle when it is used for forming a transparent film. While, when the antimony oxide-coated silica fine particle has an average particle diameter of 300 nm or less, a formed transparent film preferably has sufficient transparency and suppressed haze. Further, adhesion with a substrate cannot be insufficient.

The antimony oxide-coated silica fine particle preferably has a refractive index of 1.35 to 1.60, more preferably 1.35 to 1.50. When the refractive index is 1.35 or more, the silica fine particle can be preferably obtained without causing any problem during the production. Further, the resulting particle has sufficient strength. While when the refractive index is 1.60 or less, a transparent film to be obtained preferably has sufficient antireflection performance.

The antimony oxide-coated silica fine particle preferably has a volume resistance value of 10 to 5000 $\Omega$/cm, preferably 10 to 2000 $\Omega$/cm. When the volume resistance value is 10 $\Omega$/cm or more, the silica fine particle preferably can be obtained without causing any problem during the production. The resulting particle has a refractive index of 1.6 or less, which can preferably provide a transparent film having sufficient antireflection performance. While, when the volume resistance value of 5000 $\Omega$/cm or less, the resulting transparent film preferably has sufficient antistatic performance.

The antimony oxide-coated silica fine particle according to the present invention can be optionally surface-treated according to a conventional method using a silane coupling agent.

(Measurement of the Amount of Adsorbed Water on Pore-Containing Fine Particles)

In the invention, the amount of adsorbed water on pore-containing particles can be determined according to the following measuring method.

Powder of the particles was dried for 1 hour under the conditions of 20° C. and about 1 hPa using a rotary pump. Thereafter, the powder was stored for 1 hour at 20° C. and 55% RH. About 10 mg of the dried sample was weighed in a platinum cell using DTG-50 manufactured by Shimazu K.K., and heated from 20° C. to 950° C. at a heating rate of 20° C./minute. The amount of adsorbed water was calculated in terms of percentage of weight loss upon heating to 200° C., according to the following numerical formula (2):

Amount of adsorbed water (%)=100×($W_{20}$−$W_{200}$)/$W_{200}$ wherein

W$_{20}$: initial weight upon initiation of heating

W$_{200}$: weight at the point of heating to 200C.

Additionally, when the particles are in a dispersion form, the solvent is distilled off in an evaporator (at 25° C.; pressure being reduced to 10 hPa), and the residue is ground into powder in an agate-made mortar, followed by measuring and determining the amount of adsorbed water in the above-mentioned manner.

In the invention, the amount of adsorbed water is preferably 6.1% by weight or less, more preferably 5.5% by weight or less, most preferably 5.0% by weight or less.

In the case where a plurality of particles different in particle size or preparation condition are incorporated in the layer, it suffices that at least one kind of the particles have the amount of adsorbed water of 6.1% by weight or less. However, the proportion of particles of 6.1% by weight or less in the amount of adsorbed water is preferably 30% by weight or more, more preferably 50% by weight or more, still more preferably 70% by weight or more, based on the total particles. As long as the amount of adsorbed water is within the above-mentioned range, traces of adhered water droplets can be reduced, and film strength after exposure to ozone can be improved.

(Measurement of Particle Size of Pore-Containing Fine Particles)

The particle size of the pore-containing fine particles to be used in the invention was determined by observing the particles under a transmission type microscope and calculating the equivalent circle diameter through averaging 1000 diameters. The diameter is preferably from 5 to 100 nm, more preferably from 20 to 100 nm, most preferably from 45 to 80 nm. When the particle size is equal to or more than the lower limit, there arise no problems such as an increase in refractive index and an increase in the amount of adsorbed water, thus such size being preferred, whereas, when the particle size is equal to or less than the upper limit, there arise no inconveniences such as an increase in light scattering at the coat film upon constitution of the antireflection film, thus such size being preferred.

In the invention, the pore-containing fine particles may have a size distribution, with its coefficient of variation being preferably from 60% to 5%, more preferably from 50% to 10%. It is also possible to mix 2, 3 or more kinds of particles different from each other in the average particle size to use.

(Measurement of Refractive Index of Pore-Containing Fine Particles)

With pore-containing fine particles containing silica as a major component, the refractive index of the pore-containing fine particles to be preferably used in the invention is preferably 1.40 or less, more preferably from 1.15 to 1.40, still more preferably from 1.15 to 1.35, most preferably from 1.18 to 1.30

Also, with pore-containing fine particles containing tin oxide, indium oxide, titanium oxide, zinc oxide or zirconium oxide as a major component, the refractive index of the pore-containing fine particles is preferably from 1.50 to 2.10, more preferably from 1.60 to 1.90.

The refractive index of particles can be determined in the following manner.

(1) Preparation of a Matrix-Forming Component Solution

A mixed solution of 55 g of tetraethoxysilane (TEOS) (concentration of SiO2: 28% by weight), 200 g of ethanol, 1.4 g of concentrated nitric acid and 34 g of water was stirred at room temperature for 5 hours. The concentration in terms of SiO$_2$ was adjusted to 5% by weight by adjusting the amount of ethanol, thus a solution (M-1) containing a matrix-forming component being prepared.

(2) Preparation of a Coat Film

A coating solution for measuring refractive index was prepared by mixing the matrix-forming component solution (M-1) and the pore-containing fine particles so that the weight ratio in terms of oxides [matrix (SiO$_2$):pore-forming fine particles (MO$_x$+SiO$_2$)] became 100:0, 90:10, 80:20, 60:40, 50:50 or 25:75. Here, other inorganic compounds than silica were represented by MO$_x$. Each of the coating solutions was spin coated at 300 rpm on a silicon wafer whose surface was kept at 50° C., then heat-treated at 160° C. for 30 minutes. Thereafter, the refractive index of the coat film thus formed for measuring the refractive index was measured by means of an ellipsometer.

(Calculation of Refractive Index)

Subsequently, the thus-obtained refractive index values and particles-mixing ratio [particles (MO$_x$+SiO$_2$)/{particles (MO$_x$+SiO$_2$)+matrix (SiO$_2$)}] were plotted, and the refractive index at 100% particles was determined by extrapolation. When the ratio of the pore-containing fine particles is too large, the refractive index of the coat film can be reduced in some cases due to formation of voids in the coat film to be measured. Hence, data on samples containing the pore-containing fine particles in a high ratio and standing out of amount dependence were eliminated.

[Method for Surface-Treating Pore-Containing Fine Particles]

Next, the method for treating the surface of the pore-containing fine particles is described below taking porous or hollow inorganic fine particles as an example.

In order to improve dispersibility of inorganic fine particles into a low refractive index layer-forming binder containing a component having a fluoroalkyl moiety and/or a dimethylsiloxane moiety to be described hereinafter, the surface of the inorganic fine particles is preferably treated with a hydrolysate and/or a partial condensate of an organosilane represented by the following general formula (1). It is more preferred to use, upon the treatment, either or both of an acid catalyst and a metal chelate compound.

(Organosilane Compounds)

The organosilane compounds to be used in the invention will be described in detail below.

$(R^{10})_{a1}$—Si$(X^{11})_{4-a1}$ <span style="float:right">General formula (1):</span>

In the general formula (1), R$^{10}$ represents a substituted or unsubstituted alkyl group or a substituted or unsubstituted aryl group. Examples of the alkyl group include a methyl group, an ethyl group, a propyl group, an i-propyl group, a hexyl group, a t-butyl group, a s-butul group, a hexyl group, a decyl group and a hexadecyl group. The alkyl group contains preferably from 1 to 30 carbon atoms, more preferably from 1 to 16 carbon atoms, particularly preferably from 1 to 6 carbon atoms. Examples of the aryl group include a phenyl group and a naphthyl group, with a phenyl group being preferred.

X$^{11}$ represents a hydroxyl group or a hydrolyzable group. Examples of the hydrolyzable group include an alkoxy group (containing preferably from 1 to 5 carbon atoms and being exemplified by a methoxy group and an ethoxy group), a halogen atom (e.g., Cl, Br or I) and a group represented by R$^{12}$COO (wherein R$^{12}$ preferably represents a hydrogen atom or an alkyl group containing from 1 to 5 carbon atoms and which is exemplified by CH$_3$COO and C$_2$H$_5$COO). Of these, an alkoxy group is preferred, with a methoxy group or an ethoxy group being particularly preferred.

a1 represents an integer of from 1 to 3, preferably 1 or 2, particularly preferably 1. When plural $R^{10}$s or $X^{11}$s exist, plural $R^{10}$s or $X^{11}$s may be different from each other.

Substituents to be contained in $R^{10}$ are not particularly limited, and examples thereof include a halogen atom (e.g., a fluorine atom, a chlorine atom or a bromine atom), a hydroxyl group, a mercapto group, a carboxy group, an epoxy group, an alkyl group (e.g., a methyl group, an ethyl group, an i-propyl group, a propyl group or a t-butyl group), an aryl group (e.g., a phenyl group or a naphthyl group), an aromatic hetero ring group (a furyl group, a pyrazolyl group or a pyridyl group), an alkoxy group (e.g., a methoxy group, an ethoxy group, an i-propoxy group or a hexyloxy group), an aryloxy group (e.g., a phenoxy group), an alkylthio group (e.g., a methylthio group or an ethylthio group), an arylthio group (e.g., a phenylthio group), an alkenyl group (e.g., a vinyl group or a 1-propenyl group), an acyloxy group (e.g., an acetoxy group, an acryloyloxy group or a methacryloyloxy group), an alkoxycarbonyl group (e.g., a methoxycarbonyl group or an ethoxycarbonyl group), an aryloxycarbonyl group (e.g., a phenoxycarbonyl group), a carbamoyl group (e.g., a carbamoyl group, an N-methylcarbamoyl group, an N,N-dimethylcarbamoyl group or an N-methyl-N-octylcarbamoyl group), and an acylamino group (e.g., an acetylamino group, a benzoylamino group, an acrylamino group or a methacrylamino group). These substituents may further be substituted. Additionally, in this specification, even when that which substitutes the hydrogen atom is a single atom, it is referred to as a substituent for the sake of convenience.

When a plurality of $R^{10}$s exist, at least one of them is preferably a substituted alkyl group or a substituted aryl group. In particular, the substituted alkyl group or the substituted aryl group preferably further has a vinyl-polymerizable group. In this case, compounds represented by the general formula (1) can be represented as organosilane compounds of the following general formula (1-2) having a vinyl-polymerizable substituent.

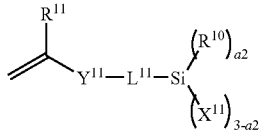

General formula (1-2)

In the general formula (1-2), $R^{11}$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. As $R^{11}$, a hydrogen atom, a methyl group, a methoxy group, a methoxycarbonyl group, a cyano group, a fluorine atom and a chlorine atom are preferred, and a hydrogen atom, a methyl group, a methoxycarbonyl group, a fluorine atom and a chlorine atom are more preferred, with a hydrogen atom and a methyl group being particularly preferred.

$Y^{11}$ represents a single bond, an ester group, an amido group, an ether group or a urea group. Of these, a single bond, an ester group and an amido group are preferred, a single bond and an ester group are more preferred, and an ester group is particularly preferred.

$L^{11}$ represents a divalent linking group, specifically, a substituted or unsubstituted alkylene group, a substituted or unsubstituted arylene group, a substituted or unsubstituted alkylene group having a linking group (e.g., an ether group, an ester group or an amido group) within it or a substituted or unsubstituted arylene group having a linking group within it. Of these, a substituted or unsubstituted alkylene group containing from 2 to 10 carbon atoms, a substituted or unsubstituted arylene group containing from 6 to 20 carbon atoms, and an alkylene group containing from 3 to 10 carbon atoms and having a linking group within it are preferred, an unsubstituted alkylene group, an unsubstituted arylene group and an alkylene group having an ether linking group or an ester linking group within it are more preferred, and an unsubstituted alkylene group, and an alkylene group having an ether linking group or an ester linking group within it are particularly preferred. Examples of the substituent include a halogen, a hydroxyl group, a mercapto group, a carboxyl group, an epoxy group, an alkyl group and an aryl group. These substituents may further be substituted.

a2 represents 0 or 1. When a plurality of $X^{11}$s exist, the plural $X^{11}$s may be the same or different from each other. a2 preferably represents 0.

$R^{10}$ is the same as $R^{10}$ in the foregoing general formula (1), and preferably represents a substituted or unsubstituted alkyl group or an unsubstituted aryl group, with an unsubstituted alkyl group or an unsubstituted aryl group being more preferred. $X^{11}$ is also the same as $X^{11}$ in the general formula (1), and preferably represents a halogen, a hydroxyl group or an unsubstituted alkoxy group, more preferably represents chlorine, a hydroxyl group or an unsubstituted alkoxy group containing from 1 to 6 carbon atoms, still more preferably represents a hydroxyl group or an alkoxy group containing from 1 to 3 carbon atoms, and particularly preferably represents a methoxy group.

As the organosilane compounds to be used in the invention, those which are represented by the following general formula (2) are also preferred.

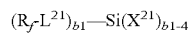

General formula (2):
$(R_f\text{-}L^{21})_{b1}\text{—Si}(X^{21})_{b1\text{-}4}$

In the above general formula (2), $R_f$ represents a straight, branched or cyclic, fluorine-containing alkyl group containing from 1 to 20 carbon atoms or a fluorine-containing aromatic group containing from 6 to 14 carbon atoms. $R_f$ preferably represents a straight, branched or cyclic fluoroalkyl group containing from 3 to 10 carbon atoms, and more preferably represents a straight fluoroalkyl group containing from 4 to 8 carbon atoms. $L^{21}$ represents a divalent linking group containing 10 or less carbon atoms, preferably an alkylene group containing from 1 to 10 carbon atoms, and more preferably represents an alkylene group containing from 1 to 5 carbon atoms. The alkylene group is a straight or branched, substituted or unsubstituted alkylene group optionally having a linking group (e.g., ether, ester or amido) within it. The alkylene group may have a substituent, and preferred examples of such substituent include a halogen atom, a hydroxyl group, a mercapto group, a carboxyl group, an epoxy group, an alkyl group and an aryl group. $X^{21}$ is the same as $X^{11}$ in the general formula (1), and preferably represents a halogen, a hydroxyl group or an unsubstituted alkoxy group, more preferably represents chlorine, a hydroxyl group or an unsubstituted alkoxy group containing from 1 to 6 carbon atoms, still more preferably represents a hydroxyl group or an alkoxy group containing from 1 to 3 carbon atoms, and particularly preferably represents a methoxy group.

b1 is the same as a1 in the foregoing general formula (1), and represents an integer of from 1 to 3, preferably 1 or 2, particularly preferably 1.

Of the fluorine-containing silane coupling agents represented by the general formula (2), the fluorine-containing silane coupling agents represented by the following general formula (2-1) are preferred.

  General formula (2-1):

In the above general formula (2-1), n represents an integer of from 1 to 10, and m represents an integer of from 1 to 5. n preferably represents an integer of from 4 to 10, and m preferably represents an integer of from 1 to 3. $X^{22}$ represents a methoxy group, an ethoxy group or a chlorine atom.

Compounds represented by the general formulae (1), (1-2), (2) and (2-1) may be used in combination of two or more thereof.

Specific examples of the compounds represented by the general formulae (1), (1-2), (2) and (2-1) are shown below which, however, are not to be construed as limiting the invention in any way.

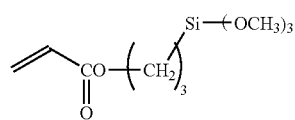 M-1

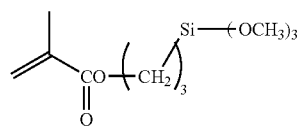 M-2

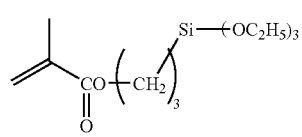 M-3

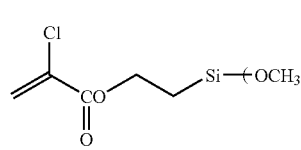 M-4

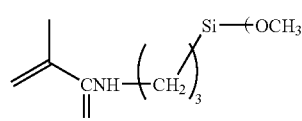 M-5

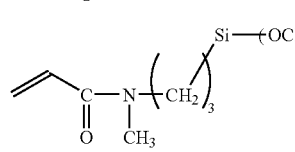 M-6

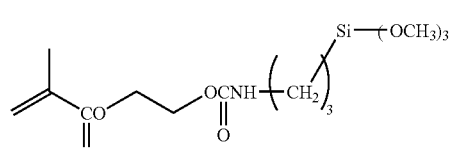 M-7

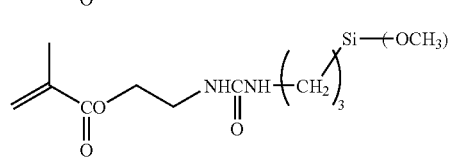 M-8

-continued

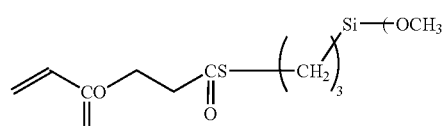 M-9

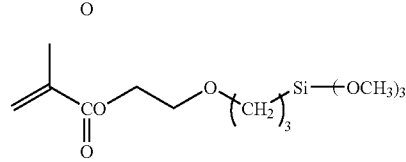 M-10

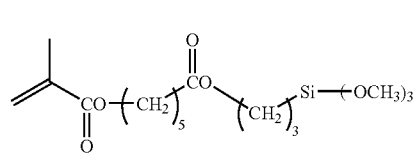 M-11

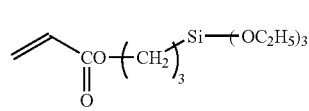 M-12

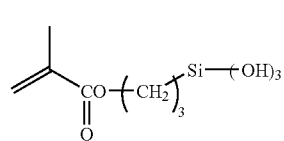 M-13

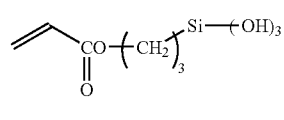 M-14

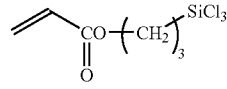 M-15

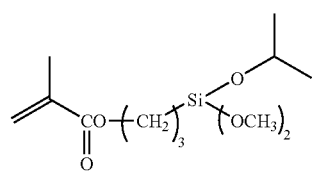 M-16

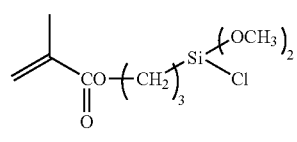 M-17

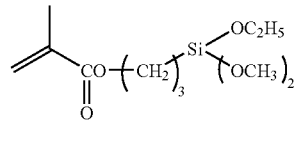 M-18

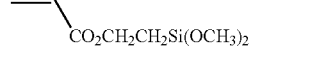 M-19

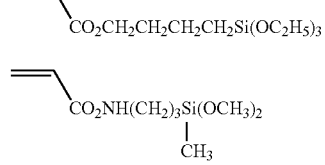 M-20

 M-21

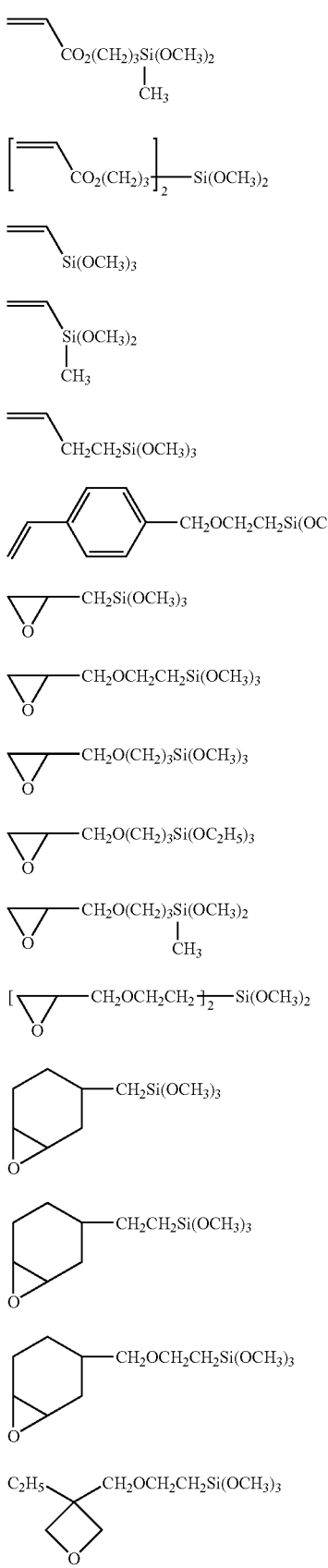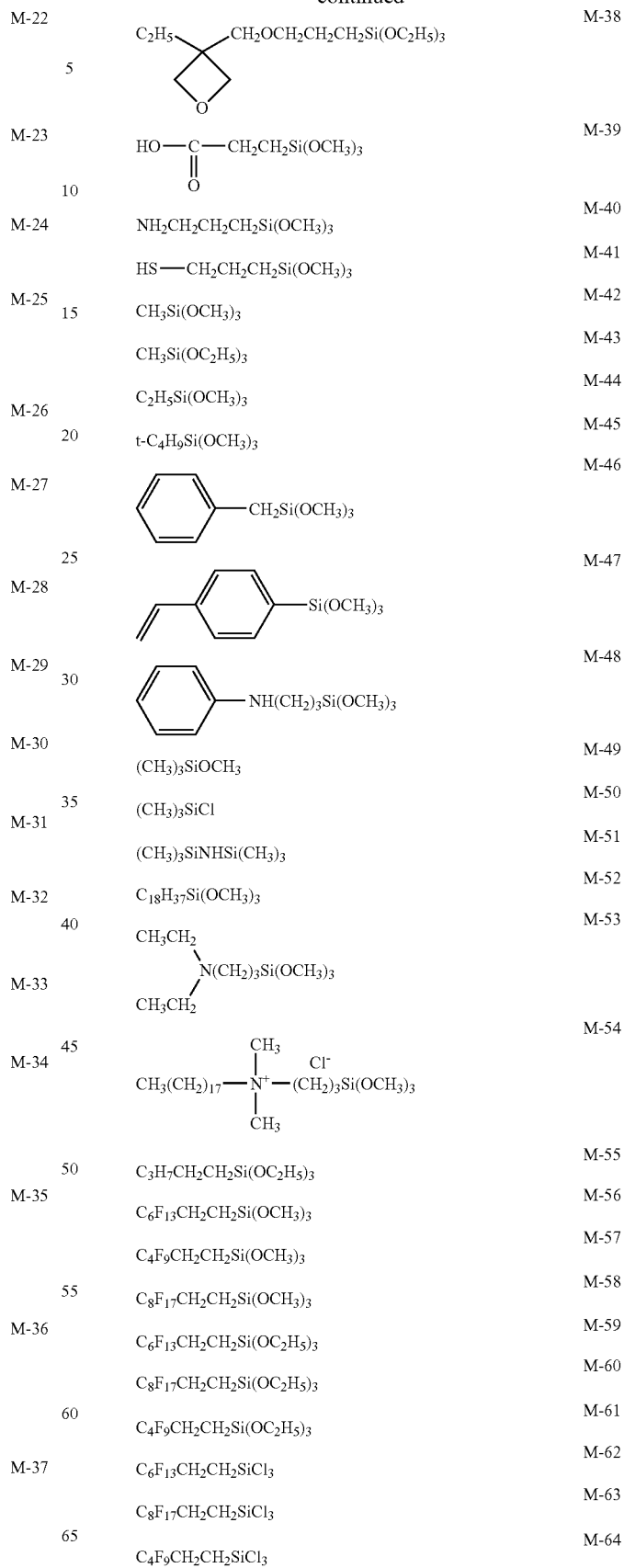

-continued $C_6F_{13}CH_2CH_2Si(OCH_3)_2CH_3$ M-65

$C_6F_{13}CH_2CH_2CH_2Si(OCH_3)_3$ M-66

$C_4F_9CH_2CH_2CH_2Si(OCH_3)_3$ M-67

$C_8F_{17}CH_2CH_2CH_2CH_2Si(OCH_3)_3$ M-68

$C_6F_{13}CH_2Si(OC_2H_5)_3$ M-69

$C_8F_{17}CH_2CH_2Si(OC_4H_9)_3$ M-70

$C_4F_9CH_2CH_2CH_2Si(OCH_3)_3$ M-71

$C_6F_{13}CH_2CH_2Si(OCH_3)_2Br$ M-72

$C_8F_{17}CH_2CH_2CH_2Si(OCH_3)_2Cl$ M-73

$C_4F_9CH_2CH_2CH_2Si(CH_3)_2OCH_3$ M-74

$C_6F_{13}CH_2CH_2Si(OCH_3)Cl_2$ M-75

$(CF_3)_2CFCF_2CF_2CH_2CH_2Si(OCH_3)_3$ M-76

$(C_4F_9)_2CFCH_2CH_2Si(OCH_3)_3$ M-77

$(C_6F_{13})_2CFCH_2CH_2Si(OCH_3)_3$ M-78

$(CF_3)_3CCF_2CH_2CH_2Si(OCH_3)_3$ M-79

$(C_4F_9)_3CCH_2CH_2Si(OCH_3)_3$ M-80

$(CF_3)_2CFOCH_2CH_2CH_2Si(OC_2H_5)_3$ M-81

$(CF_3)_2CFOCH_2CH_2CH_2SiCl_3$ M-82

$H(CF_2)_6CH_2Si(OCH_3)_3$ M-83

$H(CF_2)_4CH_2Si(OCH_3)_3$ M-84

$H(CF_2)_6CH_2Si(OCH_3)_3$ M-85

[pentafluorophenyl structure with $-CH_2CH_2CH_2Si(OCH_3)_3$] M-86

[pentafluorophenyl structure with $-CH_2CH_2CH_2SiCl_3$] M-87

[perfluorocyclohexyl structure with $-CH_2CH_2CH_2Si(OCH_3)_3$] M-88

A disiloxane compound also can be used as a surface treating agent. Examples of the compound include hexamethyl disiloxane, 1,3-dibutyltetramethyl disiloxane, 1,3-diphenyltetramethyl disiloxane, 1,3-divinyltetramethyl disiloxane, hexaethyl disiloxane, and 3-glycidexypropylpentamethyl disiloxane.

Of these specific examples, (M-1), (M-2), (M-30), (M-35), (M-49)), (M-51), (M-56) and (M-57) are particularly preferred. Also, compounds A, B and C described in Reference Examples in Japanese Patent 3474330 are excellent in dispersion stability, thus being preferred.

In the invention, the amount of the organosilane compound to be used which is represented by the foregoing general formula (1), (1-2), (2) or (2-1) is not particularly limited, but is preferably from 1 to 300% by weight, more preferably from 3 to 100% by weight, most preferably from 5 to 50% by weight, based on the weight of inorganic fine particles or, in terms of mol % based on the hydroxyl group on the surface of the inorganic fine particles, the amount is preferably from 1 to 300 mol %, more preferably from 5 to 300 mol %, most preferably from 10 to 200 mol %. When the amount of the organosilane compound is within the above-mentioned range, there can be obtained a sufficient effect of stabilizing the dispersion and an increased film strength upon formation of the coat film. In the invention, it is also preferred to use plural kinds of organosilane compounds in combination. Such plural compounds may be simultaneously added or may be added at different stages to react. Also, it is preferred to previously form a partial condensate of plural compounds before addition thereof, which serves to facilitate control of the reaction.

[Improvement of Dispersibility of Inorganic Fine Particles]

In the invention, dispersibility of the inorganic fine particles can be improved by acting a hydrolyzate or a partial condensate of the above-described organosilane compound on the surface of the inorganic fine particles. The hydrolysis/condensation reaction of the organosilane compound is preferably conducted by adding 0.3 to 2.0 moles, preferably 0.5 to 1.0 mole, of water per mole of the hydrolyzable group ($X^{11}$, $X^{21}$ and $X^{22}$) and stirring at 15 to 100° C. in the presence of a metal chelate compound.

[Catalyst for the Treatment of Improving Dispersiblity]

The treatment of improving dispersibility using the hydrolyzate and/or condensation reaction product of organosilane is preferably conducted in the presence of a catalyst. Examples of such catalyst include inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia; organic bases such as triethylamine and pyridine; and metal alkoxides such as triisopropoxyaluminum and tetrabutoxyzirconium. In view of production stability and storage stability of a liquid of the inorganic oxide fine particles, acid catalysts (inorganic acids and organic acids) and/or metal chelate compounds are used in the invention. Of the inorganic acids, hydrochloric acid and sulfuric acid are preferred and, of the organic acids, those which show an acid dissociation constant (pKa value (25° C.)) in water of 4.5 or less are preferred. Hydrochloric acid, sulfuric acid and organic acids showing an acid dissociation constant in water of 3.0 or less are more preferred. Organic acids showing an acid dissociation constant in water of 2.5 or less are more preferred. Methanesulfonic acid, oxalic acid, phthalic acid and malonic acid are still more preferred, with oxalic acid being particularly preferred.

In the case where the hydrolyzable group of organosilane is an alkoxy group and the acid catalyst is an organic acid, the addition amount of water can be reduced because carboxyl group or sulfo group of the organic acid can supply proton. The addition amount of water per mole of the alkoxide group of organosilane is from 0 to 2 moles, preferably from 0 to 1.5 moles, more preferably from 0 to 1 mole, particularly preferably from 0 to 0.5 mole. Also, when an alcohol is used as a solvent, an embodiment of substantially not adding water is also preferred.

(Metal Chelate Compounds)

In the invention, the metal chelate compound to be used for the treatment of improving dispersibility by using a hydrolyzate and/or a condensation reaction product of organoxilane is preferably at least one kind of metal chelate compound wherein an alcohol represented by the following general formula (3-1) and a compound represented by the following general formula (3-2) constitute ligands, with a metal selected from among Zr, Ti and Al being a central metal. As the metal chelate compound, those which contain a metal selected from among Zr, Ti and Al as a central metal can preferably be used with no particular limitations. Two or more kinds of metal chelate may be used in combination thereof as long as they fall within this category.

  General formula (3-1):

  General formula (3-2):

In the above formulae, $R^{31}$ and $R^{32}$ may be the same or different and each represents an alkyl group containing from 1 to 10 carbon atoms, and $R^{33}$ represents an alkyl group containing from 1 to 10 carbon atoms or an alkoxy group containing from 1 to 10 carbon atoms.

Specific examples of the metal chelate compound to be preferably used in the invention include zirconium chelate compounds such as tri-n-butoxyethylacetoacetate zirconium, ti-n-puboxybis(ethyl-acetoacetate)zirconium, n-butoxytris(ethylacetoactate) zirconium, tetrakis(n-propylacetoacetate) zirconium, tetrakis(acetylacetoacetate)zirconium and tetrakis(ethylacetoacetate)zirconium; titanium chelate compounds such as diisopropoxy-bis(acetylacetate)titanium and siisopropoxy-bis(acetylacetone)titanium; and aluminum chelate compounds such as siisopropoxyethylacetoacetate aluminum, diisopropoxyacetylacetonato)aluminum, isopropoxybis(ethylacetoacetate)aluminum, isopropoxybis(acetylacetonato)aluminum, tris(ethylacetoacetate)aluminum, tris(acetylacetonato)aluminum and monoacetylacetonato bis(ethyloacetoacetate)aluminum.

Of these metal chelate compounds, tri-n-butoxyethylacetoacetate zirconium, diisopropoxy-bis(acetylacetonato)titanium, diisopropoxyethylacetoacetate aluminum and tris8ethylacetoacetate)aluminum. These metal chelate compounds may be used independently or in combination of two or more thereof. A partial hydrolysis product of the metal chelate compound can also be used. The content of the metal chelate compound is preferably in the range of 0.1 to 10.0% by weight, more preferably 0.5 to 5.0% by weight, most preferably 1.0 to 3.0% by weight, based on the weight of the organosilane compound.

[Dispersing Agent]

In the invention, a dispersing agent may be used for dispersing the powder of the inorganic fine particles in a solvent to prepare a dispersion. In the invention, use of a dispersing agent having an anionic group is preferred.

As the anionic group, a group having an acidic proton such as a carboxyl group, a sulfonic acid group (sulfo), a phosphoric acid group (phosphono) or a sulfonamido group or the salt thereof is effective. In particular, a carboxyl group and a phosphoric acid group are particularly preferred. In order to further improve dispersibility, the dispersing agent may have a plurality of the anionic groups. The number of the anionic group is preferably 2 or more on the average, more preferably 5 or more, particularly preferably 10 or more. Plural kinds of the anionic groups may be contained in one molecule of the dispersing agent.

The dispersing agent may contain a cross-linkable or polymerizable functional group. Examples of the cross-linkable or polymerizable functional group include an ethylenically unsaturated group capable of undergoing addition reaction or polymerization reaction by a radical species (e.g., a (meth)acryloyl group, an allyl group, a styryl group or a vinyloxy group), a cation-polymerizable group (e.g., an epoxy group, an oxetanyl group or a vinyloxy group) and a group capable of undergoing polycondensation reaction (e.g., a hydrolyzable silyl group or an N-methylol group), with a functional group having an ethylenically unsaturated functional group being preferred.

The amount of the dispersing agent to be used is preferably from 0.5 to 30% by weight, more preferably from 1 to 20% by weight, most preferably from 2 to 15% by weight, based on the weight of the inorganic fine particles. When the dispersing agent is used in such range, dispersibility is improved with no demerits such as reduction of coat film strength, thus such amount being preferred.

[Low Refractive Index Layer]

The antireflection film of the invention contains a layer containing fine pores as a necessary layer constituting the antireflective layer, with the layer containing fine pores being preferably a low refractive index layer. Also, the low refractive index layer is preferably the outermost layer of the antireflective layer, that is, the outermost layer of the antireflection film.

In the case of introducing the fine pore-containing fine particles into the low refractive index layer, the content of the fine particles to be used is preferably from 5 to 90% by weight, more preferably from 10 to 80% by weight, most preferably from 25 to 65% by weight, based on the total weight of the low refractive index layer-constituting components. When the content of the fine pore-containing particles is equal to or less than the above-described upper limit, there arises no deterioration as to traces of deposited water droplets, thus such content being preferred.

[Materials for the Low Refractive Index Layer]

Materials to be preferably used in the low refractive index layer of the invention will be described below.

The low refractive index layer of the antireflection film according to the present invention is preferably formed by coating, drying and curing a curable composition containing the aforesaid pore-containing fine particles. As the binder, a curable compound is preferably used. For example, (1) a curable composition comprising a polymer having an alkyl fluoride moiety or (2) a monomer having two or more polymerizable or condensationable functional groups can be used.

The low refractive index layer in the invention is preferably formed by coating, drying and curing a curable composition containing the aforesaid pore-containing fine particles.

First, a polymer having an alkyl fluoride moiety of (1) will be described.

(Components Having a Fluoroalkyl Moiety)

In the invention, a polymer having a fluoroalkyl moiety described below is preferably used as a component of the curable composition in view of reducing the refractive index of the low refractive index layer and the refractive index of the antireflection film.

Examples of a fluorine-containing vinyl monomer for introducing the fluoroalkyl moiety include fluoroolefins (e.g., fluoroethylene, vinylidene fluoride, tetrafluoroethylene and hexafluoropropylene), partially or completely fluorinated alkyl ester derivatives of (meth)acrylic acid [e.g., Biscoat 6FM (manufactured by Osaka Yuki Kagaku Kogyo Co., Ltd.) and R-2020 (manufactured by Daikin Industries, Ltd.)] and completely or partially fluorinated vinyl ethers. Of these, perfluoroolefins are preferred and, in view of refractive index, solubility, transparency and availability, hexafluoropropylene is particularly preferred.

The refractive index can be reduced by increasing the composition ratio of the fluorine-containing vinyl monomer, with film strength tending to decrease. In the invention, it is preferred to introduce the fluorine-containing vinyl monomer so that the fluorine content of the resulting copolymer becomes from 20 to 60% by weight, more preferably from 25 to 55% by weight, particularly preferably from 30 to 50% by weight.

The polymer having a fluoroalkyl moiety preferably has a repeating unit having a (meth)acryloyl group in the side chain as a necessary constituent. The film strength can be improved by increasing the composition ratio of the repeating unit having a (meth)acryloyl group, with the refractive index tending to increase at the same time. The content of the repeating unit having a (emth)acryloyl group is preferably from 5 to 90% by weight, more preferably from 30 to 70% by weight, particularly preferably from 40 to 60% by weight, though depending upon the kind of the repeating unit derived from the fluorine-containing vinyl monomer.

In view of various points such as adhesion properties to a substrate, Tg (contributing to film hardness) of the resulting polymer, solubility into a solvent, transparency, sliding properties and dust- and stain-proof properties, the polymer having a fluoroalkyl moiety may contain as a comonomer appropriate other vinyl monomer than the repeating unit derived from the fluorine-containing vinyl monomer and the repeating unit having a (meth)acryloyl group in the side chain. Such vinyl monomers may be used in combination of two or more thereof according to the end use, and are introduced into the copolymer in a content of preferably from 0 to 65 mole %, more preferably from 0 to 40 mole %, particularly preferably from 0 to 30 mole %.

The vinyl monomer units to be used as the other monomers are not particularly limited, and can be exemplified by olefins (e.g., ethylene, propylene, isoprene, vinyl chloride and vinylidene chloride), acrylates (e.g., methyl acrylate, ethyl acrylate, 2-ethylhexyl acrylate and 2-hydroxyethyl acrylate), methacrylates (e.g., methyl methacrylate, ethyl methacrylate, butyl methacrylate and 2-hydroxyethyl methacrylate), styrene derivatrives (e.g., styrene, p-hydroxystyrene and p-methoxystyrene), vinyl ethers (e.g., methyl vinyl ether, ethyl vinyl ether, cyclohexyl vinyl ether, hydroxyethyl vinyl ether and hydroxybutyl vinyl ether), vinyl esters (e.g., vinyl acetate, vinyl propionate and vinyl cinnamate), unsaturated carboxylic acids (e.g., acrylic acid, methacrylic acid, crotonic acid, maleic acid and itaconic acid), acrylamides (e.g., N,N-dimethylacrylamide, N-t-butylacrylamide and N-cyclohexylacrylamide), methacrylamides (e.g., N,N-dimethylmethacrylamide) and acrylonitrile.

In the invention, compounds wherein a polysiloxane structure is introduced into the main chain or side chain of the polymer having an fluoroalkyl group are preferably used. A dialkylsiloxane structure is particularly preferred.

Method for introducing the polysiloxane structure into the main chain of the polymer is not particularly limited, and is exemplified by a method of using a polymer type initiator such as an azo group-containing polysiloxanamide (examples of commercially available products: VPS-0501 and 1001 (trade name; manufactured by Wako Jun-yaku Kogyo K.K.)) described in JP-A-6-93100; a method of introducing a reactive group (e.g., a mercapto group, a carboxyl group or a hydroxyl group) originated from a polymerization initiator or a chain transfer agent into the end of the polymer, and then reacting with a polysiloxane having a reactive group (e.g., an epoxy group or an isocyanato group) on one end or both ends thereof; and a method of copolymerizing a cyclic siloxane oligomer such as hexamethylcyclotrisiloxane through anionic ring-opening polymerization. Of these methods, a method of utilizing an initiator having a polysiloxane structure is easy and preferred.

A polymer having a polysiloxane structure in the side chain thereof can be synthesized by a method of introducing, into a polymer having a reactive group such as an epoxy group, a hydroxyl group, a carboxyl group or an acid anhydride group, a polysiloxane having a corresponding reactive group (e.g., an amino group, a mercapto group, a carboxyl group or a hydroxyl group for an epoxy group or an acid anhydride group) (e.g., SILAPLANE series manufactured by Chisso Corporation) on one end thereof through high polymer reaction as described in *J. Appl. Polym. Sci.* 2000, 78, 1955 and JP-A-56-28219; or by a method of polymerizing a polysiloxane-containing silicon macromer. Either method can preferably be employed. In the invention, a method of introducing by polymerization of a silicon macromer is more preferred.

The content of the polysiloxane moiety in the polymer is preferably from 0.01 to 20% by weight, more preferably from 0.1 to 10% by weight, particularly preferably from 0.5 to 5% by weight, based on the weight of the polymer.

In view of reducing the refractive index of the low refractive index layer and improving scratch resistance thereof, polymers represented by the general formulae 1 and 2 described in JP-A-2004-45462 are particularly preferred as the polymer having a fluoroalkyl moiety to be used in the invention. Specific examples thereof and process for synthesizing them are described in JP-A-2004-45462, paragraphs [0043] to [0053] and [0079] to [0082]. Other preferred polymers, those which are described in JP-A-2002-243907, JP-A-2003-26732, JP-A-2003-222702 and JP-A-2004-272198 can preferably be used.

Also, in the invention, the number-average molecular weight of the polymer which can bge incorporated in the low refractive index layer is preferably from 5,000 to 1,000,000, more preferably from 10,000 to 500,000, most preferably from 15,000 to 300,000. Use of plural kinds of the polymers different from each other in molecular weight is preferred in view of stabilizing the state of coated surface and film strength.

(2) A Monomer Having Two or More Polymerizable or Condensationable Functional Groups As the binder in the low refractive index layer of the antireflection film according to the present invention, also can be used a compound having two or more polymerizable or condensationable functional groups in one molecule thereof.

As materials for constituting the low refractive index layer, a curable composition containing the pore-containing fine particles to be preferably used in the invention and a film-forming binder to be described hereinafter {e.g., a monomer having two or more ethylenically unsaturated groups, in particular, an ester between a polyhydric alcohol and (meth)acrylic acid} can preferably be used as well. As the monomer having two or more ethylenically unsaturated groups, mention may be made of esters between a polyhydric alcohol and (meth)acrylic acid (e.g., ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri (meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclo hexane tetra (meth)acrylate, polyurethane polyacrylate, and polyester polyacrylate), ethylene oxide modified products of the foregoing esters, vinyl benzene and derivatives thereof (e.g., 1,4-divinyl benzene, 4-vinyl benzoic acid-2-acryloylethylester, and 1,4-divinylcyclohexanone), vinyl sulfones (e.g., divinyl sulfone), acrylamides (e.g., methylenebis acrylamide) and methacrylamide. These monomers can be used in any mixture of two or more thereof. These monomers can increase a density of a crosslinking group in a binder to be able to form a cured film having a high hardness. While, although the foregoing binder provides a layer having a refractive index which is not so low as compared with that obtainable in case of using a fluorine-containing polymer binder, the foregoing binder together with porous or pore-containing inorganic particles having a low refractive index can provide a sufficiently effective refractive index as the low refractive index layer according to the present invention.

In particular, use of such film-forming binder in combination with the above-mentioned polymer having a fluoroalkyl moiety is preferred in the points of improving coated film surface state and dispersion stability of the inorganic fine particles, improving film strength and more reducing the traces of deposited water droplets. When the curable composition for constituting the low refractive index layer is of an ionizing radiation-curable type, the curable composition preferably contains a photo radical polymerization initiator or a thermal radical polymerization initiator to be described hereinafter.

It is also possible to introduce a cross-linkable functional group into the polymer by using a monomer having a cross-linkable functional group in place of, or in addition to, the polymer having a fluoroalkyl moiety or the monomer having two or more ethylenically unsaturated group to be used as a film-forming binder, and then introduce a cross-linked structure into the layer-forming polymer through the reaction of the cross-linkable functional group.

Examples of the cross-linkable functional group include an isocyanato group, an epoxy group, an aziridine group, an oxazoline group, an aldehydo group, a carbonyl group, a hydrazine group, a carboxyl group, a methylol group and an active methylene group. Vinylsulfonic acid, acid anhydrides, cyanoacrylate derivatives, melamine, etherified methylol, esters, urethane and metal alkoxides (e.g., tetramethoxysilane) can also be utilized as monomers for introducing the cross-linked structure. A functional group which shows cross-linking ability as a result of decomposition reaction, such as a blocked isocyanato group, may be used as well. That is, in the invention, the cross-linkable group may be one which does not show immediate reactivity but shows reactivity as a result of its decomposition.

The binder polymer having the cross-linkable functional group can form the cross-linked structure when heated after being coated.

The monomer having the cross-linkable functional group may previously be reacted with the polymer before coating upon preparation of the antireflection film, or may be cross-linked with the polymer after coating the polymer to thereby form a matrix.

When a polymer alone does not have sufficient curability, it can be provided with a necessary curability by formulating a crosslinkable compound therewith. For example, when a polymer itself comprises a hydroxyl group, an amino compound is preferably used as a curing agent. As amino compounds to be used as a crosslinkable compound, for example, mention may be made of compounds having tow or more, in sum, of a hydroxyamino group and/or an alkoxyalkylamino group. Specifically, examples thereof include melamine compounds, urea compounds, benzoguanamine compounds and glycoluryl compounds.

The melamine compounds are generally known as those having a skeleton wherein a nitrogen atom is bonded to a triazine ring. Specifically, mention may be made of melamine, alkylated melamine, methylol melamine and alkoxylated methylmalamine. Compounds having two or more, in total, of a methylol group and/or an alkoxylated methyl group in one molecule are preferred. Specifically, are preferred a methylolated melamine obtained by reacting melamine with formaldehyde in a basic condition, an alkoxylated methylmelamine and derivatives thereof. In particular, an alkoxylated methylmelamine is preferred in view of being capable of imparting a desirable storage stability to a curable resin composition and capable of obtaining a desirable reactivity. A methylolated melamine and an alkoxylated methylmelamine, which are to be used as a crosslinkable compound, are not particularly limited. For example, can be used various resinous materials obtained by a method described in the article {Plasuchikku zairyo kouza (Plastic material course), 8, yuria.meraminjusi (Urea melamine resin), published by Nikkan kougyou shinbunsha (Nikkan newspaper publishing company)}.

As the urea compound, mention may be made of, in addition to urea, a polymethylolated urea and the alkoxylated methyl urea which is the derivative thereof, a methylolated uron having a uron ring and an alkoxylated methyluron. Also as the urea derivatives and the like compounds, various resinous materials described in the above article can be used.

As a preferred embodiment of a copolymer, which is the polymer having a fluoroalkyl moiety to be preferably used in the invention, comprising a repeating unit derived from the fluorine-containing vinyl monomer and a repeating unit containing a (meth)acryloyl group in the side chain, there are illustrated those which are represented by the following general formula (4).

General formula (4):

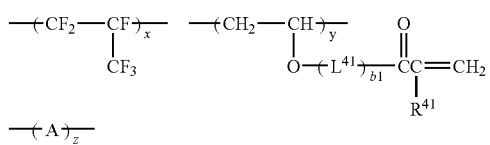

In the general formula (4), $L^{41}$ represents a linking group containing from 1 to 10 carbon atoms, more preferably from 1 to 6 carbon atoms, particularly preferably from 2 to 4 carbon atoms, and optionally having a straight-chain, branched-chain or cyclic structure and optionally having a hetero atom selected from among oxygen atom, nitrogen atom and sulfur atom.

Preferred examples thereof include *—$(CH_2)_2$—O—**, *—$(CH_2)_2$—NH—**, *—$(CH_2)_4$—O—**, *—$(CH_2)_6$—O—**, *—$(CH_2)_2$—O—$(CH_2)_2$—**, *—CONH—$((CH_2)_3$—O—**, *—$CH_2CH(OH)CH_2$—O—** and *—$CH_2CH_2OCONH(CH_2)_3$—O—** {* represents a linking site on the polymer main chain side, and ** represents a linking site on the (meth)acryloyl group side}. b1 represents 0 or 1.

In the general formula (4), $R^{41}$ represents a hydrogen atom or a methyl group. In view of curing reactivity, a hydrogen atom is more preferred.

In the general formula (4), A represents a repeating unit derived from an arbitrary vinyl monomer and is not particularly limited as long as it is a constituent of a monomer copolymerizable with hexafluoropropylene. A can properly be selected in view of adhesion properties to an undercoat layer, Tg (contributing to film hardness) of a polymer, solubility into a solvent, transparency, and sliding properties and dustproof and stainproof properties, and may be constituted by one of or a plurality of vinyl monomers.

Preferred examples thereof include vinyl ethers such as methyl vinyl ether, ethyl vinyl ether, t-butyl vinyl ether, cyclohexyl vinyl ether, i-propyl vinyl ether, hydroxyethyl vinyl ether, hydroxybutyl vinyl ether, glycidyl vinyl ether and allyl vinyl ether; vinyl esters such as vinyl acetate, vinyl propionate and vinyl butyrate; (meth)acrylates such as methyl (meth)acrylate, ethyl(meth)acrylate, hydroxyethyl(meth) acrylate, glycidyl methacrylate, allyl(meth)acrylate and (meth)acryloyloxypropyltrimethoxysilane; styrene derivatives such as styrene and p-hydroxymethylstyrene; and unsaturated carboxylic acids such as crotonic acid, maleic acid and itaconic acid; and the derivatives thereof. Of these, vinyl ether derivatives and vinyl ester derivatives are more preferred, with vinyl ether derivatives being particularly preferred.

x, y and z each represents a mole % of each constituent, satisfying $30 \leq x \leq 60$, $5 \leq y \leq 70$ and $0 \leq z \leq 65$, preferably $35 \leq x \leq 55$, $30 \leq y \leq 60$, $0 \leq z \leq 20$, particularly preferably $40 \leq x \leq 55$, $40 \leq y \leq 55$ and $0 \leq z \leq 10$, provided that $x+y+z=100$.

As a particularly preferred embodiment of the copolymer, there is illustrated a copolymer represented by the general formula (4-1).

General formula (4-1):

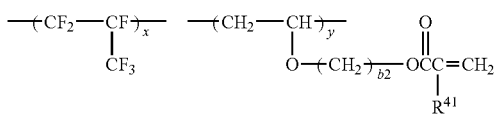

-continued

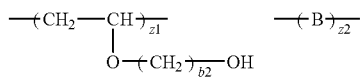

In the general formula (4-1), $R^{41}$, x and y are the same as defined with respect to the general formula (4), and preferred scopes thereof are also the same as described there. b2 represents an integer of $2 \leq b2 \leq 10$, preferably $2 \leq b2 \leq 6$, particularly preferably $2 \leq b2 \leq 4$. B represents a repeating unit derived from an arbitrary vinyl monomer and may be constituted by a single component or a composition of a plurality of components. As examples of B, there are illustrated those which are referred to as examples of A in the general formula (4).

z1 and z2 each represents a mole % of each repeating unit, satisfying $0 \leq z1 \leq 65$ and $0 \leq z2 \leq 65$, preferably $0 \leq z1 \leq 30$ and $0 \leq z2 \leq 10$, particularly preferably $0 \leq z1 \leq 10$ and $0 \leq z2 \leq 5$, provided that $x+y+z1+z2=100$.

As a copolymer represented by the general formula (4-1), those copolymers wherein $40 \leq x \leq 60$, $30 \leq y \leq 60$ and $z2=0$ are particularly preferred.

Copolymers represented by the general formula (4) or (4-1) can be synthesized by, for example, introducing a (meth)acryloyl group into a copolymer containing a hexafluoropropylene component and a hydroxyalkyl vinyl ether component according to any one of the aforementioned methods.

Preferred specific examples of the copolymer to be used in the invention which comprises a repeating unit derived from a fluorine-containing vinyl monomer and a repeating unit having a (meth)acryloyl group in the side chain are shown below which, however, do not limit the invention in any way.

TABLE 1

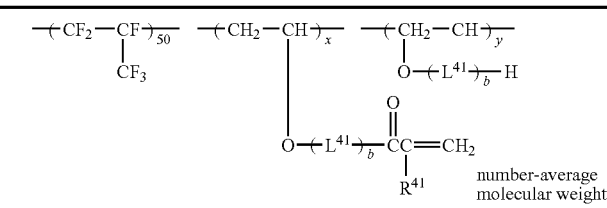

| | x | y | b | $L^{41}$ | $R^{41}$ | Mn(× $10^4$) |
|---|---|---|---|---|---|---|
| P-1 | 50 | 0 | 1 | *—$CH_2CH_2O$— | H | 3.1 |
| P-2 | 50 | 0 | 1 | *—$CH_2CH_2O$— | $CH_3$ | 4.0 |
| P-3 | 45 | 5 | 1 | *—$CH_2CH_2O$— | H | 2.8 |
| P-4 | 40 | 10 | 1 | *—$CH_2CH_2O$— | H | 3.8 |
| P-5 | 30 | 20 | 1 | *—$CH_2CH_2O$— | H | 5.0 |
| P-6 | 20 | 30 | 1 | *—$CH_2CH_2O$— | H | 4.0 |
| P-7 | 50 | 0 | 0 | — | H | 11.0 |
| P-8 | 50 | 0 | 1 | *—$C_4H_8O$— | H | 0.8 |
| P-9 | 50 | 0 | 1 | *—$(CH_2)_2$—O—$(CH_2)_2$—O— | H | 1.0 |

TABLE 1-continued $$-(CF_2-CF)_{50}-(CH_2-CH)_x-(CH_2-CH)_y-$$
$$\quad\quad\ |\quad\quad\quad\quad |\quad\quad\quad\quad\quad |$$
$$\quad\quad CF_3\quad\quad\quad O-(L^{41})_b-H$$
$$\quad\quad\quad\quad\quad\quad O-(L^{41})_b-\underset{R^{41}}{\overset{O}{\underset{\|}{C}}}C=CH_2$$

number-average molecular weight

| | x | y | b | L⁴¹ | R⁴¹ | Mn(× 10⁴) |
|---|---|---|---|---|---|---|
| P-10 | 50 | 0 | 1 | *—⟨cyclohexyl⟩—O— | H | 7.0 |
| P-11 | 50 | 0 | 1 | *—CH₂CH₂NH— | H | 4.0 |
| P-12 | 50 | 0 | 1 | *—CH₂CH₂OC(=O)NHCH₂CH₂O— | H | 4.5 |
| P-13 | 50 | 0 | 1 | *—CH₂CH₂OC(=O)NHCH₂CH₂O— | CH₃ | 4.5 |
| P-14 | 50 | 0 | 1 | *—(CH₂)₄OC(=O)NHCH₂CH₂O— | CH₃ | 5.0 |
| P-15 | 50 | 0 | 1 | *—CH₂CH(OH)CH₂O— | H | 3.5 |
| P-16 | 50 | 0 | 1 | *—CH₂CH(CH₂OH)O— | H | 3.0 |
| P-17 | 50 | 0 | 1 | *—CH₂CH₂OCH₂—CH(OH)CH₂O— | H | 3.0 |
| P-18 | 50 | 0 | 1 | *—CH₂OCH₂CH(OH)—CH₂O— | CH₃ | 3.0 |
| P-19 | 50 | 0 | 1 | *—CH₂OCH(CH₂OH)—O— | CH₃ | 3.0 |
| P-20 | 40 | 10 | 1 | *—CH₂CH₂O— | CH₃ | 0.6 |

*represents the main chain side of the polymer.

TABLE 2

$$-(CF_2-CF)_x-(CH_2-CH)_y-(A)_z-$$
$$\quad\quad |\quad\quad\quad\quad |$$
$$\quad\quad CF_3\quad\quad O-L^{41}-\overset{O}{\underset{\|}{C}}CH=CH_2$$

number-average molecular weight

| | x | y | z | L⁴¹ | A | Mn(× 10⁴) |
|---|---|---|---|---|---|---|
| P-21 | 55 | 45 | 0 | *—CH₂CH₂O—** | — | 1.8 |
| P-22 | 45 | 55 | 0 | *—CH₂CH₂O—** | — | 0.8 |
| P-23 | 50 | 45 | 5 | *—CH₂CH₂OC(=O)NHCH₂CH₂O—** | —CH₂—CH(OCH₂CH₂OH)— | 0.7 |

TABLE 2-continued $$-(CF_2-CF)_x--(CH_2-CH)_y--(A)_z-$$
$$\quad\quad |\quad\quad\quad\quad\quad |$$
$$\quad\quad CF_3\quad\quad\quad\quad O-L^{41}-\overset{O}{\overset{\|}{C}}CH=CH_2$$

number-average molecular weight

| | x | y | z | $L^{41}$ | A | $Mn(\times 10^4)$ |
|---|---|---|---|---|---|---|
| P-24 | 50 | 45 | 5 | *—CH$_2$CH(OH)—CH$_2$O—** | —CH$_2$—CH(O—CH$_2$-oxiranyl)— | 4.0 |
| P-25 | 50 | 45 | 5 | *—CH$_2$CH(CH$_2$OH)—O—** | —CH$_2$—CH(O—CH$_2$-oxiranyl)— | 4.0 |
| P-26 | 50 | 40 | 10 | *—CH$_2$CH$_2$O—** | —CH$_2$—CH(OCH$_2$CH$_3$)— | 4.0 |
| P-27 | 50 | 40 | 10 | *—CH$_2$CH$_2$O—** | —CH$_2$—CH(O-cyclohexyl)— | 4.0 |
| P-28 | 50 | 40 | 10 | *—CH$_2$CH$_2$O—** | —CH(CH$_3$)—CH(COOH)— | 5.0 |

*represents the main chain side of the polymer.
**represents the acryloyl group side.

TABLE 3

$$-(CF_2-CF)_x--(CH_2-CH)_y--(CH_2-CH)_{z1}--(B)_{z2}-$$
$$\quad\quad |\quad\quad\quad\quad |\quad\quad\quad\quad\quad |$$
$$\quad\quad CF_3\quad\quad\quad\quad O-(CH_2)_b-O\overset{O}{\overset{\|}{C}}\overset{}{\underset{R^{41}}{C}}=CH_2\quad O-(CH_2)_b-OH$$

number-average molecular weight

| | x | y | z1 | z2 | b | $R^{41}$ | B | $Mn(\times 10^4)$ |
|---|---|---|---|---|---|---|---|---|
| P-29 | 50 | 40 | 5 | 5 | 2 | H | —CH$_2$—CH(OCH$_2$CH$_3$)— | 5.0 |
| P-30 | 50 | 35 | 5 | 10 | 2 | H | —CH$_2$—CH(OC(CH$_3$)$_3$)— | 5.0 |
| P-31 | 40 | 40 | 10 | 10 | 4 | CH$_3$ | —CH$_2$—CH(O-cyclohexyl)— | 4.0 |

TABLE 4

$$-(CF_2-CF)_{50}- \quad -(A)_x- \quad -(B)_y-$$
$$\phantom{-(CF_2-}|\phantom{CF)_{50}-}$$
$$\phantom{-(CF_2-}CF_3$$

number-average molecular weight

| | x | y | A | B | Mn(× 10⁴) |
|---|---|---|---|---|---|
| P-32 | 45 | 5 | —CH—CH— <br> CO₂CH₂CHCH₂OCC=CH₂ <br> OH  CH₃ <br> (with CH₃ on first CH, O=C) | —CH—CH— <br> CH₃  COOH | 4.0 |
| P-33 | 40 | 10 | —CH—CH— <br> COOH CONHCH₂CH₂OCCH=CH₂ | —CH—CH— (cyclic anhydride O=C—O—C=O) | 4.0 |

TABLE 5

$$-(CH_2-CH)_x- \quad -(CH_2-CH)_y- \quad -(CH_2-CH)_z-$$
$$\phantom{xx}|\phantom{xxxxxxxxxxxx}|\phantom{xxxxxxxxxxxx}|$$
$$\phantom{xx}O=C\phantom{xxxxxxxx}O=C\phantom{xxxxxxxx}O=C$$
$$\phantom{xx}|\phantom{xxxxxxxxxxxx}|\phantom{xxxxxxxxxxxx}|$$
$$\phantom{xx}O-Rf\phantom{xxxxxx}O\phantom{xx}O\phantom{xxxxxxx}O-L^{41}-H$$
$$\phantom{xxxxxxxxxxxxxxxx}\backslash\phantom{x}\|$$
$$\phantom{xxxxxxxxxxxxxxxxx}L^{41}-CCH=CH_2$$

number-average molecular weight

| | x | y | z | Rf | L⁴¹ | Mn(× 10⁴) |
|---|---|---|---|---|---|---|
| P-34 | 60 | 40 | 0 | —CH₂CH₂C₈F₁₇(n) | *—CH₂CH₂O— | 11 |
| P-35 | 60 | 30 | 10 | —CH₂CH₂C₄F₈H(n) | *—CH₂CH₂O— | 30 |
| P-36 | 40 | 60 | 0 | —CH₂CH₂C₆F₁₂H(n) | *—CH₂CH₂CH₂Ch₂O— | 4.0 |

*represents the main chain side of the polymer.

TABLE 6

$$-(CH_2-CH)_x- \quad -(CH_2-CH)_y- \quad -(CH_2-CH)_z-$$
$$\phantom{xx}|\phantom{xxxxxxxxxxxx}|\phantom{xxxxxxxxxxxx}|$$
$$\phantom{xx}O=C\phantom{xxxxxxxx}\phantom{xxxxxxxx}O-(CH_2)_b-OH$$
$$\phantom{xx}|\phantom{xxxxxxxxxxxx}|$$
$$\phantom{xx}O-Rf\phantom{xxxx}O-(CH_2)_b-OCCH=CH_2$$

number-average molecular weight

| | x | y | z | b | Rf | Mn(× 10⁴) |
|---|---|---|---|---|---|---|
| P-37 | 50 | 50 | 0 | 2 | —CH₂C₄F₈H(n) | 5.0 |
| P-38 | 40 | 55 | 5 | 2 | —CH₂C₄F₈H(n) | 4.0 |
| P-39 | 30 | 70 | 0 | 4 | —CH₂C₈F₁₇(n) | 10 |
| P-40 | 60 | 40 | 0 | 2 | —CH₂CH₂C₈F₁₆(n) | 5.0 |

In the invention, addition of a hydrolyzate and/or a partial condensate of an organosilane compound is preferred since it serves to improve film strength when they are used in combination with the above-mentioned polymer binder having a fluoroalkyl moiety which can be cured with ionizing radiation or heat. In the synthesis of the hydrolyzate and/or the partial condensate of the organosilane compound (hereinafter also referred to as "sol component"), those organosilane compounds and catalysts of acids and/or metal chelates which have been described in the paragraph of [Porous or hollow fine particles] as materials for use in surface treatment and dispersibility-improving treatment can be used.

As the organosilane compound, there may be illustrated those organosilane compounds which are represented by the foregoing general formulae (1), (1-2), (2) and (2-1). An organosilane compound having a fluoroalkyl moiety is preferred in view of reducing refractive index. Preferred examples of the sol component are described in, for example, JP-A-2002-202406, JP-A-2002-265866 and JP-A-2002-317152.

The content of the organosilane sol component, based on the polymer having a lfuoroalkyl moiety, in the low refractive index layer is preferably from 5 to 100% by weight, more preferably from 5 to 40% by weight, still more preferably from 8 to 35% by weight, particularly preferably from 10 to 30% by weight, in view of the effect of the use of the sol component, refractivity index of a formed layer, and shape and surface condition of a formed layer.

Also, in the invention, it is preferred to further add a β-diketone compound and/or a β-keto ester compound to the curable composition for forming the low refractive index layer. Specific examples of the β-diketone compound and/or the β-keto ester compound include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexadione, 2,4-heptadione, 3,5-heptadione, 2,4-octadione, 2,4-nonadione and 5-methylhexadione. Of these, ethyl acetoacetate and acetylacetone are preferred, with acetylacetone being particularly preferred.

These β-diketone compounds and/or β-keto ester compounds may be used independently or in combination of two or more thereof. In the invention, the β-diketone compound and/or β-keto ester compound is used in an amount of 2 moles or more, more preferably from 3 to 20 moles, per mol of the metal chelate compound. Use of the compound in an amount of 2 moles or more serves to avoid inconveniences such as reduction of storage stability of the resulting composition, thus being preferred.

[Addition of a Component Having a Low Surface Free Energy]

In the invention, it is preferred to reduce the surface free energy of the surface of the antireflection film in view of improving stain-proof properties. As a component capable of reducing such surface free energy (also referred to as "low surface free energy component"), a sliding agent is often used in the low refractive index layer. Examples of such sliding agent include fluorine-containing ether compounds (e.g., perfluoro polyether and the derivatives thereof) and polysiloxane compounds (dimethylpolysiloxane and the derivatives thereof). Of these, dialkylsiloxane compounds are particularly preferred.

As preferred examples of the polysiloxane compound, there are illustrated those which contain a plurality of dimethylsilyloxy units and have substituents on the ends and/or in the side chains thereof.

The compound containing the dimethylsilyloxy units as repeating units may contain other structural units (substituents) than the dimethylsilyloxy unit. The substituents may be the same or different and are preferably plural in number.

Preferred examples of the substituent include a (meth) acryloyl group, a vinyl group, an aryl group, a cinnamoyl group, an epoxy group, an oxetanyl group, a hydroxyl group, a fluoroalkyl group, a polyoxyalkylene group, a carboxyl group and an amino group.

The molecular weight of the sliding agent is not particularly limited, but is preferably from 300 to 1,000,000, particularly preferably from 1,500 to 200,000, most preferably from 3,000 to 100,000.

The content of Si atom in the siloxane compound is not particularly limited, but is preferably 5% by weight or more, particularly preferably from 10 to 60% by weight, most preferably from 15 to 50% by weight.

Particularly preferred sliding agents are polysiloxane compounds having a cross-linkable or polymerizable functional group and represented by the following general formula (5) and the derivatives thereof {"derivatives" are, for example, cross-linked products or polymers of the polysiloxane compound represented by the general formula (5), and reaction products between the polysiloxane compound represented by the general formula (5) and other compound having a cross-linkable or polymerizable functional group than the polysiloxane compound.

General formula (5):

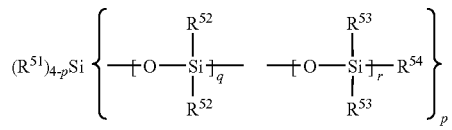

In the general formula (5), $R^{51}$ to $R^{54}$ each independently represents a group containing from 1 to 20 carbon atoms and may be the same or different from each other. Of $R^{51}$, $R^{53}$ and $R^{54}$, at least one group represents a cross-linkable or polymerizable functional group. p represents an integer satisfying $1 \leq p \leq 4$. q represents an integer satisfying $10 \leq q \leq 500$, preferably $50 \leq q \leq 400$, particularly preferably $100 \leq q \leq 300$. r represents an integer satisfying $0 \leq r \leq 500$, preferably $0 \leq r \leq q$, particularly preferably $0 \leq r \leq 0.5q$. When $r \neq 0$, the polysiloxane moiety put in { } may be a random copolymer or a block copolymer.

The outermost layer in the invention preferably contains a cured product containing the polysiloxane compound of the general formula (5) having a cross-linkable or polymerizable group and/or the derivative thereof, and a component having a fluoroalkyl moiety.

The content of the polysiloxane compound and/or the derivative thereof is preferably from 0.1 to 30% by weight, more preferably from 0.5 to 15% by weight, particularly preferably from 1 to 10% by weight, based on the weight of the total constituents of the outermost layer.

In the polysiloxane compound and/or the derivative thereof, all that is required for a preferred cross-linkable or polymerizable functional group is to have the ability of undergoing cross-linking or polymerizing reaction with other constituent (e.g., the component having a fluoroalkyl moiety or a binder) in the outermost layer. Examples thereof include a group having active hydrogen atom (e.g., a hydroxyl group, a carboxyl group, an amino group, a carbamoyl group, a mercapto group, a β-keto ester group, a hydrosilyl group or a silanol group), a cation-polymerizable group (e.g., an epoxy group, an oxetanyl group, an oxazolyl group, a vinyl group or a vinyloxy group), a group having an unsaturated double bond capable of undergoing cross-linking or polymerization reaction caused by a radical species (e.g., a (meth)acryloyl group or an allyl group), a hydrolysable silyl group (e.g., an alkoxysilyl group or an acyloxysilyl group), an acid anhydride, an isocyanato group and a group capable of being substituted by a nucleophilic agent (e.g., active halogen atom or a sulfonic ester).

These cross-linkable or polymerizable functional groups are properly selected depending upon the constituents of the outermost layer, with ionizable radiation-curable functional groups being preferred.

Also, the cross-linkable or polymerizable functional group of the general formula (5) is preferably a functional group which undergoes cross-linking or polymerization reaction with a cross-linkable or polymerizable functional group of a binder component forming the outermost layer and is particularly preferably a group capable of causing cationic ring opening reaction (particularly, an epoxy group or an oxetanyl group) or a group capable of undergoing radical polymerization reaction (particularly, a (meth)acryloyl group).

The group represented by $R^{52}$ in the general formula (5) is a substituted or unsubstituted organic group containing from 1 to 20 carbon atoms and is preferably an alkyl group containing from 1 to 10 carbon atoms (e.g., a methyl group, an ethyl group or a hexyl group), a fluoroalkyl group (e.g., a trifluoromethyl group or a pentafluoroethyl group) or an aryl group containing from 6 to 20 carbon atoms (e.lg., a phenyl group or a naphthyl group), more preferably an alkyl group containing from 1 to 5 carbon atoms, a fluoroalkyl group or a phenyl group, particularly preferably a methyl group. These groups may be substituted by these groups.

When $R^{51}$, $R^{53}$ or $R^{54}$ in the general formula (5) is not a cross-linkable or polymerizable functional group, it can be the above-mentioned organic group.

The polysiloxane structure of the compound represented by the general formula (5) may be a homopolymer wherein the repeating units $[-OSi(R^{52})_2-]$ are constituted by a single kind of substituent ($R^{52}$) or may be a random copolymer or a block copolymer wherein the repeating units are constituted by a combination of repeating units having different substituents.

The weight-average molecular weight of the compound represented by the general formula (5) is preferably from 1,500 to 200,000, more preferably from 3,000 to 100,000, particularly preferably from 5,000 to 50,000.

As the polysiloxane compound represented by the general formula (5), commercially available ones such as "KF-100T", "X-22-169AS", "KF-102", "X-22-3701IE", "X-22-164B", "X-22-164C", "X-22-5002", "X-22-173B", "X-22-174D", "X-22-167B", "X-22-161 AS", "X-22-174DX", "X-22-2426", "X-22-170DX", "X-22-176DX" and "X-22-1821" (these being manufactured by Shin-Etsu Chemical Co., Ltd.); "AK-5", "AK-30" and "AK-32" (these being manufactured by Toagosei Co., Ltd.); and "SILAPLANE FM-0275", "SILAPLANE FM-0721", "SILAPLANE FM-7725", "SILAPLANE DMS-U22", "SILAPLANE RMS-033", "SILAPLANE RMS-083" and "SILAPLANE UMS-182" (these being manufactured by Chisso Corporation) may be used. Also, the polysiloxane compound can be prepared by introducing a cross-linkable or polymerizable group into a commercially available polysiloxane compound through a hydroxyl group, an amino group or a mercapto group which the polysiloxane compound has.

Preferred examples of the polysiloxane compound represented by the general formula (5) are shown below which, however, are not to be construed as limiting the invention in any way.

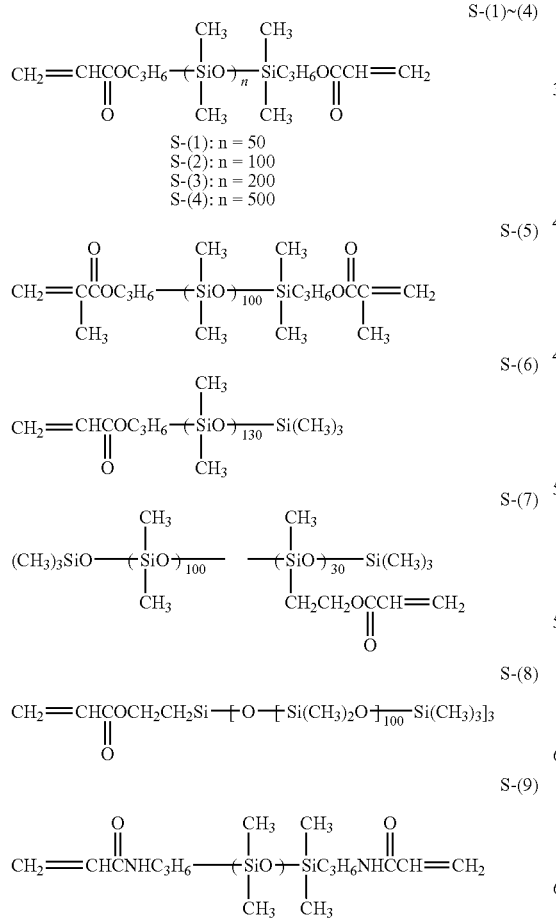

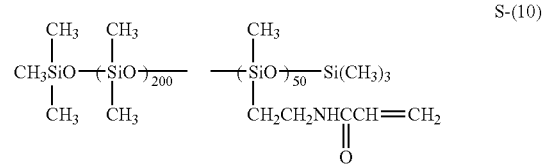

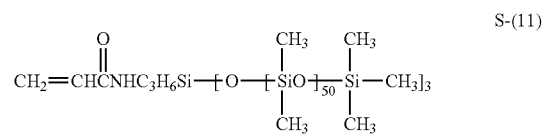

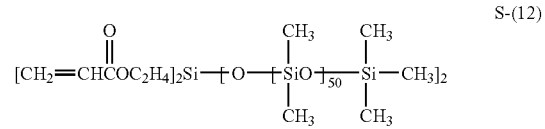

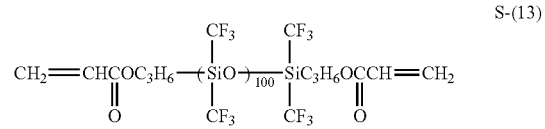

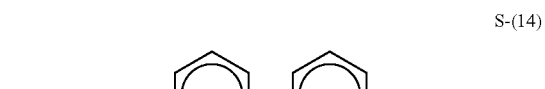

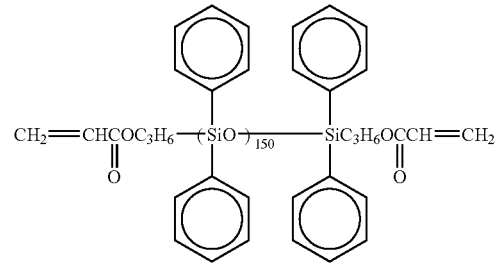

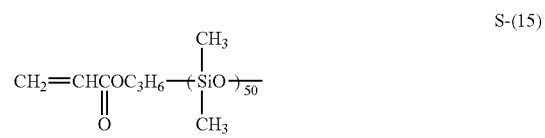

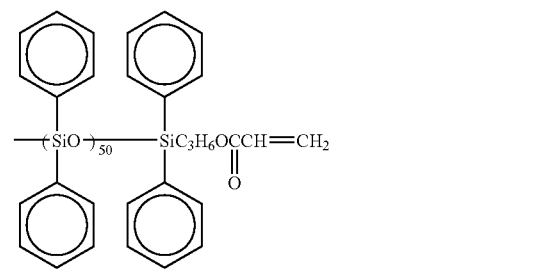

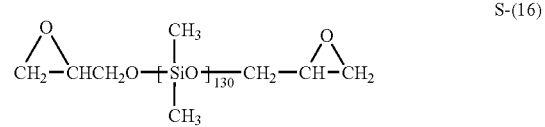

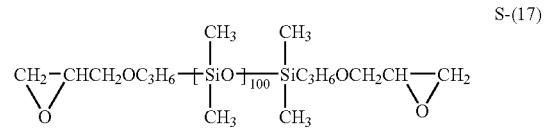

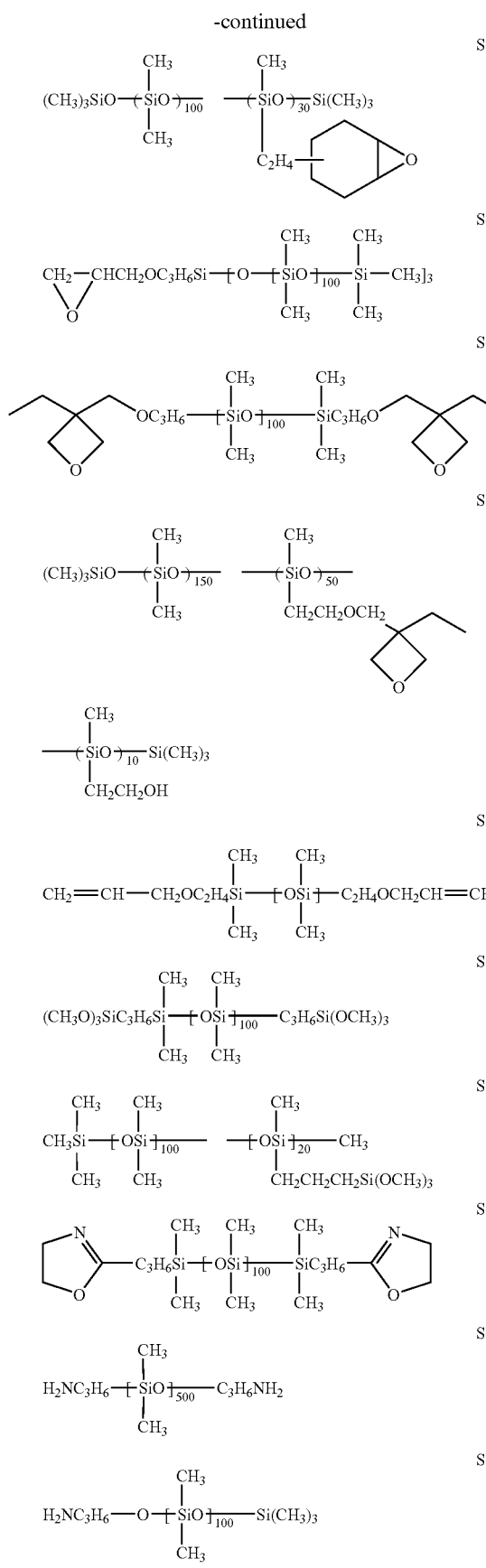
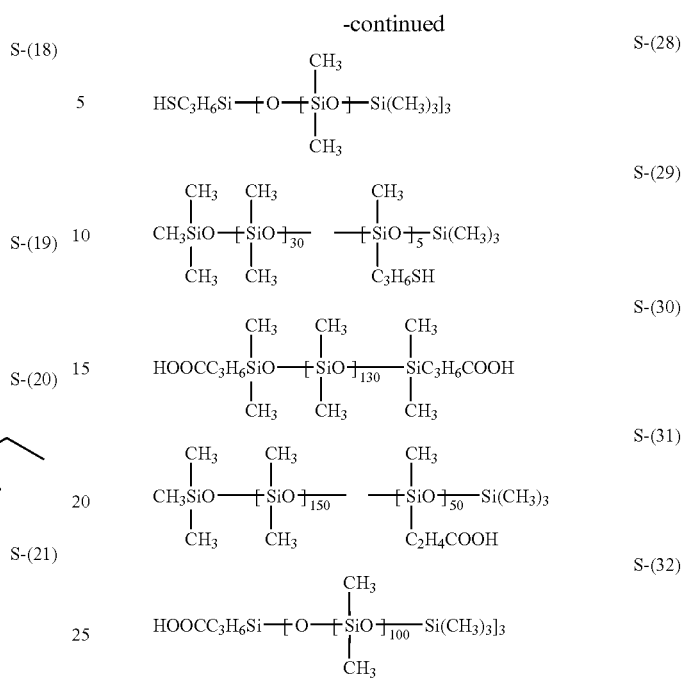

The addition amount of the polysiloxane compound represented by the general formula (5) and/or the derivative thereof is preferably from 0.05 to 30% by weight, more preferably from 0.1 to 20% by weight, still more preferably from 0.5 to 15% by weight, particularly preferably from 1 to 10% by weight, based on the weight of the total solid components of the outermost layer.

It is also preferred to provide a stain-proof layer of a silane coupling agent containing a perfluoro ether group, described in JP-A-2002-277604.

[Physical Properties of the Low Refractive Index Layer]

The refractive index of the low refractive index layer is preferably from 1.20 to 1.145, more preferably from 1.25 to 1.40, particularly preferably from 1.25 to 1.38.

The thickness of the low refractive index layer is preferably from 50 to 200 nm, more preferably from 70 to 120 nm. The haze of the low refractive index layer is preferably 3% or less, more preferably 2% or less, most preferably 1% or less. The surface strength of the low refractive index layer is preferably H or more, more preferably 2H or more, most preferably 3H or more, according to pencil hardness grades with 500 g load.

Also, in order to improve stain-proof properties of the optical film, the surface has a contact angle with water of 90° or more, more preferably 95° or more, particularly preferably 100° or more.

[Scratch Resistance of the Antireflection Film After Exposure to Ozone]

The surface of the antireflection film of the invention shows a limit load of 400 g or more, more preferably 500 g or more, still more preferably 600 g or more, in the rubbing test with cotton swab moistened with water after being exposed to 10 ppm ozone for 192 hours.

The limit load in the rubbing test with cotton swab moistened with water is determined in the following manner.

Each sample is processed to give a polarizing plate and, after storing for 192 hours (8 days) under the circumstance of 10 ppm in ozone concentration, 30° C. in temperature and 60% RH in humidity, it is taken out into the atmosphere. A cotton swab (HEALTH REFRE (trade name) manufactured by Toyo Eizai K.K. is fixed to the rubbing head of a rubbing tester. In a flat dish, the sample is fixed by clipping it at the top and the bottom. Then, the sample and the cotton swab are dipped in 25° C. water at a room temperature of 25° C. Under applying a load onto the cotton swab, rubbing is reciprocally repeated 20 times.

Rubbing distance (one way): 1 cm

Rubbing speed: about two reciprocations per second

Water on the sample having been subjected to the rubbing test is evaporated. Then, it is examined with the naked eye whether or not the film peels off. The test is repeated 10 times for each sample. The initial load is 100 g, and the load is increased by 50 g until film-peeling is observed 5 times or more. The load under which the film-peeling occurs less than 5 times in repeating the test 10 times is defined as the limit load. The film peeling is judged by observing a change in the reflection state with the naked eye. When a film having undergone a change in the reflection state is observed under an electron microscope, it is found that the thickness of the uppermost layer is reduced by 5% or more or that the uppermost layer or other constituting layer(s) peel off.

[Layer Structure of the Antireflection Film]

The antireflection film of the invention comprises a transparent substrate (hereinafter also referred to as "support") having provided thereon, as needed, a hard coat layer to be described hereinafter and, as a necessary constituting layer, an antistatic layer and, thereon, one or more antireflective layers in consideration of refractive index, film thickness, and number and order of layers so that reflectance is reduced by optical interference.

In general, the antireflection film of the simplest structure comprises a substrate having provided thereon only a low refractive index layer. In order to further reduce the refractive index, it is preferred to constitute the antireflective layer by a high refractive index layer having a higher refractive index than that of the substrate and a low refractive index layer having a lower refractive index than that of the substrate. Examples of the antireflective layer constitution include an antireflective layer composed of two layers of a high refractive index layer/a low refractive index layer in this order from the substrate side, and an antireflective layer composed of three layers different from each other in refractive index provided in the order of a middle refractive index layer (having a refractive index higher than that of the substrate or the hard coat layer and lower than that of the high refractive index layer)/a high refractive index layer/a low refractive index layer. There have been proposed those which have more antireflective layers. In particular, it is preferred in view of durability, optical properties, production cost and productivity to coat in the order of a middle refractive index layer/a high refractive index layer/a low refractive index layer on a substrate having provided thereon a hard coat layer.

Examples of preferred layer structure of the antireflection film of the invention are shown below. In the following constitution, a substrate film functions as a support. Also, in the following constitution, a layer described as (antistatic layer) means a layer having other function also exerting the function of antistatic layer. By imparting a function other than antistatic function to the antistatic layer, the number of layers to be formed can be decreased. The construction is preferable in view of improving productivity.

Substrate film/antiatatic layer/low refractive index layer

Substrate film/low refractive index layer (antistatic layer)

Substrate film/glare-reducing layer (antistatic layer)/low refractive index layer Substrate film/glare-reducing layer/antistatic layer/low refractive index layer Substrate film/hard coat layer/glare-reducing layer (antistatic layer)/low refractive index layer Substrate film/hard coat layer/glare-reducing layer/antistatic layer/low refractive index layer Substrate film/hard coat layer/antistatic layer/glare-reducing layer/low refractive index layer Substrate film/hard coat layer (antistatic layer)/glare-reducing layer/low refractive index layer Substrate film/hard coat layer/high refractive index layer/antistatic layer/low refractive index layer Substrate film/hard coat layer/high refractive index layer (antistatic layer)/low refractive index layer Substrate film/hard coat layer/antistatic layer/high refractive index layer/low refractive index layer Substrate film/hard coat layer/middle refractive index layer/high refractive index layer (antistatic layer)/low refractive index layer Substrate film/hard coat layer/middle refractive index layer (antistatic layer)/high refractive index layer/low refractive index layer Substrate film/hard coat layer (antistatic layer)/middle refractive index layer/high refractive index layer/low refractive index layer Substrate film/glare-reducing layer/high refractive index layer (antistatic layer)/low refractive index layer Substrate film/glare-reducing layer/middle refractive index layer (antistatic layer)/high refractive index layer/low refractive index layer Substrate film/antistatic layer/hard coat layer/middle refractive index layer/high refractive index layer/low refractive index layer Antistatic layer/substrate film/hard coat layer/middle refractive index layer/high refractive index layer/low refractive index layer Substrate film/antistatic layer/glare-reducing layer/middle refractive index layer/high refractive index layer/low refractive index layer Antistatic layer/substrate film/glare-reducing layer/middle refractive index layer/high refractive index layer/low refractive index layer Antistatic layer/substrate film/glare-reducing layer/high refractive index layer/low refractive index layer/high refractive index layer/low refractive index layer The layer structure is not particularly limited to these layer structures, and any layer structured may be employed as long as it can reduce reflectance based on optical interference. Also, the antistatic layer is preferably a layer which contains electrically conductive polymer particles or fine particles of metal oxide {e.g., antimony-doped tin oxide (ATO) or tin-doped indium oxide (ITO)) and which can be provided by coating or plasma treatment under atmospheric pressure.

[Antistatic Layer]

The antistatic layer in the invention will be described below.

When formed in the antireflection film of the invention, the antistatic layer can prevent adhesion of dirt (e.g., dust) onto the surface of the antireflection film, that is, can realize excellent dust-proof properties. The excellent dust-proof properties can be realized by reducing the surface resistance of the antireflection film. An antistatic layer having a higher conductivity can provide higher effects.

In the antireflection film of the invention, the surface resistance on the side having the outermost layer is preferably $1 \times 10^{13}$ Ω/☐ or less, more preferably $1 \times 10^{12}$ Ω/☐ or less, still more preferably $1\times10^{11}$ Ω/□ or less, still more preferably $1\times10^{9}$ Ω/□ or less, particularly preferably $1\times10^{8}$ Ω/□ or less.

In the antireflection film of the invention, the antistatic layer may be formed by either of a gas phase method (a vacuum deposition method, a sputtering method, an ion plating method or a plasma CVD method) and a coating method, with a coating method being preferred in that it enables to form the antistatic layer at a low cost.

Formation of the antistatic layer according to the gas phase method can be conducted by, for example, vacuum depositing or sputtering an electrically conductive substance onto the film. As the electrically conductive substance, there can be used, specifically, simple metals such as aluminum, copper, gold, silver, nickel, chromium, iron, molybdenum, titanium, tungsten and tantalum or the alloys thereof, and metal oxides such as antimony-doped tin oxide (ATO), tin-doped indium oxide (ITO) and aluminum-doped zinc oxide. In the case of forming the antistatic layer by the gas phase method, the thickness of the antistatic layer is usually from about 5 to about 200 nm, preferably from 10 to 150 nm, more preferably from 20 to 120 nm, particularly preferably from 30 to 100 nm. Formation of the antistatic layer by the gas phase method can be conducted by employing conventionally known methods.

In the case of forming the antistatic layer by coating, it is preferred to incorporate an electrically conductive material (e.g., electronic conduction type electrically conductive particles or an ionic conduction type organic compound) in a binder for forming the antistatic layer. Electronic conduction type electrically conductive particles are particularly preferred in that they are difficultly influenced by environmental change and have a stable electrically conductive performance and that they exhibit good electrically conductive performance even under an environment of low humidity. A preferred method for forming the antistatic layer by a coating method will be described below.

[Electrically Conductive Substance]

Preferred examples of electrically conductive substances to be used in the antistatic layer of the invention include electronic conduction type electrically conductive materials such as π-conjugation type electronically conductive organic compounds and electronically conductive fine particles.

Examples of the π-conjugation type electronically conductive organic compounds include aliphatic π-conjugated polyacetylene, aromatic conjugated poly(p-phenylene), heterocyclic conjugated polypyrrole, polythiophene, hetero atom-containing conjugation type polyaniline, and mixed conjugation type poly(phenylenevinylene).

Examples of the electrically conductive fine particles include carbon type, metal type, metal oxide type and conductively coated fine particles.

Carbon type fine particles include carbon powders such as carbon black, Ketjen black and acetylene black; carbon fibers such as PAN series carbon fibers and pitch series carbon fibers; and carbon flakes of a pulverized product of expanded graphite.

Examples of metallic fine particles include powders of metals such as aluminum, copper, gold, silver, nickel, chromium, iron, molybdenum, titanium, tungsten and tantalum and powders of alloys including these metals, metal flakes, and metal fibers of iron, stainless steel, silver-plated copper and brass.

Examples of fine particles of metal oxide include particles of tin oxide, antimony-doped tin oxide (ATO), indium oxide, tin-doped indium oxide (ITO), zinc oxide and aluminum-doped zinc oxide.

As the conductively coated fine particles, there are illustrated, as preferred examples, electrically conductive fine particles of various fine particles such as titanium oxide (spherical or needle-like), potassium titanate, aluminum borate, barium sulfate, mica or silica whose surface is surface-treated with an electrically conductive material such as tin oxide, ATO or ITO; and beads of resins such as polystyrene, acryl resin, epoxy resin, polyamide resin, polyurethane resin, melamine resin or formaldehyde resin having been surface-treated with a metal such as gold and/or nickel or a metal oxide. These are particles which comprise an electrically non-conductive material having formed on the outer surface thereof an electrically conductive portion of a metal or a metal oxide, and are characterized in that the surface portion thereof has a higher electric conductivity than that of the interior portion thereof. Materials to be used for the surface treatment are metals and metal oxides, with metals being preferred. Of those, gold, silver and nickel are preferred which have a high electric conductivity and are stable, with gold being most preferred.

As an effective particle having a low refractive index and a reduced uneven interference with an adjacent layer, an antimony oxide-coated porous silica fine particle or silica fine particle having a hollow space therein can be mentioned. Specific preparation method is described in JP-A-2005-119909.

As antistatic materials in the antistatic layer, π-conjugation type electrically conductive organic compounds (particularly, polythiophene series conductive polymers) are preferred and, as the electrically conductive fine particles, metal fine particles (particularly, gold, silver, silver/palladium alloy, copper, nickel and aluminum) and metal oxide fine particles (particularly, tin oxide, ATO, ITO, zinc oxide and aluminum-doped zinc oxide) are preferred. In particular, electron conduction type electrically conductive materials such as metals or metal oxides are preferred, with metal oxide fine particles being particularly preferred.

The weight-average particle size of the primary particles of the electrically conductive material is preferably from 1 to 200 nm, more preferably from 1 to 150 nm, still more preferably from 1 to 100 nm, particularly preferably from 1 to 80 nm. The average particle size of the electrically conductive material can be measured by a light-scattering method or from an electron microscopic photograph.

The specific surface area of the electrically conductive material is preferably from 10 to 400 $m^2/g$, more preferably from 20 to 200 $m^2/g$, most preferably from 30 to 150 $m^2/g$.

The shape of the electrically conductive material is preferably a rice grain-like shape, a spherical shape, a cubic shape, a spindle-like shape, a flake-like shape, a needle-like shape or an amorphous shape, with an amorphous shape, a needle-like shape or a flake-like shape being particularly preferred.

In forming the antistatic layer by dispersing the electrically conductive fine particles in a binder, the amount of the electrically conductive fine particles based on the weight of the total constituting components of the antistatic layer is preferably from 5 to 95% by weight, more preferably from 10 to 90% by weight, most preferably from 30 to 90% by weight. When used in the above-mentioned range, the electrically conductive fine particles provide an excellent conductivity with less damage such as reduction of film strength and increase in haze, thus such amount being preferred.

The thickness of the antistatic layer using the particles is preferably from 5 nm to 10 μm, more preferably from 10 nm to 5 μm, most preferably from 30 nm to 3 μm. The antistatic layer can also function as the aforesaid antireflective layer and, in such case, the thickness can be a thickness necessary for the antireflective layer.

[Method for Forming the Antistatic Layer]

In the case of forming the antistatic layer by a coating method, the electrically conductive material is used in the antistatic layer in a state of dispersion. In dispersing the electrically conductive material, it is preferred to disperse the electrically conductive material in a dispersion medium in the presence of a dispersing agent.

Use of the dispersing agent serves to extremely finely disperse the electrically conductive material and permits formation of a transparent antistatic layer. Particularly, in the case of imparting an antireflective ability to the antistatic layer by using the layer as an optical interference layer, transparency of the layer can be enhanced by finely dispersing the electrically conductive material and, at the same time, the antireflective ability can be improved as well, thus fine dispersion being preferred.

(Dispersing Agent)

In dispersing the electrically conductive material to be used in the invention, use of a dispersing agent having an anionic group is preferred. As the anionic group, a group having an acidic proton such as a carboxyl group, a sulfonic acid group (a sulfo group), a phosphoric acid group (a phosphono group) or a sulfonamido group or the salt thereof is effective. Of these, a carboxyl group, a sulfonic acid group, a phosphoric acid group or the salt thereof is preferred, with a carboxylic acid or a phosphoric acid being particularly preferred.

The number of the anionic group contained in each molecule of the dispersing agent may be 1 or more. In order to more improve dispersibility of the electronically conductive material, the dispersing agent may have plural anionic groups per molecule. The number of the anionic group per molecule of the dispersing agent is preferably 2 or more, more preferably 5 or more, particularly preferably 10 or more. Also, plural kinds of the anionic groups may be contained in each molecule of the dispersing agent.

Examples of the dispersing agent having an anionic polar group include "Phosphanol" (PE-510, PE-610, LB-400, EC-6103 and RE-410; these being manufactured by Toho Chemical Industry Co., Ltd.) and "Disperbyk" (-110, -111, -116, -140, -161, -162, -163, -164, -170 and -171; these being manufactured by BYK Chemie Japan).

The dispersing agent preferably further contains a cross-linkable or polymerizable functional group. Examples of the cross-linkable or polymerizable functional group include an ethylenically unsaturated group capable of undergoing cross-linking reaction or polymerization reaction to be caused by a radical species {e.g., a (meth)acryloyl group, an allyl group, a styryl group or a vinyloxy group}, a cation-polymerizable group (e.g., an epoxy group, an oxetanyl group or a vinyloxy group) and a polycondensation reaction type group (e.g., a hydrolysable silyl group or an N-methylol group), with a functional group having an ethylenically unsaturated group being preferred.

The dispersing agent to be used for dispersing the electrically conductive material for use in the antistatic layer in the invention is particularly preferably a dispersing agent having both an anionic group and a cross-linkable or polymerizable functional group, with the cross-linkable or polymerizable group being in the side chain.

The weight-average molecular weight (Mw) of the particularly preferred dispersing agent to be used in the invention is not particularly limited, but is preferably 1,000 or more. The weight-average molecular weight of the dispersing agent is more preferably from 2,000 to 1,000,000, still more preferably from 5,000 to 200,000, particularly preferably from 10,000 to 100,000.

The amount of the dispersing agent based on the amount of the dispersing agent is preferably from 1 to 50% by weight, more preferably from 5 to 30% by weight, most preferably from 5 to 20% by weight. Also, two or more dispersing agents may be used in combination thereof.

The electrically conductive material is preferably dispersed in a dispersion medium in the presence of the dispersing agent.

(Dispersion Medium)

The dispersion medium to be used is preferably a liquid having a boiling point of from 60 to 170° C. Examples of the dispersion medium include water, alcohols (e.g., methanol, ethanol, isopropanol, butanol and benzyl alcohol), ketones (e.g., acetone, methyl ethyl ketone, methyl isobutyl ketone and cyclohexanone), esters (e.g., methyl acetate, ethyl acetate, propyl acetate, butyl acetate, methyl formate, ethyl formate, propyl formate or butyl formate), aliphatic hydrocarbons (e.g., hexane and cyclohexane), halogenated hydrocarbons (e.g., methylene chloride, chloroform and carbon tetrachloride), aromatic hydrocarbons (e.g., benzene, toluene and xylene), amides (e.g., dimethylformamide, dimethylacetamide and n-methylpyrrolidone), ethers (e.g., diethyl ether, dioxane and tetrahydrofuran) and ether alcohols (e.g., 1-methoxy-2-propanol). Of these, toluene, xylene, methyl ethyl ketone, methyl isobutyl ketone, cyclohexanone and butanol are preferred.

Particularly preferred dispersion media are methyl ethyl ketone, methyl isobutyl ketone and cyclohexanone.

(Dispersion of the Electrically Conductive Material)

The electrically conductive material is preferably dispersed in a dispersing machine. Examples of the dispersing machine include a sand grinder mill (e.g., a beads mill with pins), a dynomil, a high-speed impeller mill, a pebble mill, a roller mill, an attritor and a colloid mill. Media dispersing machines such as the sand grinder mill and the dynomil are particularly preferred. Also, preliminary dispersion treatment may be performed. Examples of the dispersing machine to be used in the preliminary dispersion treatment include a ball mill, a three-roll mill, a kneader and an extruder.

The electrically conductive material is preferably rendered as fine as possible in the dispersion medium. The weight-average particle size of the conductive material is from 1 to 200 nm, preferably from 5 to 150 nm, still more preferably from 10 to 100 nm, particularly preferably from 10 to 80 nm. When rendered fine to a size of 200 nm or less, the electrically conductive material enables one to form the antistatic layer without spoiling transparency.

The antistatic layer to be used in the invention preferably contains a binder of an organic compound in addition to the electrically conductive material. It is preferred to form a matrix of the layer by the binder and disperse therein the electrically conductive material. Thus, the antistatic layer is preferably formed by adding a binder or a binder precursor to a dispersion of the electrically conductive material in the dispersion medium. As the binder or the binder precursor, non-curable thermoplastic resins or curable resins such as thermosetting resins and ionizing radiation-curable resins may be used.

[Film-Forming Binder]

In the invention, use of a compound having an ethylenically unsaturated group as a major component of a film-forming binder in the film-forming composition for forming the layers such as the antistatic layer, the hard coat layer and the high (middle) refractive index layer is preferred in view of film strength, stability of a coating solution and productivity of coated film. The phrase "major component of a film-forming binder" as used herein means a component which accounts for 10% by weight, preferably from 20% by weight to 100% by weight, still more preferably from 30% by weight to 95% by weight, of the film-forming components excluding the inorganic fine particles (including pore-containing fine particles with a layer containing the pore-containing fine particles).

The film-forming binder is preferably a polymer having a saturated hydrocarbon chain or a polyether chain as a main chain, with a polymer having a saturated hydrocarbon chain being more preferred. As a binder polymer having a saturated hydrocarbon chain as a main chain and having a cross-linked structure, a (co)polymer of a monomer having two or more ethylenically unsaturated groups is preferred. In order to render a formed layer to have a high refractive index, it is preferred for the monomer to have in its structure an aromatic ring or at least one atom selected from among halogen atoms other than fluorine atom, a sulfur atom, a phosphorus atom and a nitrogen atom.

Examples of the monomer having two or more ethylenically unsaturated group include esters between a polyhydric alcohol and (meth)acrylic acid {e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate and polyester polyacrylate}; vinylbenzene and the derivatives thereof (e.g., 1,4-divinylbenzene, 2-acryloylethyl 4-vinylbenzoate and 1,4-divinylcyclohexanone); vinylsulfones (e.g., divinylsulfone); acrylamides (e.g., methylenebisacrylamide); and methacrylamides. These monomers may be used in combination of two or more thereof. Additionally, in this specification, "(meth)acrylate" means "acrylate or methacrylate".

Specific examples of a high refractive index monomer include bis(4-methacrylolthiophenyl)sulfide, vinylnaphthalene, vinylphenylsulfide and 4-methacryloxyphenyl 4-methoxyphenyl thioether. These monomers may also be used in combination of two or more thereof.

In the invention, a polymer having a polyether as a main chain may also be used. As the polymer, a ring-opening polymerization product of a multifunctional epoxy compound is preferred. Ring-opening polymerization of the multifunctional epoxy compound can be conducted by irradiation with ionizing radiation or by heating in the presence of a photo acid generator or a thermal acid generator.

In place of or in addition to the monomer having two or more ethylenically unsaturated groups, a monomer having a cross-linkable functional group may be used to introduce a cross-linkable functional group into the polymer and introduce a cross-linked structure by the reaction of the cross-linkable functional group into the binder polymer.

Examples of the cross-linkable functional group include an isocyanate group, an epoxy group, an aziridine group, an oxazoline group, an aldehyde group, a carbonyl group, a hydrazine group, a carboxyl group, a methylol group and an active methylene group. Vinylsulfonic acids, acid anhydrides, cyanoacrylate derivatives, melamine, etherified methylol, esters and urethane, and metal alkoxides such as tetramethoxysilane may also be utilized as monomers for introducing the cross-linked structure. Functional groups, which exhibit cross-linkable properties as a result of decomposition reaction, such as a blocked isocyanate group may also be used. That is, in the invention, the cross-linkable functional group may be a group which does not immediately show reactivity but show reactivity as a result of decomposition thereof.

The binder polymer having such cross-linkable functional group can form a cross-linked structure when heated after coating.

Polymerization of the monomer having such ethylenically unsaturated group can be conducted by irradiation with ionizing radiation or by heating in the presence of a photo radical initiator or a thermal radical initiator.

Examples of the photo radical polymerization initiator include acetophenones, benzoins, benzophenones, phosphine oxides, ketals, anthraquinones, thioxanthones, azo compounds, peroxides (e.g., JP-A-2001-139663), 2,3-dialkyldione compounds, disulfide compounds, fluoroamine compounds, aromatic sulfoniums, lophine dimmers, onium salts, borates, active esters, active halogens, inorganic complexes and coumarins.

Examples of acetophenones include 2,2-dimethoxyacetophenone, 2,2-diethoxyacetophenone, p-dimethylacetophenone, 1-hydroxy-dimethylphenylketone, 1-hydroxydimethyl-p-isopropylphenylketone, 1-hydroxycyclohexylphenylketone, 2-methyl-4-methylthio-2-morpholinopropiophenone, 2-benzyl-2-dimethylamino-1-(4-morpholinophenyl)-butanone, 4-phenoxydichloroacetophenone and 4-t-butyl-dichloroacetophenone.

Examples of benzoins include benzoin, benzoin methyl ether, benzoin ethyl ether, benzoin isopropyl ether, benzyldimethylketal, benzoin benzenesulfonic acid ester, benzoin toluenesulfonic acid ester, benzoin methyl ether, benzoin ethyl ether and benzoin isopropyl ether.

Examples of benzophenones include benzophenone, hydroxybenzophenone, 4-benzoyl-4'-methyldiphenylsulfide, 2,4-dichlorobenzophenone, 4,4-dichlorobenzophenone and p-chlorobenzophenone, 4,4'-dimethylaminobenzophenone (Michler's ketone) and 3,3',4,4'-tetra(t-butylperoxycarbonyl)benzophenone.

Examples of phosphine oxides include 2,4,6-trimethylbenzoyldiphenylphosphine oxide.

Examples of active esters include 1,2-octanedione, 1-[4-(phenylthio)-2-(O-benzoyloxime)], sulfonic acid esters and cyclic active ester compounds.

Specifically, compounds 1 to 21 described in Examples of JP-A-2000-80068 are particularly preferred.

Examples of onium salts include aromatic diazonium salts, aromatic iodonium salts and aromatic sulfonium salts.

Examples of borates include organic borates described in Japanese Patent No. 2,764,769, JP-A-2002-116539, and Kunz & Martin; Rad Tech '98. Proceeding April, pp. 19-22, 1998, Chicago. For example, there are illustrated compounds described in paragraph Nos. [0022] to [0027] of JP-A-2002-116539. As other specific examples of other organic boron compounds, there are specifically illustrated organoboron-transition metal coordination complexes described in JP-A-6-348011, JP-A-7-128785, JP-A-7-140589, JP-A-7-306527 and JP-A-7-292014. Specific examples thereof are ion complexes with cationic dyes.

As specific examples of active halogens, there are illustrated compounds described in Wakabayashi et al., *Bull Chem. Soc. Japan*, vol. 42, p. 2924 (1969); U.S. Pat. No. 3,905,815; JP-A-5-27830; and M. P. Hutt, *Journal of Heterocyclic Chemistry*, vol. 1 (No. 3), (1970). Particularly, oxazole compounds substituted by a trihalomethyl group and s-triazine compounds are illustrated. More preferred are s-triazine derivatives wherein at least one mono-, di- or tri-halogen-substituted methyl group is bound to the s-triazine ring. As specific examples thereof, s-triazine and oxathiazole compounds are known. Examples thereof include 2-(p-methoxyphenyl)-4,6-bis(trichloromethyl)-s-triazine, 2-(p-methoxyphenyl)-4,6-bis(trichloromethyl)-s-triazine, 2-(p-styrylphenyl)-4,6-bis(trichloromethyl)-s-triazine, 2-(3-Br-4-di(ethyl acetate)amino)phenyl-4,6-bis(trichloromethyl)-s-triazine and 2-trihalomethyl-5-(p-methoxyphenyl)-1,3,4-oxadiazole. Specifically, those compounds which are described in JP-A-58-15503, pp. 14-30, JP-A-55-77742, pp. 6-10; compounds No. 1 to No. 8 described in JP-B-60-27673 on page 287; compounds No. 1 to No. 17 described in JP-A-60-239736 on pages 443 to 444; and compounds No. 1 to 19 described in U.S. Pat. No. 4,701,399 are particularly preferred.

An example of inorganic complex is bis($\eta^5$-2,4-cyclopentadien-1-yl)-bis(2,6-difluoro-3-(1H-pyrrol-1-yl)-phenyl)titanium.

An example of coumarin is 3-kektocoumarin.

These initiators may be used independently or in combination thereof.

Various examples are also described in *Saishin UV Koka Gijutsu* (New UV curing technology), p. 159, published by K.K. Gijutsu Joho Kyokai in 1991 and *Shigaisen Koka Sisutemu* (UV ray curing system), pp. 65-148, written by Kiyomi Kato and published by Sogo Gijutsu Senta in 1989, and are useful in the invention.

As a commercially available photocleavage type photo radical polymerization initiator, Irgacure (651, 184, 819, 907, 1870 (mixed initiator of CGI-403/Irg184=7/3), 500, 369, 1173, 2959, 4265 and 4263) and OXE01) manufactured by Ciba Specialty Chemicals Co., KAYACURE (DETX-S, BP-100, BDMK, CTX, BMS, 2-EAQ, ABQ, CPTX, EPD, ITX, QTX, BTC and MCA) manufactured by Nippon Kayaku, Esacure (KIP100F, KB1, EB3, BP, X33, KTO46, KT37, KIP150 and TZT) manufactured by Sartomer Company Inc. and the combination thereof are mentioned as preferred examples.

The photo polymerization initiator is used in an amount of preferably from 0.1 to 15 parts by weight, more preferably from 1 to 10 parts by weight, per 100 parts by weight of the multifunctional monomer. In the case of using in the low refractive index layer which is the uppermost layer of the antireflection film, at least one kind of the polymerization initiators has a molecular weight of preferably from 250 to 10,000, more preferably from 300 to 2,000. When the molecular weight is within this range, there occurs less evaporation loss of the initiator and less reduction of hardness, thus such range being preferred.

In addition to the photo polymerization initiator, a photo sensitizer may be used. As specific examples of the photo sensitizer, n-butylamine, triethylamine, tri-n-butylphosphine, Michler's ketone and thioxanthone can be mentioned.

Further, aids such as azide compounds, thiourea compounds and mercapto compounds may be used independently or in combination thereof.

As a commercially available photo sensitizer, KAYACURE (DMBI, EPA) manufactured by Nippon Kayaku can be mentioned.

As the thermal radical initiator, organic or inorganic peroxides and organic azo or diazo compounds may be used.

Specifically, as the organic peroxide, benzoyl peroxide, halogenobenzoyl peroxide, lauroyl peroxide, acetyl peroxide, dibutyl peroxide, cumene hydroperoxide and butyl hydroperoxide can be mentioned and, as the inorganic peroxide, hydrogen peroxide, ammonium persulfate and potassium persulfate can be mentioned. As the azo compound, 2,2'-azobis(isobutyronitrile), 2,2'-azobis(propionitrile) and 1,1'-azobis(cyclohexanecarbonitrile) can be mentioned and, as the diazo compound, diazoaminobenzene and p-nitrobenzenediazonium can be mentioned. The thermal radical initiator is used in a range of preferably from 0.1, to 15 parts by weight, more preferably from 1 to 10 parts by weight, per 100 parts by weight of the multifunctional monomer.

Further, a photo acid generator which can be used as a photo polymerization initiator will be described in detail below.

As the acid generator, known compounds such as photo initiators for photo cationic polymerization, photo decoloring agents for dyes, photo color-changing agents or known acid generators used for microresist and the mixtures thereof are mentioned. As the acid generator, there are illustrated, for example, organic halogenated compounds, disulfone compounds and onium compounds. Of these, specific examples of the organic halogen compounds and the disulfone compounds are the same ones as described hereinbefore as the radical-generating compounds.

Examples of the onium compound include diazonium salts, ammonium salts, iminium salts, phosphonium salts, iodonium salts, sulfonium salts, arsonium salts and selenonium salts, and, for example, compounds described in paragraph Nos. [0058] to [0059] of JP-A-2002-29162 can be mentioned.

As the acid generator in the invention, the onium salts are particularly preferably used. In particular, diazonium salts, iodonium salts, sulfonium salts and iminium salts are preferred in view of photo sensitivity upon initiation of photo polymerization and material stability of the compound.

The acid generator is used in a range of from 0.1 to 15 parts by weight, more preferably from 1 to 10 parts by weight, per 100 parts by weight of the multifunctional monomer.

[High Refractive Index Layer]

[Materials for the High Refractive Index Layer]

In the invention, a high refractive index layer is preferably provided. The high refractive index layer can be formed by freely combining the film-forming binder, mat particles for imparting glare-reducing properties or internally scattering properties, and inorganic fillers for providing a high refractive index, preventing contraction due to cross-linking and increasing strength.

(Mat Particles)

In the high refractive index layer may be incorporated mat particles having an average particle size of from 0.1 to 5.0 µm, preferably from 1.5 to 3.5 µm, larger than the filler particles, such as inorganic compound particles or resin particles for the purpose of imparting glare-reducing properties or internally scattering properties. When the difference in refractive index between the mat particles and the binder is too large, there results a white turbid film whereas, when too small, there results an insufficient light-diffusing effect. Hence, the difference is preferably from 0.02 to 0.20, particularly preferably from 0.04 to 0.10. As to the addition amount of the mat particles to the binder, too, a too large amount leads to formation of a white turbid film, whereas a too small amount fails to provide a sufficient light-diffusing effect, as is the same with the refractive index. Hence, the amount is preferably from 3 to 30% by weight, particularly preferably from 5 to 20% by weight.

As specific examples of the mat particles, particles of inorganic compound such as silica particles and $TiO_2$ particles and resin particles such as benzoguanamine resin particles are preferably mentioned. Among them, cross-linked styrene particles, cross-linked acrylic particles and silica particles are preferred.

The shape of the mat particles may be either of a truly spherical shape and an amorphous shape.

Two or more different kinds of mat particles may be used in combination thereof. In the case of using two or more kinds of mat particles, the difference in refractive index between the two kinds of particles is preferably from 0.02 to 0.10, particularly preferably from 0.03 to 0.07, in order to permit effective control of the refractive index by mixing them.

It is also possible to impart glare-reducing properties with matting particles having a larger particle size and impart other optical properties with matting particles having a smaller particle size. For example, in the case of applying an optical film to a highly fine display as fine as 133 ppi or more, it is required to give no inconvenience of optical properties called glare. Such glare is caused by non-uniform luminance on the film surface due to pixels enlarged or contracted by unevenness (contributing to reduce glaring) on the film surface, but can be largely reduced by using in combination mat particles having a smaller particle size than that of mat particles for imparting glare-reducing properties and having a refractive index different from that of the binder.

Further, the particle size distribution of the mat particles is most preferably a monodisperse distribution and, the more the particle size of each particle becomes of the same size, the better. For example, when particles having a particle size larger than the average particle size by 20% are defined as coarse particles, the proportion of the coarse particles is preferably 1% or less in number based on the total number of particles, more preferably 0.1% or less, still more preferably 0.01% or less. Mat particles having such particle size distribution can be obtained by classifying after common synthesis reaction, and a mat agent having a more preferred distribution can be obtained by increasing the number of times of classification or strengthen the degree of classification.

The mat particles are incorporated in the high refractive index layer so that the amount of mat particles in the formed high refractive index layer becomes preferably from 10 to 1000 mg/m$^2$, more preferably from 100 to 700 mg/m$^2$.

The particle size distribution of mat particles is measured according to Coulter counter method, and the measured distribution is converted to particle number distribution.

(Inorganic Filler)

In order to adjust refractive index of the layer, the high refractive index layer preferably contains inorganic fillers comprising an oxide of at least one metal selected from among titanium, zirconium, aluminum, indium, zinc, tin, antimony and silicon and having an average particle size of 0.2 μm or less, preferably 0.1 μm or less, more preferably 0.06 μm or less.

Also, in the high refractive index layer using high refractive index mat particles, it is preferred to use an oxide of silicon as a filler in order to enlarge difference in refractive index from the mat particles and keep the refractive index of the layer at a low level. The preferred particle size thereof is the same as with the aforementioned inorganic fillers. The aforesaid pore-containing organic fine particles to be preferably used in the invention may be used as well for this purpose.

Specific examples of the inorganic filler to be used in the high refractive index layer include $TiO_2$, $ZrO_2$, $Al_2O_3$, $In_2O_3$, ZnO, $SnO_2$, $SbO_3$, ITO and $SiO_2$, with $TiO_2$ and $ZrO_2$ being particularly preferred in view of attaining high refractive index. It is also preferred to subject the inorganic filler to silane coupling treatment or titanium coupling treatment. A surface treating agent having a functional group capable of reacting with the binder species is preferably applied to the filler surface.

The addition amount of the inorganic filler is preferably from 10 to 90% by weight, more preferably from 20 to 80% by weight, particularly preferably from 30 to 70% by weight, based on the total weight of the high refractive index layer.

Additionally, such filler has a particle size enough smaller than the wavelength of light not to cause scattering of light, and a dispersion of the filler in a binder polymer behaves as an optical uniform substance.

The refractive index of the bulk of a mixture of the binder and the inorganic filler for the high refractive index layer in the invention is preferably from 1.48 to 2.00, more preferably from 1.50 to 1.80. In order to adjust the refractive index to the above-mentioned range, it suffices to properly select kinds and proportions of the binder and the inorganic filler. Selection of proper kinds and proportions can easily be made by preliminary experiments. The thickness of the high refractive index layer is not particularly limited, and is preferably 50 nm to 10 μm, more preferably from 80 nm to 8 μm.

[Middle Refractive Index Layer]

It is also preferred to provide a middle refractive index layer having a lower refractive index than that of the high refractive index layer and a higher refractive index than that of the support in the antireflection film of the invention. The middle refractive index layer can be formed similarly with the high refractive index layer by adjusting the amounts of the high refractive index filler and the high refractive index monomer to be used for the high refractive index layer.

The antireflection film of the invention thus formed using the mat particles has a haze value in a range of generally from 3 to 70%, preferably from 4 to 60%, and has an average reflectance for light of 450 nm to 650 nm in a range of generally 3.0% or less, preferably 2.5% or less. An antireflection film having a haze value and an average reflectance in the above-described ranges, respectively, can provide good glare-reducing properties or internally scattering properties and antireflection properties without accompanied by deterioration of a transparent image.

[Support]

As a support of the antireflection film of the invention, a plastic film is preferably used. As a polymer for forming the plastic film, a cellulose ester film (e.g., triacetyl cellulose, diacetyl cellulose, typically "TAC-TD80U" or "TAC-TD80UF" manufactured by Fuji Photo Film Co., Ltd.), polyamide, polycarbonate, polyester (e.g., polyethylene terephthalate or polyethylene naphthalate), polystyrene, polyolefin, norbornene series resin ("Arton" manufactured by JSR Corp.) and amorphous polyolefin ("Zeonex" manufactured by Zeon Corp.) are illustrated. Of these, triacetyl cellulose, polyethylene terephthalate and polyethylene naphthalate are preferred, with triacetyl cellulose being particularly preferred. Also, a cellulose acylate film substantially not containing halogenated hydrocarbons such as dichloromethane and a process for its production are described in *Hatsumei Kyokai Kokai Giho* (Kogi No. 2001-1745; published on 15, Mar. 2001; hereinafter abbreviated as "Kokai Giho No. 2001-1745"), and the cellulose acylate described therein can also be preferably used in the invention.

[Saponification Treatment]

In the case of using the antireflection film of the invention in a liquid display device, it is disposed on the outermost surface of the display by, for example, providing an adhesive layer on one side of the film. With an antireflection film wherein triacetyl cellulose is used as a support, it is economically previous to use the antireflection film of the invention as a protective film since triacetyl cellulose is often used as a protective film for protrecting a polarizing film of a polarizing plate.

In the case where the antireflection film of the invention is disposed on the outermost surface of a display by, for example, providing an adhesive layer on one side of the film or is used as it is as a protective film for a polarizing plate, it is preferred to conduct saponification treatment after formation of the outermost layer on the support in order to improve adhesion properties thereof. Such saponification treatment is performed according to a known method by, for example, dipping the film in an alkaline solution for an adequate period of time. After dipping the film in the alkaline solution, the film is preferably sufficiently washed with water or dipped in a dilute acid to thereby neutralize the alkali component.

The saponification treatment renders hydrophilic the opposite surface of the support to the side having the outermost layer. The thus hydrophilized surface is particularly effective for improving adhesion properties to a polarizing film containing polyvinyl alcohol as a major component. Also, since dust in the atmosphere difficultly deposits on the hydrophilized surface, dust becomes difficult to enter between the polarizing film and the antireflection film upon adhesion of the antireflection film to the polarizing film, thus such treatment being effective for preventing spot defects due to existence of dust.

The saponification treatment is preferably performed so that the surface of a support on the opposite side to the side having the outermost layer has a contact angle for water of 40° or less, more preferably 30° or less, particularly preferably 20° or less.

Specific means for the saponification treatment is selected between following means (1) and (2). Means (1) is excellent in that it enables one to treat the film in the same step as that for general-purpose triacetyl cellulose film. However, since the antireflective layer of the antireflection film is simultaneously saponification-treated, there may arise the problems that the surface of the layer is hydrolyzed with alkali to suffer deterioration and that, when left on the layer, the saponification-treating solution can form a stain. In such occasion, means (2) is excellent though a special step becomes necessary.

A low refractive index layer containing a component having at least either of the fluoroalkyl moiety and the dialkylsiloxane moiety, which can preferably be used in the invention, permits to employ the means (1) because of its high durability against alkali saponification.

(1) The back surface of an antireflection film is subjected to the saponification treatment by dipping the film at least one time in an alkali solution after forming the antireflection film on the support.

(2) Only the back surface of the film is subjected to the saponification treatment by coating an alkali solution, before or after forming an antireflection film on a support, on the side opposite to the side of a support on which side an antireflective layer is to be formed or has been formed, and then conducting heating, washing with water and/or neutralizing.

In the invention, the following conditions are mentioned as standard conditions for the saponification. However, a polarizing plate in a state of having been processed into the polarizing plate by saponifying in a continuous treatment common in polarizing plate-producing steps is also defined as "a polarizing plate having a saponified antireflection film" of the invention.

Standart conditions for saponification:
The antireflection film is to be treated and dried in the following steps.
Alkali bath: 1.5 mol/L NaOH aqueous solution; 55° C.-120 sec
First water bath for washing: city water; 60 sec
Neutralizing bath: 0.05 mol/L sulfuric acid; 30° C.-20 sec
Second water bath for washing: city water; 60 sec
Drying: 120° C., 60 sec

[Method for Forming a Coated Film]

The antireflection film of the invention can be formed according to the following method which, however, is not limitative at all.

First, a coating solution comprising a composition containing components for forming each layer is prepared. The coating solution is coated on a support according to a dip coating method, an air knife coating method, a curtain coating method, a roller coating method, a wire bar coating method, a gravure coating method or an extrusion coating method (see, U.S. Pat. No. 2,681,294), and then heated and dried.

Of these coating methods, a gravure coating, which enables one to coat a small amount of the coating solution in a highly uniform thickness, is particularly preferred for forming each layer of the antireflective layer. Among the gravure coating method, a microgravure coating method capable of forming a film with a highly uniform thickness is more preferred.

Also, a die coating method permits to coat a small amount of the coating solution in a highly uniform thickness. In addition, since metering is previously conducted in the die coating method, it is comparatively easy to control the thickness of the film and, further, evaporation of a solvent in the coating section is small, thus the die coating method being preferred. As a coating method of applying a thin layer coating solution of several-ten microns or less in wet film thickness to a plastic film by using, for example, a particular slot die or a coating method, those methods are also preferred which are described in JP-A-2003-200097, JP-A-2003-211052, JP-A-2003-230862, JP-A-2003-236434, JP-A-2003-236451, JP-A-2003-245595, JP-A-2003-251260, JP-A-2003-260400, JP-A-2003-260402, JP-A-2003-275652 and JP-A-2004-141806 are preferred as well. Two or more layers may be coated simultaneously. As to simultaneously coating methods, descriptions are found in U.S. Pat. Nos. 2,761,791, 2,941,898, 3,508,947 and 3,526,528 and Yuji Harazaki; *Kotingu Kogaku* (Coating Technology), p. 253, published by Asakura Shoten (1973).

<Polarizing Plate>

A polarizing plate is mainly constituted by a polarizing film sandwiched between two protective films. The antireflection film of the invention is preferably used as at least one of the two protective films sandwiching the polarizing film therebetween. Production const on the polarizing plate can be reduced by using the antireflection film of the invention also as the protective film. Also, use of the antireflection film of the invention as the outermost layer serves to provide a polarizing plate which prevents reflection of outer light, reduces the traces of deposited water droplets and has excellent scratch resistance and stain-proof properties.

[Polarizing Film]

As the polarizing film, a known polarizing film or a polarizing film cut out of a continuous polarizing film having an absorption axis neither parallel nor vertical to the longitudinal direction may be used. The continuous film having an absorption axis neither parallel nor vertical to the longitudinal direction is prepared by the following method.

That is, such polarizing film can be produced by a stretching method of imparting tension to a continuously fed polymer film with gripping both edges of the film by gripping means so that the film is stretched at least 1.1 to 20.0 times in the film width direction, said gripping means on both edges proceeding at different speeds from each other by within 3% in the longitudinal direction and the film-proceeding direction being bent while gripped at both edges thereof so that the angle between the proceeding direction of the film at the outlet of the film edge-gripping step and the substantially stretching direction of the film becomes 20 to 70°. In particular, films stretched at a slant angle of 45° are preferably used in view of productivity.

As to the method of stretching a polymer film, detailed descriptions are given in JP-A-2002-86554, paragraphs [0020] to [0030].

<Image Display Device>

The image display device of the invention is characterized in that the antireflection film or the polarizing plate of the invention having the antireflection film as a protective film is disposed on the image display surface. Thus, the antireflection film or the polarizing plate of the invention having the antireflection film as a protective film can be applied to an image display device such as a liquid crystal display device (LCD) or an organic EL display. The image display device of the invention is preferably applied to a transmission type, reflection type or semi-transmission type liquid crystal display device of any mode of TN, STN, IPS, VA and OCB. Detailed descriptions thereon will be given below.

[Liquid Crystal Display Device]

As the liquid crystal display device, any of conventionally known devices may be used. For example, those which are described in *Hanshagata Kara LCD Sogo Gijutsu*, supervised by Tatsuo Uchida and published by K.K. CMC in 1999; *Furatto Paneru Disupurei no Shintenkai*, published by Toray Research Center, Chosa Bumon in 1996; and *Ekisho Kanren Shijo no Genjo to Shorai Tenbo* (Jokan), (Gekan), published by Fuji Kimera Soken K.K. in 2003 can be mentioned.

Specifically, the film or the polarizing plate can preferably be used in transmission type, reflection type or semi-transmission type liquid display devices of, for example, twisted nematic (TN) mode, super-twisted nematic (STN) mode, vertical alignment (VA) mode, inplane switching (IPS) mode or optically compensated bend cell (OCB) mode.

[TN Mode Liquid Crystal Display Device]

TN mode liquid crystal cells are most popularly utilized in color TFT liquid crystal display devices, and descriptions thereon are given in many literatures. In a black display, the TN mode liquid crystal cell is in such alignment that rod-like liquid crystal molecules are in a vertical alignment in the central portion of the cell and the rod-like liquid crystal molecules are in a horizontal alignment in the vicinity of the substrate of the cell.

[OCB Mode Liquid Crystal Display Device]

An OCB mode liquid crystal cell is a bend alignment mode liquid crystal cell wherein rod-like liquid crystal molecules are aligned in substantially reverse directions (symmetrically) in the upper portion and the lower portion of the liquid crystal cell. A liquid crystal display device using the bend alignment mode liquid crystal cell disclosed in U.S. Pat. Nos. 4,583,825 and 5,410,422 has a liquid crystal cell wherein the liquid crystal molecules are symmetrically aligned in the upper portion and the lower portion, and hence the bend alignment mode liquid crystal cell has a self optically compensating function. Therefore, this liquid crystal mode is also called OCB (Optically Compensatory Bend) liquid crystal mode.

In a black display, similarly with the TN mode, the OCB mode liquid crystal cell is in such alignment that rod-like liquid crystal molecules are in a vertical alignment in the central portion of the cell and the rod-like liquid crystal molecules are in a horizontal alignment in the vicinity of the substrate of the cell.

[VA Mode Liquid Crystal Display Device]

In a VA mode liquid crystal cell, rod-like liquid crystal molecules are substantially vertically aligned when no voltage is applied thereto.

The VA mode liquid crystal cell includes (1) a VA mode liquid crystal cell of a narrow sense (described in JP-A-2-176625) wherein rod-like liquid crystal molecules are in a substantially vertical alignment when no voltage is applied thereto and in a substantially horizontal alignment when voltage is applied thereto;

(2) an MVA mode liquid crystal cell wherein VA mode is made into a multi-domain form for enlarging a viewing angle [described in SID97, Digest of Tech. Papers 28 (1997), 845];

(3) a mode (n-ASM mode) liquid crystal cell wherein rod-like liquid crystal molecules are in a substantially vertical alignment when no voltage is applied thereto and in a twist multi-domain alignment when voltage is applied thereto [described Japanese liquid crystal symposium paper 58-59 (1998)]; and (4) a SURVAIVAL mode liquid crystal cell (presented at LCD international 98).

[IPS Mode Liquid Crystal Display Device]

In an IPS mode liquid crystal cell wherein liquid crystal molecules are rotatable always in a horizontal plane with respect to the substrate, the liquid crystal molecules which are aligned at some angle with respect to the longitudinal direction of electrodes upon no voltage being applied turn to the direction of an electric field when the electric field is applied thereto. The light transmittance can be changed by disposing polarizing plates so as to sandwich the liquid crystal cell at a given angle.

As liquid crystal molecules, molecules of nematic crystal having a positive dielectric anisotropy, $\Delta\epsilon$, are used. The thickness of the liquid crystal layer (gap) be more than 2.8 µm and less than 4.5 µm. This serves to provide transmittance characteristics showing almost no dependence upon wavelength in the range of visible light when retardation $\Delta n \cdot d$ is more than 0.25 µm and less than 0.32 µm. Additionally, the thickness (gap) of the liquid crystal layer is controlled with polymer beads. Needless to say, a similar gap can be obtained by using glass beads, fibers or a resin-made columnar spacer. The liquid crystal molecules are not particularly limited as long as they are nematic liquid crystal molecules. A larger dielectric anisotropy, $\Delta\epsilon$, permits to more reduce the driving voltage, whereas a smaller refractive index anisotropy, $\Delta n$, permits to more increase the thickness (gap) of the liquid crystal layer, and shorten the time for encapsulating the liquid crystal with a less scatter of gap.

[Other Liquid Crystal Mode]

As to an STN mode liquid crystal display device, the polarizing plate of the invention can be applied according to the same concept as described above. The same can be also applied to ECBmode.

Also, the polarizing plate can be used as a polarizing plate for reflection type liquid crystal or as a surface protecting plate for an organic EL display in order to reduce light reflected from the surface or interior portion thereof by combining the polarizing plate with a λ/4 plate.

EXAMPLES

The invention will be described in more detail by reference to Examples which, however, are not to be construed as limiting the invention in any way. Additionally, unless otherwise specified, "parts" and "%" are by weight.

<Antireflection Film>
[Preparation of Inorganic Fine Particles]

Preparation Example 1

Preparation of Inorganic Fine Particles (Pc-1)

360 g of ethyl silicate (content of $SiO_2$: 28%) and 530 g of methanol were mixed with each other and, at 25° C., 100 g of pure water and aqueous ammonia (containing ammonia in a content of 28%) were dropwise added to the mixture, followed by stirring for 24 hours to ripen. The product was then heat-treated at 180° C. for 4 hours in an autoclave, and the solvent was replaced by ethanol using an ultrafilter to prepare a dispersion of inorganic fine particles (Pc-1) containing solid components in a content of 20%. Observation of the particles under a transmission type electron microscope revealed that the particles were porous particles.

Preparation Example 2

Preparation of Inorganic Fine Particles (Pc-2)

900 g of pure water and 800 g of ethanol were added to 100.0 g of the dispersion of inorganic fine particles (Pc-1) prepared in Preparation example 1 and, after heating the resulting mixture to 30° C., 360 g of ethyl silicate (content of $SiO_2$: 28%) and 626 g of 28% aqueous ammonia were added to the mixture to thereby form a silica outer shell layer composed of a hydrolysis polycondensation product of ethyl silicate on the surface of each particle surface. Subsequently, the mixture was concentrated to a solid concentration of 5% in an evaporator, and then 15% aqueous ammonia was added thereto to adjust pH of the mixture to pH10, followed by heat-treating at 180° C. for 4 hours in an autoclave and replacing the solvent by ethanol using a ultrafilter, thus a dispersion of inorganic fine particles (Pc-2) containing solid components at a content of 20% being prepared.

Preparation Example 3

Preparation of Inorganic Fine Particles (Pc-3)

(First Preparation Step)
10 g of a silica sol of 5 nm in average particle size and 20% in $SiO_2$ content was mixed with 190 g of pure water to prepare a reactive mother liquor, followed by heating it to 95° C. The pH of the reactive mother liquor was found to be 10.5. Subsequently, to the mother liquor were simultaneously added 24,900 g of a sodium silicate aqueous solution containing 1.5% of $SiO_2$ and 36,800 g of a sodium aluminate aqueous solution containing 0.5% of $Al_2O_3$, during which the temperature of the reaction solution was kept at 91° C. After completion of the addition, the reaction solution was cooled to room temperature, and washed through a ultrafilter to prepare a dispersion of $SiO_2.Al_2O_3$ porous substance precursor particles containing solid components in a content of 20%.

(Second Preparation Step)
Subsequently, 500 g of the dispersion of the porous substance particles was taken out, 1,700 g of pure water was added thereto, and the resulting mixture was heated to 98° C. Then, while keeping this temperature, to this mixture was added 2,100 g of a silicic acid aqueous solution ($SiO_2$ content: 3.5%) obtained by removing alkali from a sodium silicate aqueous solution with cation-exchange resin to thereby form a silica protective film on the surface of each particle of the porous substance precursor. The thus-obtained dispersion of the porous substance precursor particles was washed through an ultrafilter to adjust the solid content to 13%. Thereafter, 1,125 g of pure water was added to 500 g of the dispersion of the porous substance precursor, and concentrated hydrochloric acid (35.5%) was dropwise added thereto to adjust the pH to 1.0. After conducting a treatment of removing aluminum, the dissolved aluminum salt was separated with an ultrafilter while adding thereto 10 L of pH3 hydrochloric acid aqueous solution and 5 L of pure water, thus a dispersion of particle precursor being prepared.

(Third Preparation Step)
A mixture of 1,500 g of the particle precursor dispersion, 500 g of pure water and 1,750 g of ethanol was heated to 30° C., and 60 g of ethyl silicate ($SiO_2$ content: 28%) and 626 g of 28% aqueous ammonia were added thereto with controlling the addition rate to thereby form a silica outer shell layer composed of an ethyl silicate hydrolysis polycondensation product on the surface of the particle precursor. Thus, particles having void inside the outer shell layer were prepared. Then, the mixture was concentrated to 5% in solid content concentration, and 15% aqueous ammonia was added thereto to adjust the pH to 10. The mixture was then heat-treated at 180 C for 4 hours in an autoclave, and the solvent was replaced by ethanol using an ultrafilter to thereby prepare a dispersion of inorganic fine particles (Pc-3) containing 20% solid components.

Preparation Example 4

Preparation of Inorganic Fine Particles (Pc-4)

Inorganic fine particles (Pc-4) were prepared in the same manner as with the inorganic fine particles (Pc-3) except for changing the addition amount of ethyl silicate (content of $SiO_2$: 28%) in the third preparation step of the inorganic fine particles (Pc-3) to 120 g.

Preparation Examples 5 to 8

Preparation of Inorganic Fine Particles (Pc-5) to (Pc-8)

Particles different in particle size, amount of adsorbed water and refractive index were prepared in the same manner as with the inorganic fine particles (Pc-3) except for changing as follows.

(Changing Particle Size)
The particle size was changed by properly changing the addition period of adding the sodium silicate aqueous solution and the sodium aluminate aqueous solution in the first preparation step.

(Changing the Amount of Adsorbed Water)

The particles were prepared by controlling the amount of ethyl silicate, the amount of ammonia, timing of the addition, temperature and period in the third preparation step.

Preparation Example 9

Preparation of Inorganic Fine Particles (Pc-9)

As comparative non-porous silica fine particles, silica particles of 50 nm in average particle size, IPA-ST-L (manufactured by Nissan Kagaku K.K.; content of silica solid: 30%; solvent: isopropyl alcohol) purchased and diluted with isopropyl alcohol to a silica solid concentration of 20%.

[Evaluation of Inorganic Fine Particles]

The thus-obtained particles were evaluated in the following manner.

(Evaluation 1: Measurement of Particle Size)

A sample dispersion was diluted, and particles were scooped up on a grid and observed under a transmission type electron microscope. Particle sizes of 1000 were measured and averaged to determine the average particle size of the particles.

(Evaluation 2: Amount of Adsorbed Water)

A sample dispersion was dried in an evaporator and pulverized, and then heated to 200° C. The amount of adsorbed water was calculated according to the following numerical formula (2) as a weight loss (%) upon the heating:

Amount of absorbed water=
$100 \times (W_{20} - W_{200})/W_{200}$     Numerical formula (2):

wherein $W_{20}$ represents the initial weight upon initiation of heating, and $W_{200}$ represents the weight at the point of being heated to 200° C.

(Evaporation 3: Refractive Index of Particles)

A coated film was formed with changing the content of inorganic fine particles in the matrix according to the method described in the foregoing paragraph (measurement of refractive index of pore-containing particles) of this specification. The refractive index of the coated film was measured and extrapolated to find a refractive index at 100% in the content of the inorganic fine particles, which was taken as the refractive index of the inorganic fine particles.

Results of evaluations (1) to (3) on the inorganic fine particles are shown in

TABLE 7

| | Inorganic Fine Particles | | | |
|---|---|---|---|---|
| No. | Particle Size (nm) | Amount of Adsorbed Water (%) | Refractive Index | Note |
| Pc-1 | 40 | 7.8 | 1.18 | porous |
| Pc-2 | 50 | 6.1 | 1.30 | hollow |
| Pc-3 | 50 | 7.1 | 1.22 | hollow |
| Pc-4 | 51 | 6.1 | 1.27 | hollow |
| Pc-5 | 52 | 5.3 | 1.30 | hollow |
| Pc-6 | 67 | 5.6 | 1.27 | hollow |
| Pc-7 | 40 | 7.8 | 1.27 | hollow |
| Pc-8 | 40 | 5.6 | 1.35 | hollow |
| Pc-9 | 50 | 1.1 | 1.46 | — |

[Preparation of Antireflection Film]

Examples 1-1 to 1-5 and Comparative Examples 1-1 to 1-15

Multi-layered antireflection films shown below were prepared.

[Formation of Low Refractive Index Layer]

(Preparation of Sol Solution a)

120 Parts of methyl ethyl ketone, 100 parts of acryloyloxypropyltrimethoxysilane "KBM5103" (manufactured by Shin-Etsu Chemical Co., Ltd.) and 3 parts of diisopropoxyaluminum ethylacetoacetate were added to a reactor equipped with a stirrer and a reflux condenser and, after mixing, 30 parts of deionized water was added to the mixture. After conducting reaction at 60° C. for 4 hours, the reaction mixture was cooled to room temperature to obtain solution a. The thus-obtained sol had a weight-average molecular weight of 1,600 and, of components of oligomers and polymers, components having a molecular weight of from 1,000 to 20,000 accounted for 100%. Also, gas chromatography analysis revealed that the starting material of acryloyloxypropyltrimethoxysilane did not remain at all. The content of solid components was adjusted to 29% with methyl ethyl ketone to prepare sol solution a.

{Preparation of Inorganic Fine Particle Dispersion (A-4)}

500 Parts of a sol of the hollow silica fine particles (Pc-4) prepared in Preparation example 4 was subjected to distillation under a reduced pressure of 20 kPa while adding thereto isopropyl alcohol so that the content of silica was kept almost at a constant level, thus the solvent being replaced. To the thus-obtained silica dispersion (content of silica: 20%) were added 30 parts of acryloyloxypropyltrimethoxysilane "KBM5103" (manufactured by Shin-Etsu Chemical Co., Ltd.) and 1.5 parts of diisopropoxyaluminum ethylacetate and, after mixing, 9 parts of deionized water was added thereto. The mixture was reacted at 60° C. for 8 hours, and then cooled to room temperature, followed by adding thereto 1.8 parts of acetylacetone. 500 g of this dispersion was subjected to distillation under a reduced pressure of 20 hPa while adding thereto cyclohexanone so that the content of silica was kept almost at a constant level, thus the solvent being replaced. No contaminants were generated in the dispersion and, after adjusting the solid content to 20% with cyclohexanone, the dispersion showed a viscosity of 5 mPa·s at 25° C. The remaining amount of isopropyl alcohol in the resulting inorganic fine particle dispersion (A-4) was found to be 1.5% by gas chromatography.

{Preparation of Inorganic Fine Particle Dispersions (A-1) to (A-3) and (A-5) to (A-9)}

Other inorganic fine particles than the hollow silica fine particles (Pc-4), prepared in the foregoing preparation of inorganic fine particles, were also treated according to the preparation of the inorganic fine particle dispersion (A-4) to thereby prepare corresponding inorganic fine particle dispersions (A-1) to (A-3) and (A-5) to (A-9).

{Preparation of Coating Solution (Ln-1) for Forming a Low Refractive Index Layer}

To 200 parts of methyl ethyl ketone were added 86.0 parts of the fluorine-containing copolymer (P-3) described hereinbefore (number-average molecular weight: 28,000), 6.5 parts of "DPHA" (mixture of dipentaerythritol pentaacrylate and dipentaerythritol hexaacrylate; manufactured by Nippon Kayaku), 3.0 parts of terminal methacrylate group-containing silicone "RMS-033" (manufactured by Gelest Co.) and 4.5 parts of a photo radical generator "Irgacure 369" (manufactured by Ciba Specialty Chemicals) to dissolve. Then, the mixture was diluted with cyclohexanone and methyl ethyl ketone so that the content of the whole solid components in the resulting coating solution became 6% and that the ratio of cyclohexanone to methyl ethyl ketone became 10:90. Thus, a coating solution (Ln-1) for forming a low refractive index layer was prepared.

{Preparation of a Coating Solution (Ln-2) for Forming a Low Refractive Index Layer}

To 150 parts of methyl ethyl ketone were added 46.0 parts of the fluorine-containing copolymer (P-3) described hereinbefore (number-average molecular weight: 28,000), 3.5 parts of "DPHA" (mixture of dipentaerythritol pentaacrylate and dipentaerythritol hexaacrylate; manufactured by Nippon Kayaku), 3.0 parts of terminal methacrylate group-containing silicone "RMS-033" (manufactured by Gelest Co.) and 3.5 parts of a photo radical generator "Irgacure 369" (manufactured by Ciba Specialty Chemicals) to dissolve. Then, 195 parts of the inorganic fine particle dispersion (A-1) (39.0 parts as solid components of silica+surface-treating agent) and 17.2 parts of the sol solution a (5.0 parts as solid components) were added thereto. The mixture was diluted with cyclohexanone and methyl ethyl ketone so that the content of the whole solid components in the resulting coating solution became 6% and that the ratio of cyclohexanone to methyl ethyl ketone became 10:90. Thus, a coating solution (Ln-2) for forming a low refractive index layer was prepared.

{Preparation of Coating Solutions (Ln-3) to (Ln-10) for Forming Low Refractive Index Layers}

Coating solutions (Ln-3) to (Ln-10) for forming low refractive index layers were prepared in absolutely the same manner as in preparation of the coating solution (Ln-2) for forming a low refractive index layer except for using, respectively, the dispersions (A-2) to (A-9) in place of the dispersion (A-1).

{Preparation of a Coating Solution (AS-1) for Forming an Antistatic Layer}

6.0 Parts of the following dispersing agent (B-1) having an anionic group and a methacryloyl group and 74 parts of methyl isobutyl ketone were added to 20.0 parts of commercially available, electrically conductive fine particles ATO, "antimony-doped tin oxide T-1" (specific surface area: 80 m²/g; manufactured by Mitsubishi Materials), followed by stirring the mixture.

Dispersing agent (B-1)

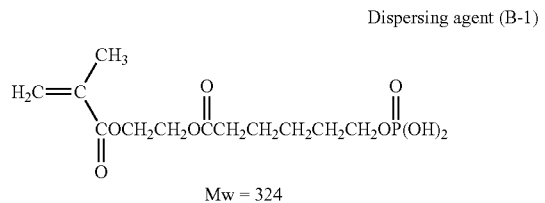

Mw = 324

ATO particles in the above liquid were dispersed using a media dispersing machine (zirconia beads of 0.1 mm in diameter being used). The weight-average particle size of the ATO particles in the dispersion was found to be 55 nm as a result of evaluation according to the light-scattering method. Thus, there was prepared an ATO dispersion.

To 100 parts of the ATO dispersion were added 6 parts of a mixture of dipentaerythritol pentaacrylate and dipentaerythritol hexaacrylate, "DPHA" (manufactured by Nippon Kayaku) and 0.8 part of a polymerization initiator "Irgacure 184" (manufactured by Nippon Ciba Geigy), followed by stirring the mixture. Thus, a coating solution (AS-1) for forming an antistatic layer was prepared. The refractive index of a coated film formed from this coating solution was found to be 1.63.

{Preparation of a Coating Solution (HC-1) for Forming a Hard Coat Layer}

To 50.0 parts of a mixture of pentaerythritol triacrylate and pentaerythritol tetraacrylate, "PETA" (manufactured by Nippon Kayaku) were added 2.0 parts of a polymerization initiator "Irgacure 184" (manufactured by Nippon Ciba Geigy), 0.075 part of the following fluorine-containing surface-improving agent (FP-1), 10.0 parts of an organosilane compound "KBM-5103" (manufactured by Shin-Etsu Chemical Co., Ltd.) and 38.5 parts of toluene, followed by stirring the mixture. The refractive index of a coated film formed by coating the solution and and curing the coating with UV rays was found to be 1.51.

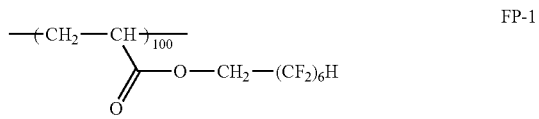

FP-1

Further, to this solution were added a 30% toluene dispersion of cross-linked polystyrene particles of 3.5 µm in average particle size "SX-350" (refractive index: 1.60; manufactured by Soken Kagaku K.K.) having been dispersed at 10,000 rpm in a polytoron dispersing machine and 13.3 parts of a 30% toluene dispersion of cross-linked acryl-styrene particles of 3.5 µm in average particle size (refractive index: 1.55; manufactured by Soken Kagaku K.K.) having been dispersed at 10,000 rpm in a polytoron dispersing machine, followed by stirring the mixture. Then, the mixture was filtered through a polypropylene-made filter of 30 µm in pore size to thereby prepare a coating solution (HC-1) for forming a glare-reducing hard coat layer. The coated film formed from this coating liquid had a refractive index of 1.51. The surface tension of the coating solution (HC-1) for forming the hard coat layer was 32 mN/m.

[Preparation of an Antireflection Film (101)]

(Formation of a Hard Coat Layer Having Glare-Reducing Properties)

The coating solution (HC-1) for forming a hard coat layer was coated on a triacetyl cellulose film of 80 µm in thickness and 1340 mm in width "TAC-TD80U" (manufactured by Fuji Photo Film Co., Ltd.) according to micro-gravure coating system at a conveying speed of 30 m/min and, after drying at 60° C. for 150 seconds, the coated layer was cured by irradiating with UV rays of 400 mW/cm² in illuminance and 150 mJ/cm² in irradiation amount using a 160 W/cm, air-cooled metal halide lamp (manufactured by Eyegraphics Co., Ltd.) while purging with nitrogen (oxygen concentration: 0.5% or less), thus a 6-µm thick, glare-reducing hard coat layer being formed. Thus, a 1,000-m long film having a hard coat layer was formed.

(Formation of an Antistatic Layer)

The coating solution (AS-1) for forming an antistatic layer was coated on the thus-obtained hard coat layer at a conveying speed of 15 m/min according to the micro-gravure coating system and, after drying at 100° C. for 150 seconds, the coated layer was cured by irradiating with UV rays of 400 mW/cm² in illuminance and 150 mJ/cm² in irradiation amount using a 160 W/cm, air-cooled metal halide lamp (manufactured by Eyegraphics Co., Ltd.) while purging with nitrogen (oxygen concentration: 0.5% or less), thus a 1.2-μm thick, glare-reducing hard coat layer being formed. Thus, a 1,000-m long film having an antistatic layer was formed.

(Formation of a Low Refractive Index Layer)

On the thus-formed antistatic layer was coated the coating solution (Ln-1) for forming a low refractive index layer so that the thickness of the low refractive index layer became 90 nm, thus an antireflection film sample (101) being prepared. The drying conditions for the low refractive index layer were 90° C. and 150 seconds, and the UV-curing conditions were 120 mW/cm$^2$ in illuminance and 240 mJ/cm2 in irradiation amount using a 240 W/cm, air-cooled metal halide lamp (manufactured by Eyegraphics Co., Ltd.) while purging with nitrogen (oxygen concentration: 0.015% by volume or less).

[Preparation of Antireflection Films (102) to (110)]

Antireflection films (102) to (110) were prepared in the same manner as with the antireflection film (101) except for using, respectively, the coating solutions (Ln-2) to (Ln-10) for forming low refractive index layers in place of the coating solution (Ln-1) for forming a low refractive index layer.

[Preparation of Antireflection Films (111) to (120)]

Antireflection films (111) to (120) were prepared in the same manner as with the antireflection films (101) to (110) except for not forming the antistatic layer.

Structures of respective layers in the resulting antireflection films (101) to (120) are shown in Table 8.

TABLE 8

| | | | Antireflection Film | | | |
|---|---|---|---|---|---|---|
| | | | Coating Solution No. For Each Layer | | | |
| | | | | | Low Refractive Index Layer | |
| | | | | | | Inorganic Fine Particles |
| | Sample No. | Hard Coat Layer | Antistatic Layer | | No. | Dispersion No. |
| Comparative Example 1-1 | 101 | HC-1 | AS-1 | Ln-1 | — | — |
| Comparative Example 1-2 | 102 | HC-1 | AS-1 | Ln-2 | Pc-1 | A-1 |
| Example 1-1 | 103 | HC-1 | AS-1 | Ln-3 | Pc-2 | A-2 |
| Comparative Example 1-3 | 104 | HC-1 | AS-1 | Ln-4 | Pc-3 | A-3 |
| Example 1-2 | 105 | HC-1 | AS-1 | Ln-5 | Pc-4 | A-4 |
| Example 1-3 | 106 | HC-1 | AS-1 | Ln-6 | Pc-5 | A-5 |
| Example 1-4 | 107 | HC-1 | AS-1 | Ln-7 | Pc-6 | A-6 |
| Comparative Example 1-4 | 108 | HC-1 | AS-1 | Ln-8 | Pc-7 | A-7 |
| Example 1-5 | 109 | HC-1 | AS-1 | Ln-9 | Pc-8 | A-8 |
| Comparative Example 1-5 | 110 | HC-1 | AS-1 | Ln-10 | Pc-9 | A-9 |
| Comparative Example 1-6 | 111 | HC-1 | — | Ln-1 | — | — |
| Comparative Example 1-7 | 112 | HC-1 | — | Ln-2 | Pc-1 | A-1 |
| Comparative Example 1-8 | 113 | HC-1 | — | Ln-3 | Pc-2 | A-2 |
| Comparative Example 1-9 | 114 | HC-1 | — | Ln-4 | Pc-3 | A-3 |
| Comparative Example 1-10 | 115 | HC-1 | — | Ln-5 | Pc-4 | A-4 |
| Comparative Example 1-11 | 116 | HC-1 | — | Ln-6 | Pc-5 | A-5 |
| Comparative Example 1-12 | 117 | HC-1 | — | Ln-7 | Pc-6 | A-6 |
| Comparative Example 1-13 | 118 | HC-1 | — | Ln-8 | Pc-7 | A-7 |
| Comparative Example 1-14 | 119 | HC-1 | — | Ln-9 | Pc-8 | A-8 |
| Comparative Example 1-15 | 120 | HC-1 | — | Ln-10 | Pc-9 | A-9 |

[Saponification Treatment of Antireflection Films]

The thus-obtained antireflection films were treated under the following saponifying conditions, and then dried.

Alkali bath: 1.5N NaOH aqueous solution, 55° C.-120 sec
First water-washing bath: city water; 60 seconds
Neutralizing bath: 0.1N sulfuric acid; 30° C.-20 sec
Second water-washing bath: city water; 60 sec
Drying: 120° C., 60 seconds

[Evaluation of Antireflection Films]

The thus-obtained saponified antireflection films were subjected to the following evaluations.

(Evaluation 4: Measurement of Average Reflectance)

A spectral reflectance was measured in the wavelength region of 380 to 780 nm at an incident angle of 5° using a spectrophotometer (V-550 manufactured by Nippon Bunko K.K.) and using an integrating sphere. In evaluating spectral reflectance, an average reflectance in the range of from 450 to 650 nm was employed.

With samples having been processed into polarizing plates, reflectance was measured in the form of the polarizing plate and, with films themselves or display devices not using the polarizing plate, the back surface of the antireflection film was coarsened, and then subjected to light-absorbing treatment with a black ink (to less than 10% in transmittance at 380 to 780 nm), and the reflectance was measured on a black board.

(Evaluation 5: Measurement of ΔE of Traces of Deposited Water Droplets)

The outermost surface of the antireflection film of a film, polarizing plate or image display device was horizontally placed. After leaving at 25° C. and 55% RH for 30 minutes or longer, 2.0 mL of pure water was dropwise applied thereto in about 2 seconds using a pipette (manufactured by Eppendorf Co.). Although ease of spreading of water droplet differs depending upon the surface of each antireflection film, each water droplet was spread to a circle of about 1.5 to about 2.5 cm in diameter. After leaving for 15 minutes, the water droplet was wiped off with "BEMCOT" (manufactured by Asahi Kasei Fibers Corp.). The reflection spectrum of the antireflection film was measured before and after applying the water droplet. The measurement was conducted using a spectrophotometer "Model V-550UV/Vis" manufactured by Nippon Bunko K.K., and chromaticity change (ΔE) in the CIE 1976 L*a*b* color space measured under the standard illuminant D65.

(Evaluation 6: Evaluation of Surface Resistance)

The surface resistance of the antireflection film on the side on which the low refractive index layer (outermost layer) was provided was measured under the condition of 25° C. and 60% RH using a super megohm/micro-ampere meter "TR8601" (manufactured by ADVANTEST). A common logarithm of the surface resistance (Ω/□) was determined to calculate logSR.

(Evaluation 7: Evaluation of Dust Removability)

An antireflection film was stuck onto a monitor, and dust (fiber rubbish of bedding and clothes) was sprinkled over the surface of the monitor. The dust was wiped off with a cleaning cloth to examine and evaluate removability of the dust according to the following 4 grades:

O: The dust was completely removed by wiping within 3 times.
OΔ: Although the dust was completely removed, wiping procedure was required 4 times to 6 times.
Δ: The dust remained a little after wiping 6 times.
x: The dust remained in a considerable amount.

(Evaluation 8: Evaluation of SW Scratch Resistance)

A rubbing test with a steel wool was conducted on the surface of the antireflection film on which surface side the low refractive index layer (outermost layer) was provided, using a rubbing tester.

As a rubbing member, steel wool (grade No. 0000; manufactured by Nippon Steel Wool K.K. was used, and the test was conducted under the conditions of 13 cm (one way) in rubbing distance, 13 cm/sec in rubbing speed, 500 g/cm² in load, 1 cm×1 cm in contact area of the head portion and 10 reciprocations in rubbing time. Scratches formed on the surface of the outermost layer were visually observed and evaluated according to the following 4 grades.

OO: Absolutely no scratches were observed in spite of careful observation.
O: Slight scratches were observed with careful observation.
Δ: Weak scratches were observed.
X: Conspicuous scratches were observed at a glance.

(Evaluation 9: Limit Load in the Rubbing Test with Wet Cotton Swab After Exposure to Ozone)

After processing each sample into a polarizing plate, it was stored for 192 hours (8 days) in the environment of 10 ppm in ozone concentration, 30° C. in temperature and 60% RH, then taken out into the atmosphere. A cotton swab (HEALTH REFRE (trade name) manufactured by Toyo Eizai K.K.) was fixed to the rubbing head of a rubbing tester. In a flat dish, the sample was fixed by clipping it at its top and its bottom. Then, the sample and the cotton swab were dipped in 25° C. water at a room temperature of 25° C. Under applying a load onto the cotton swab, rubbing was reciprocally repeated 20 times.

Rubbing distance (one way): 1 cm

Rubbing speed: about two reciprocations per second

Water on the surface of the sample having been subjected to the rubbing test was evaporated. Then, it was examined with the naked eye whether or not the film peels off. The test was repeated 10 times for each sample. The initial load was 100 g, and the load was increased by 50 g until film-peeling was observed 5 times or more. The load under which the film-peeling occurred less than 5 times in repeating the test 10 times was defined as the limit load. The film peeling was judged by observing a change in the reflection state with the naked eye. A higher limit load corresponds to a more excellent scratch resistance.

Results of the evaluations are shown in Table 9.

TABLE 9

| | | Antireflection Film | | | | | | |
|---|---|---|---|---|---|---|---|---|
| | Sample No. | Refractive Index of Low Refractive Index Layer | Average Reflectance (%) | Trace of Deposited Water Droplet (ΔE) | LogSR | Dust Removability | SW Scratch Resistance | Limit Load with Wet Cotton Swab After Exposure to Ozone |
| Comparative Example 1-1 | 101 | 1.47 | 1.51 | 0.06 | 9.9 | O | O | 500 |
| Comparative Example 1-2 | 102 | 1.35 | 0.95 | 3.20 | 9.9 | O | X | 300 |
| Example 1-1 | 103 | 1.39 | 1.10 | 0.45 | 9.9 | O | O | 650 |
| Comparative Example 1-3 | 104 | 1.36 | 1.00 | 2.60 | 9.9 | O | Δ | 500 |
| Example 1-2 | 105 | 1.38 | 1.07 | 0.37 | 9.9 | O | O | 700 |
| Example 1-3 | 106 | 1.39 | 1.10 | 0.08 | 9.9 | O | OO | 1000 |
| Example 1-4 | 107 | 1.38 | 1.07 | 0.09 | 9.9 | O | OO | 1000 |
| Comparative Example 1-4 | 108 | 1.38 | 1.07 | 3.00 | 9.9 | O | Δ | 450 |
| Example 1-5 | 109 | 1.42 | 1.25 | 0.09 | 9.9 | O | OO | 1000 |
| Comparative Example 1-5 | 110 | 1.46 | 1.46 | 0.08 | 9.9 | O | OO | 1000 |
| Comparative Example 1-6 | 111 | 1.47 | 2.11 | 0.06 | >14.0 | X | X | 600 |
| Comparative Example 1-7 | 112 | 1.35 | 1.47 | 2.90 | >14.0 | X | X | 350 |
| Comparative Example 1-8 | 113 | 1.39 | 1.65 | 0.43 | >14.0 | X | O | 700 |
| Comparative Example 1-9 | 114 | 1.36 | 1.53 | 2.30 | >14.0 | X | Δ | 600 |
| Comparative Example 1-10 | 115 | 1.38 | 1.61 | 0.35 | >14.0 | X | O | 750 |
| Comparative Example 1-11 | 116 | 1.39 | 1.65 | 0.07 | >14.0 | X | OO | 1000 |

TABLE 9-continued

| | | Antireflection Film | | | | | | |
|---|---|---|---|---|---|---|---|---|
| | Sample No. | Refractive Index of Low Refractive Index Layer | Average Reflectance (%) | Trace of Deposited Water Droplet (ΔE) | LogSR | Dust Removability | SW Scratch Resistance | Limit Load with Wet Cotton Swab After Exposure to Ozone |
| Comparative Example 1-12 | 117 | 1.38 | 1.61 | 0.08 | >14.0 | X | ○○ | 1000 |
| Comparative Example 1-13 | 118 | 1.38 | 1.61 | 2.80 | >14.0 | X | Δ | 500 |
| Comparative Example 1-14 | 119 | 1.42 | 1.80 | 0.08 | >14.0 | X | ○○ | 1000 |
| Comparative Example 1-15 | 120 | 1.46 | 2.05 | 0.08 | >14.0 | X | ○○ | 1000 |

The results shown in Table 9 clearly reveal the following.

The antireflection film of the invention, which has a layer containing fine pores as a low refractive index layer, which shows ΔE of traces of deposited water droplets of 0.45 or less, and which has an antistatic layer, shows a low reflectance and a reduced surface resistance and has improved dust-proof properties, thus being an excellent antistatic film. In particular, when inorganic fine particles whose water adsorption amount is 6.1% by weight or less are used, the limit load with a wet cotton swab after exposure to ozone is significantly improved, thus a low-reflective antireflection film excellent in SW scratch resistance being obtained.

Examples 2-1 to 2-7

{Preparation of a Coating Solution (Ln-11) for Forming a Low Refractive Index Layer}

To 200 parts of methyl ethyl ketone were added 23.0 parts of the fluorine-containing copolymer (P-3) described hereinbefore (number-average molecular weight: 28,000), 23.0 parts of the fluorine-containing copolymer (P-34) described hereinbefore (number-average molecular weight: 110,000), 3.5 parts of "DPHA" (mixture of dipentaerythritol pentaacrylate and dipentaerythritol hexaacrylate; manufactured by Nippon Kayaku), 3.0 parts of terminal methacrylate group-containing silicone "RMS-033" (manufactured by Gelest Co.) and 3.5 parts of a photo radical generator "Irgacure 1870" (manufactured by Ciba Specialty Chemicals) to dissolve. Subsequently, 195 parts of the inorganic fine particle dispersion (A-5) (39.0 parts as solid contents of silica+surface-treating agent) and 17.2 parts of the sol solution a (5.0 parts as solid components) prepared in Example 1 were added thereto. Then, the mixture was diluted with cyclohexanone and methyl ethyl ketone so that the content of the whole solid components in the resulting coating solution became 6% and that the ratio of cyclohexanone to methyl ethyl ketone became 10:90. Thus, a coating solution (Ln-11) for forming a low refractive index layer was prepared.

{Preparation of a Coating Solution (Ln-12) for Forming a Low Refractive Index Layer}

To 200 parts of methyl ethyl ketone were added 23.0 parts of the fluorine-containing copolymer (P-2) described hereinbefore (number-average molecular weight: 40,000), 23.0 parts of the fluorine-containing copolymer (P-5) described hereinbefore (number-average molecular weight: 50,000), 3.5 parts of "DPHA" (mixture of dipentaerythritol pentaacrylate and dipentaerythritol hexaacrylate; manufactured by Nippon Kayaku), 3.0 parts of terminal methacrylate group-containing silicone "RMS-033" (manufactured by Gelest Co.) and 3.5 parts of a photo radical generator "Irgacure 1870" (manufactured by Ciba Specialty Chemicals) to dissolve. Subsequently, 195 parts of the inorganic fine particle dispersion (A-5) (39.0 parts as solid contents of silica+surface-treating agent) and 17.2 parts of the sol solution a (5 parts as solid components) prepared in Example 1 were added thereto. Then, the mixture was diluted with cyclohexanone and methyl ethyl ketone so that the content of the whole solid components in the resulting coating solution became 6% and that the ratio of cyclohexanone to methyl ethyl ketone became 10:90. Thus, a coating solution (Ln-12) for forming a low refractive index layer was prepared.

{Preparation of a Coating Solution (Ln-13) for Forming a Low Refractive Index Layer}

To 460 parts of a photo-curable, fluorine-containing binder resin "Opstar JM5010" (trade name; manufactured by JSR; refractive index: 1.41; solid content: 10%; methyl isobutyl ketone solution) were added 3.5 parts of "DPHA" (mixture of dipentaerythritol pentaacrylate and dipentaerythritol hexaacrylate; manufactured by Nippon Kayaku), 3.0 parts of terminal methacrylate group-containing silicone "RMS-033" (manufactured by Gelest Co.), 0.5 part of a photo radical generator "Irgacure 1870" (manufactured by Ciba Specialty Chemicals) and 3.0 parts of "F3035" (manufactured by NOF Corp.) to dissolve. Subsequently, 195 parts of the inorganic fine particle dispersion (A-5) (39.0 parts as solid contents of silica+surface-treating agent) and 17.2 parts of the sol solution a (5 parts as solid components) prepared in Example 1 were added thereto. Then, the mixture was diluted with cyclohexanone, methyl isobutyl ketone and methyl ethyl ketone so that the content of the whole solid components in the resulting coating solution became 6% and that the ratio of cyclohexanone to methyl isobutyl ketone to methyl ethyl ketone became 10:30:60. Thus, a coating solution (Ln-13) for forming a low refractive index layer was prepared.

{Preparation of a Coating Solution (Ln-14) for Forming a Low Refractive Index Layer}

To 460 parts of a photo-curable, fluorine-containing binder resin "Opstar JM5025" (trade name; manufactured by JSR; refractive index: 1.42; solid content: 10%; methyl isobutyl ketone solution) were added 3.5 parts of "DPHA" (mixture of dipentaerythritol pentaacrylate and dipentaerythritol hexaacrylate; manufactured by Nippon Kayaku), 3.0 parts of terminal methacrylate group-containing silicone "RMS-033" (manufactured by Gelest Co.), 0.5 part of a photo radical generator "Irgacure 1870" (manufactured by Ciba Specialty Chemicals) and 0.5 part of "F3035" (manufactured by NOF Corp.) to dissolve. Subsequently, 195 parts of the inorganic fine particle dispersion (A-5) (39.0 parts as solid contents of silica+surface-treating agent) and 17.2 parts of the sol solution a (5 parts as solid components) prepared in Example 1 were added thereto. Then, the mixture was diluted with cyclohexanone, methyl isobutyl ketone and methyl ethyl ketone so that the content of the whole solid components in the resulting coating solution became 6% and that the ratio of cyclohexanone to methyl isobutyl ketone to methyl ethyl ketone became 10:30:60. Thus, a coating solution (Ln-14) for forming a low refractive index layer was prepared.

{Preparation of a Coating Solution (Ln-15) for Forming a Low Refractive Index Layer}

To 500 parts of methyl ethyl ketone were added 40.5 parts of "DPHA" (mixture of dipentaerythritol pentaacrylate and dipentaerythritol hexaacrylate; manufactured by Nippon Kayaku), 3.0 parts of terminal methacrylate group-containing silicone "RMS-033" (manufactured by Gelest Co.), 3.0 parts of a photo radical generator "Irgacure 1870" (manufactured by Ciba Specialty Chemicals) and 3.0 parts of "F3035" ((manufactured by NOF Corp.) to dissolve. Subsequently, 227.5 parts of the inorganic fine particle dispersion (A-5) (45.5 parts as solid contents of silica+surface-treating agent) and 17.2 parts of the sol solution a (5 parts as solid components) prepared in Example 1 were added thereto. Then, the mixture was diluted with cyclohexanone and methyl ethyl ketone so that the content of the whole solid components in the resulting coating solution became 6% and that the ratio of cyclohexanone to methyl ethyl ketone became 15:85. Thus, a coating solution (Ln-15) for forming a low refractive index layer was prepared.

{Preparation of a Coating Solution (Ln-16) for Forming a Low Refractive Index Layer}

To 858.3 parts (51.5 parts as solid components) of "Opstar JN7228A" (thermally cross-linkable, fluorine-containing silicone polymer liquid composition (solid content: 6%; manufactured by JSR) were added 195 parts of the inorganic fine particle dispersion (A-5) (39.0 parts as solid contents of silica+surface-treating agent) and 17.2 parts of the sol solution a (5 parts as solid components) prepared in Example 1. Then, 15 parts (4.5 parts as solid components) of a colloidal silica dispersion (silica; product different from "MEK-ST" in particle size; average particle size: 45 nm; solid content: 30%; manufactured by Nissan Chemical Industries, Ltd.) and 17.2 parts of the sol solution a (5.0 parts as solid components) were added thereto. Then, the mixture was diluted with cyclohexanone and methyl ethyl ketone so that the content of the whole solid components in the resulting coating solution became 6% and that the ratio of cyclohexanone to methyl ethyl ketone became 10:90. Thus, a coating solution (Ln-16) for forming a low refractive index layer was prepared.

{Preparation of a Coating Solution (Ln-17) for Forming a Low Refractive Index Layer}

To 858.3 parts (51.5 parts as solid components) of "Opstar JTA113" (thermally cross-linkable, fluorine-containing silicone polymer liquid composition (solid content: 6%; manufactured by JSR) were added 195 parts of the inorganic fine particle dispersion (A-5) (39.0 parts as solid contents of silica+surface-treating agent), 17.2 parts of the sol solution a (5 parts as solid components), 15.0 parts (4.5 parts as solid components) of a colloidal silica dispersion (silica; product different from "MEK-ST" in particle size; average particle size: 45 nm; solid content: 30%; manufactured by Nissan Chemical Industries, Ltd.) and 17.2 parts of the sol solution a (5.0 parts as solid components). Then, the mixture was diluted with cyclohexanone and methyl ethyl ketone so that the content of the whole solid components in the resulting coating solution became 6% and that the ratio of cyclohexanone to methyl ethyl ketone became 10:90. Thus, a coating solution (Ln-17) for forming a low refractive index layer was prepared.

[Preparation of Antireflection Films (201) to (205)]

Antireflection films (201) to (205) were prepared in the same manner as with the antireflection film (106) in Example 1-4 except for using, respectively, coating solutions (Ln-11) to (Ln-15) for forming a low refractive index layer in place of the coating solution (Ln-6) for forming a low refractive index layer.

[Preparation of Antireflection Films (206) and (207)]

Antireflection films (206) and (207) were prepared in the same manner as with the antireflection film (106) in Example 1-4 except for using the coating solution (Ln-16) or (Ln-17) for forming a low refractive index layer in place of the coating solution (Ln-6) for forming a low refractive index layer.

Structures of respective layers of the thus-obtained antireflection films (201) to (207) are shown in Table 10.

TABLE 10

| | | | | Antireflection Film | | | | | |
|---|---|---|---|---|---|---|---|---|---|
| | | | | Coating Solution No. For Each Layer | | | | | |
| | | | | | Low Refractive Index Layer | | | | |
| | | | | | Polymer Components | | | | |
| | Sample No. | Hard Coat Layer | Antistatic Layer | Low Refractive Index Layer | Fluoroalkyl moiety-containing Component | Dialkylsiloxane moiety-containing Component | Other Binder | Inorganic Fine Particles | |
| | | | | | | | | No. | Dispersion No. |
| Example 1-3 | 106 | HC-1 | AS-1 | Ln-6 | P-3 | RMS-033 | DPHA | Pc-5 | A-5 |
| Example 2-1 | 201 | HC-1 | AS-1 | Ln-11 | P-3/P-34 | RMS-033 | DPHA | Pc-5 | A-5 |
| Example 2-2 | 202 | HC-1 | AS-1 | Ln-12 | P-2/P-5 | RMS-033 | DPHA | Pc-5 | A-5 |
| Example 2-3 | 203 | HC-1 | AS-1 | Ln-13 | JM5010 | RMS-033 | DPHA | Pc-5 | A-5 |
| Example 2-4 | 204 | HC-1 | AS-1 | Ln-14 | | JM5025 RMS-033 | DPHA | Pc-5 | A-5 |

TABLE 10-continued

| | | Antireflection Film | | | | | | |
|---|---|---|---|---|---|---|---|---|
| | | Coating Solution No. For Each Layer | | | | | | |
| | | | | Low Refractive Index Layer | | | | |
| | | | | Polymer Components | | | | |
| | Sample No. | Hard Coat Layer | Antistatic Layer | Low Refractive Index Layer | Fluoroalkyl moiety-containing Component | Dialkylsiloxane moiety-containing Component | Other Binder | Inorganic Fine Particles |
| | | | | | | | | No. / Dispersion No. |
| Example 2-5 | 205 | HC-1 | AS-1 | Ln-15 | — | RMS-033 | DPHA | Pc-5 / A-5 |
| Example 2-6 | 206 | HC-1 | AS-1 | Ln-16 | | JN7228A | — | Pc-5 / A-5 |
| Example 2-7 | 207 | HC-1 | AS-1 | Ln-17 | | JTA113 | — | Pc-5 / A-5 |

The thus-obtained antireflection films were subjected to the saponification treatment according to Example 1, then to the evaluations according to Example 1. Evaluation results are shown in Table 11.

TABLE 11

| | | Antireflection Film | | | | | | |
|---|---|---|---|---|---|---|---|---|
| | Sample No. | Refractive Index of Low Refractive Index Layer | Average Reflectance (%) | Trace of Deposited Water Droplet (ΔE) | LogSR | Dust Removability | SW Scratch Resistance | Limit Load with Wet Cotton Swab After Exposure to Ozone |
| Example 1-3 | 106 | 1.39 | 1.10 | 0.08 | 9.9 | ○ | ○○ | 1000 |
| Example 2-1 | 201 | 1.45 | 1.08 | 0.08 | 9.8 | ○ | ○ | 1000 |
| Example 2-2 | 202 | 1.35 | 1.08 | 0.08 | 9.9 | ○ | ○○ | 1000 |
| Example 2-3 | 203 | 1.39 | 1.04 | 0.08 | 9.9 | ○ | ○○ | 1000 |
| Example 2-4 | 204 | 1.36 | 1.06 | 0.08 | 9.9 | ○ | ○ | 1000 |
| Example 2-5 | 205 | 1.38 | 1.15 | 0.09 | 10.0 | ○ | ○○ | 1000 |
| Example 2-6 | 206 | 1.39 | 1.06 | 0.08 | 9.9 | ○ | ○ | 700 |
| Example 2-7 | 207 | 1.38 | 1.15 | 0.08 | 9.9 | ○ | ○○ | 1000 |

It is seen from the results shown in Table 11 that antireflection films showing a low reflectance, having a large SW resistance, leaving less traces of deposited water droplets and showing a good dust removability and a large limit load with a wet cotton swab after exposure to ozone can be obtained by forming a low refractive index layer containing porous or hollow inorganic fine particles which adsorb water in an amount preferred in the invention, a binder and a component having at least either of a fluoroalkyl moiety and a dialkylsiloxane moiety and providing an antistatic layer.

Examples 3-1 to 3-8 and Comparative Examples 3-1 to 3-4

{Preparation of a Coating Solution (AS-2) for Forming an Antistatic Layer}

A commercially available coating composition for forming a transparent antistatic layer, "Pertoron C-4456S-7" (solid content: 45%; manufactured by Nippon Pelnox Corporation) was used as a coating solution (AS-2) for forming an antistatic layer. "Pertoron C-4456S-7" is a coating composition for forming a transparent antistatic layer containing electrically conductive fine particles ATO dispersed with a dispersing agent. The coated film from this composition had a refractive index of 1.55.

{Preparation of a Coating Solution (HC-2) for Forming a Hard Coat Layer}

"Blight 20GNR4.6-EH" (spherical powder of benzoquanamine/melamine/formaldehyde condensate plated with nickel and gold; manufactured by Nippon Chemical Industries, Ltd.) was dispersed in a content of 0.12% in the coating solution(HC-1) for forming a hard coat layer to prepare a coating solution (HC-2) for forming a hard coat layer. {Preparation of a Coating Solution (HC-3) for Forming a Hard Coat Layer}

To 20.0 parts of a mixture of pentaerythritol triacrylate and pentaerythritol tetraacrylate, "PETA" (manufactured by Nippon Kayaku) and 20.0 parts of a mixture of dipentaerythritol pentaacrylate and dipentaerythritol hexaacrylate, DPHA" (manufactured by Nippon Kayaku) were added 33.0 parts of a colloidal silica dispersion (silica; "MEK-ST"; average particle size: 12 nm; solid content: 30%; manufactured by Nissan Chemical Industries, Ltd.), 2.0 parts of a polymerization initiator "Irgacure 184" (manufactured by Nippon Ciba Geigy), 0.75 part of the foregoing fluorine-containing surface-improving agent (FP-1), 10.0 parts of an organosilane compound "KBM-5103" (manufactured by Shin-Etsu Chemical Co., Ltd.), 38.5 parts of toluene and 5.0 parts of cyclohexanone, followed by stirring the mixture. The refractive index of a coated film formed by coating the solution and and curing the coating with UV rays was found to be 1.51. Then, the mixture was filtered through a polypropylene-made filter of 30 μm in pore size to thereby prepare a coating solution (HC-3) for forming a glare-reducing hard coat layer. The coated film formed from this coating liquid had a refractive index of 1.51. The surface tension of the coating solution (HC-1) for forming the hard coat layer was 32 mN/m.

{Preparation of a Coating Solution (HC-4) for Forming a Hard Coat Layer}

"Blight 20GNR4.6-EH" (spherical powder of benzoquanamine/melamine/formaldehyde condensate plated with nickel and gold; manufactured by Nippon Chemical Industries, Ltd.) was dispersed in a content of 0.12% in the coating solution(HC-3) for forming a hard coat layer to prepare a coating solution (HC-4) for forming a hard coat layer.

{Preparation of a Coating Solution (HC-5) for Forming a Hard Coat Layer}

To 285.0 parts of a transparent high refractive index hard coat material "DeSolite Z7404" (manufactured by JSR) containing fine particles of zirconium oxide were added 85.0 parts of a mixture of dipentaerythritol pentaacrylate and dipentaerythritol hexaacrylate, "DPHA" (manufactured by Nippon Kayaku), 8.0 parts of an organosilane compound "KBM-5103" (manufactured by Shin-Etsu Chemical Co., Ltd.), 80.0 parts of methyl isobutyl ketone and 80.0 parts of methyl ethyl ketone, followed by stirring the mixture. The refractive index of a coated film formed by coating the solution and and curing the coating with UV rays was found to be 1.61. Then, the mixture was filtered through a polypropylene-made filter of 30 μm in pore size to thereby prepare a coating solution (HC-5) for forming a hard coat layer. The surface tension of the coating solution (HC-5) for forming the hard coat layer was 25 mN/m.

{Preparation of a Coating Solution (HC-6) for Forming a Hard Coat Layer}

"Blight 20GNR4.6-EH" (spherical powder of benzoquanamine/melamine/formaldehyde condensate plated with nickel and gold; manufactured by Nippon Chemical Industries, Ltd.) was dispersed in a content of 0.12% in the coating solution (HC-5) for forming a hard coat layer to prepare a coating solution (HC-6) for forming a hard coat layer.

{Preparation of a Coating Solution (HC-7) for Forming a Hard Coat Layer}

To 285.0 parts of a transparent high refractive index hard coat material "DeSolite Z7404" (manufactured by JSR) containing fine particles of zirconium oxide were added 85.0 parts of a mixture of dipentaerythritol pentaacrylate and dipentaerythritol hexaacrylate, "DPHA" (manufactured by Nippon Kayaku), 8.0 parts of an organosilane compound "KBM-5103" (manufactured by Shin-Etsu Chemical Co., Ltd.), 60.0 parts of methyl isobutyl ketone and 17.0 parts of methyl ethyl ketone, followed by stirring the mixture.

To this solution were further added 35.0 parts of a 30% methyl isobutyl ketone dispersion of cross-linked PMMA particles "MXS-300" having been dispersed at 10,000 rpm in a Polytoron dispersing machine and having been intensely classified to have an average particle size of 3.0 μm (manufactured by Soken Kagaku K.K.; refractive index: 1.49) and 90.0 parts of a 30% methyl ethyl ketone dispersion of silica particles "SEAHOSTAR KE-P150" having been dispersed at 10,000 in a Polytoron dispersing machine and having an average particle size of 1.5 μm (refraqctive index: 1.46; manufactured by Nippon Shokubai), followed by stirring. Then, the mixture was filtered through a polypropylene-made filter of 30 μm in pore size to thereby prepare a coating solution (HC-7) for forming a hard coat layer. The refractive index of a coated film formed from the coating solution was found to be 1.61. The surface tension of the coating solution (HC-7) for forming the hard coat layer was 25 mN/m.

{Preparation of a Coating Solution (HC-8) for Forming a Hard Coat Layer}

"Blight 20GNR4.6-EH" (spherical powder of benzoquanamine/melamine/formaldehyde condensate plated with nickel and gold; manufactured by Nippon Chemical Industries, Ltd.) was further dispersed in a content of 0.12% in the coating solution(HC-7) for forming a hard coat layer to prepare a coating solution (HC-8) for forming a hard coat layer.

[Preparation of Antireflection Film (301)]

The coating solution (AS-2) for forming an antistatic layer was coated on coated on a triacetyl cellulose film of 80 μm in thickness and 1340 mm in width "TAC-TD80U" (manufactured by Fuji Photo Film Co., Ltd.) according to micro-gravure coating system at a conveying speed of 15 m/min and, after drying at 60° C. for 150 seconds, the coated layer was cured by irradiating with UV rays of 400 mW/cm$^2$ in illuminance and 150 mJ/cm$^2$ in irradiation amount using a 160 W/cm, air-cooled metal halide lamp (manufactured by Eyegraphics Co., Ltd.) while purging with nitrogen (oxygen concentration: 0.5% or less), thus a 1.5-µm thick antistatic layer being formed. Thus, a 1,000-m long film having an antistatic layer was formed.

The coating solution (HC-1) for forming a hard coat layer was coated on the thus-obtained antistatic layer at a conveying speed of 15 m/min according to the micro-gravure coating system and, after drying at 100° C. for 150 seconds, the coated layer was cured by irradiating with UV rays of 400 mW/cm² in illuminance and 150 mJ/cm² in irradiation amount using a 160 W/cm, air-cooled metal halide lamp (manufactured by Eyegraphics Co., Ltd.) while purging with nitrogen (oxygen concentration: 0.5% or less), thus a 5.0-µm thick hard coat layer being formed. Thus, a 1,000-m long film having a hard coat layer was formed.

On the thus-formed antistatic layer was formed a low refractive index layer having a thickness adjusted to 90 nm by using the coating solution (Ln-7) for forming a low refractive index layer, thus an antireflection film sample (301) being prepared. Drying conditions for the low refractive index layer were 90° C. and 150 seconds, and UV ray-curing conditions were 120 mW/cm² in illuminance and 240 mJ/cm² in irradiation amount using a 240 W/cm, air-cooled metal halide lamp (manufactured by Eyegraphics) while purging the atmosphere with nitrogen so that the oxygen concentration of the atmosphere became 0.01% by volume or less. The thus-cured low refractive index layer had a refractive index of 1.38.

[Preparation of Antireflection Films (302) to (308)]

Antireflection films (302) to (308) were prepared in the same manner as with the antireflection film (301) except for using, respectively, the coating solutions (HC-2) to (HC-8) for forming a hard coat layer, in place of the coating solution (HC-1) for forming a hard coat layer.

[Preparation of Antireflection Films (309) to (312)]

Antireflection films (309) to (312) were prepared in the same manner as with the antireflective films (301), (302), (307) and (308), respectively, except for not coating and curing the antistatic layer.

Structures of respective layers of the thus-obtained antireflection films (301) to (312) are shown in Table 12.

The thus-obtained antireflection films were subjected to the saponification treatment according to Example 1, then to the evaluations according to Example 1. Evaluation results are shown in Table 13.

TABLE 12

| | | Antireflection Film | | | | |
|---|---|---|---|---|---|---|
| | | Coating Solution No. For Each Layer | | | | |
| | | | | Low Refractive Index Layer | | |
| | | | Hard | | Inorganic Fine Particles | |
| | Sample No. | Antistatic Layer | Coat Layer | No. | No. | Dispersion No. |
| Example 3-1 | 301 | AS-2 | HC-1 | Ln-7 | Pc-6 | A-6 |
| Example 3-2 | 302 | AS-2 | HC-2 | Ln-7 | Pc-6 | A-6 |
| Example 3-3 | 303 | AS-2 | HC-3 | Ln-7 | Pc-6 | A-6 |
| Example 3-4 | 304 | AS-2 | HC-4 | Ln-7 | Pc-6 | A-6 |
| Example 3-5 | 305 | AS-2 | HC-5 | Ln-7 | Pc-6 | A-6 |
| Example 3-6 | 306 | AS-2 | HC-6 | Ln-7 | Pc-6 | A-6 |
| Example 3-7 | 307 | AS-2 | HC-7 | Ln-7 | Pc-6 | A-6 |
| Example 3-8 | 308 | AS-2 | HC-8 | Ln-7 | Pc-6 | A-6 |
| Comparative Example 3-1 | 309 | — | HC-1 | Ln-7 | Pc-6 | A-6 |
| Comparative Example 3-2 | 310 | — | HC-2 | Ln-7 | Pc-6 | A-6 |
| Comparative Example 3-3 | 311 | — | HC-7 | Ln-7 | Pc-6 | A-6 |
| Comparative Example 3-4 | 312 | — | HC-8 | Ln-7 | Pc-6 | A-6 |

TABLE 13

| | | Antireflection Film | | | | | |
|---|---|---|---|---|---|---|---|
| | Sample No. | Average Reflectance (%) | Trace of Deposited Water Droplet (ΔE) | LogSR | Dust Removability | SW Scratch Resistance | Limit Load with Wet Cotton Swab After Exposure to Ozone |
| Example 3-1 | 301 | 1.08 | 0.08 | 11.7 | ○△ | ○○ | 1000 |
| Example 3-2 | 302 | 1.08 | 0.08 | 10.0 | ○ | ○○ | 1000 |
| Example 3-3 | 303 | 1.04 | 0.08 | 11.7 | ○△ | ○○ | 1000 |
| Example 3-4 | 304 | 1.06 | 0.08 | 10.0 | ○ | ○○ | 1000 |
| Example 3-5 | 305 | 1.15 | 0.09 | 11.7 | ○△ | ○○ | 1000 |
| Example 3-6 | 306 | 1.06 | 0.08 | 10.0 | ○ | ○○ | 1000 |
| Example 3-7 | 307 | 1.15 | 0.08 | 11.7 | ○△ | ○○ | 1000 |
| Example 3-8 | 308 | 1.15 | 0.08 | 10.0 | ○ | ○○ | 1000 |
| Comparative Example 3-1 | 309 | 1.15 | 0.08 | >14.0 | X | ○○ | 1000 |
| Comparative Example 3-2 | 310 | 1.15 | 0.08 | >14.0 | X | ○○ | 1000 |

TABLE 13-continued

| | | Antireflection Film | | | | | |
|---|---|---|---|---|---|---|---|
| | Sample No. | Average Reflectance (%) | Trace of Deposited Water Droplet (ΔE) | LogSR | Dust Removability | SW Scratch Resistance | Limit Load with Wet Cotton Swab After Exposure to Ozone |
| Compara-tive Example 3-3 | 311 | 1.15 | 0.08 | >14.0 | X | ○○ | 1000 |
| Compa-rative Example 3-4 | 312 | 1.15 | 0.08 | >14.0 | X | ○○ | 1000 |

It is seen from the results shown in Table 13 that antireflection films having a low surface resistance, an enough dust removability and a low reflectance are obtained by providing an antistatic layer and a layer containing fine pores and imparting ΔE of 0.45 or less. In particular, it has been found that dust removability can be remarkably improved by providing a hard coat layer containing gold-plated particles on the antistatic layer.

Example 4

On samples formed by coating the coating solution (AS-2) for forming an antistatic layer and, respectively, the coating solutions (HC-1) to (HC-8) for forming a hard coat layer described in Example 3 were coated, respectively, the coating solutions (Ln-1) to (Ln-17) for forming a low refractive index layer used in Examples 1 and 2, followed by curing the coated layers to prepare samples for this Example. These samples were saponified in the same manner as in Example 1 and were subjected to evaluations according to Example 1 and, as a result, it was confirmed that the samples of the invention showed a low reflectance and an excellent dust removability, had a large SW resistance, left less traces of deposited water droplets and showed a large limit load with a wet cotton swab after exposure to ozone.

Example 5-1 and Comparative Examples 5-1 to 5-3

[Preparation of Inorganic Fine Particles]

Preparation Example 10

Preparation of Inorganic Fine Particles (Pc-10)

100 g of a silica sol of 5 nm in average particle size and 20% by mass in $SiO_2$ content was mixed with 1900 g of pure water, and the resulting mixture was heated to 80° C. The pH of the reactive mother liquor was found to be 10.5. Subsequently, to the mother liquor were simultaneously added 9000 g of a sodium silicate aqueous solution containing 1.17% by mass of $SiO_2$ and 9000 g of a sodium aluminate aqueous solution containing 0.83% by mass of $Al_2O_3$, during which the temperature of the reaction solution was kept at 80° C. Immediately after the addition, pH of the reaction solution was elevated to 12.5, which was not substantially changed with time. After completion of the addition, the reaction solution was cooled to room temperature, and washed through an ultrafilter to prepare a dispersion of $SiO_2.Al_2O_3$ primary particles containing 20% by mass of solid components.

Subsequently, to 500 g of the dispersion of the primary particles was added 1,700 g of pure water, and the resulting mixture was heated to 98° C. Then, while keeping this temperature, to this mixture were added 53,200 g of 0.5% by mass of ammonium sulfate, then, 3,000 g of a sodium silicate aqueous solution ($SiO_2$ content: 1.17% by mass) and 9,000 g of a sodium aluminate aqueous solution ($Al_2O_3$ content: 0.5% by mass) to prepare a dispersion of (1) composite oxide fine particles. Then, the resulting dispersion was washed through an ultrafilter to obtain a dispersion of (1) composite oxide fine particles (solid concentration: 13% by mass). To 500 g of the dispersion thus obtained was added 1,125 g of pure water, followed by dropwise addition of concentrated hydrochloric acid (concentration: 35.5% by mass) to adjust the pH to 1.0. After conducting a treatment of removing aluminum, the dissolved aluminum salt was separated with an ultrafilter while adding thereto 10 L of pH 3 hydrochloric acid aqueous solution and 5 L of pure water, thus a dispersion of silica fine particles (Pc-10H) (solid concentration: 20% by mass) being prepared. The solvent was replaced by ethanol using an ultrafilter to thereby prepare a dispersion of inorganic fine particles (Pc-10) containing 20% solid components.

Preparation Example 11

Preparation of Inorganic Fine Particles (Pc-11)

[Preparation of Antimony Acid]

111 g of antimony trioxide (manufacture by Sumitomo Kinzoku Kouzan (Sumitomo metal mine) Co., Ltd.: KN purity 98.5% by mass) was suspended in a solution obtained by dissolving 57 g of caustic soda (manufacture by Asahi Galasu (Asahi glass) Co., Ltd.: purity 85% by mass) in 1800 g of pure water. The suspension obtained was heated to 95° C., successively added with an aqueous solution obtained by diluting 32.8 g of hydrogen peroxide (manufacture by Hayashi Junyaku (Hayashi pure medicine) Co., Ltd.: purity 35% by mass) with 110.7 g of pure water for 9 hours (0.1 mole/hr) to dissolve antimony trioxide. Thereafter, the resulting solution was aged for 11 hours. After cooling, 1000 g of the solution obtained was taken out and the solution was diluted with 6000 g of pure water. Then, the diluted solution was passed through a cation exchange resin (manufacture by Mitsubishi Kagaku (Mitsubishi chemistry) Co., Ltd.: pk-216) to eliminate ions. The resulting solution had pH of 2.1 and electrical conductivity of 2.4 mS/cm.

Successively, to 400 g of the dispersion obtained by diluting the dispersion of the above-prepared silica fine particles (Pc-10H) to the solid content concentration of 1% by mass was added 40 g of antimony acid (solid concentration: 1% by mass). The resulting solution was stirred at 70° C. for 10 hours and concentrated by passing through an ultrafilter. Thus, a dispersion of antimony oxide-coated silica fine particles (solid concentration: 20% by mass) was prepared. The antimony oxide-coated silica fine particle had an average particle diameter of 60 nm and the antimony oxide-coated layer had a thickness of 2 nm.

To 100 g of the dispersion of antimony oxide-coated silica fine particles were added 300 g of pure water and 400 g of methanol. The resulting solution was mixed with 3.57 g of ethyl orthosilicate ($SiO_2$ content: 28% by mass) and heated at 50° C. for 15 hours with stirring to prepare a dispersion of antimony oxide-coated silica fine particles having a silica coating layer formed thereon. The solvent in the dispersion was replaced by ethanol and concentrated to the solid content concentration of 20% by mass using an ultrafilter to thereby prepare a dispersion of inorganic fine particles (Pc-11).

Preparation Example 11

Preparation of Inorganic Fine Particles (Pc-12)

Antimony oxide-coated silica fine particles (Pc-12) were prepared, wherein a silica-coated layer was formed and a surface treatment was applied, in the same manner as with the inorganic fine particles (Pc-11) except for increasing the amount of antimony acid (solid concentration: 1% by mass) of 40 g to 240 g. The antimony oxide-coated silica fine particle (Pc-12) before formation of the silica-coated layer and the surface treatment had an average particle diameter of 64 nm and the antimony oxide-coated layer had the thickness of 3 nm.

[Evaluation of Inorganic Fine Particles]

The thus-obtained particles were further evaluated in addition to the evaluation conducted in Example 1 according to the following manner.

(Evaluation 4: Measurement of Volume Resistance Value)

A ceramic cell having a cylindrical hollow portion in its inside (cross sectional area: 0.5 $cm^2$) was placed on a rest electrode. A powdery sample 0.6 g was filled inside the cell. The cylindrical projection of an upper electrode was inserted into the cell. Successively, the upper electrode and the lower electrode were pressurized by means of a hydraulic device to prepare a pellet. A resistance value (Ω) at 100 kg/$cm^2$ pressurizing and a height (cm) of the sample were measured. The volume resistance value was obtained by multiplying the resistance value by the height. The evaluation results are shown in Table 14.

TABLE 14

| No. | Inorganic Fine Particles | | | | |
|---|---|---|---|---|---|
| | Particle Size (nm) | Amount of Adsorbed Water (%) | Refractive Index | Volume resistance value Ω·cm | Note |
| Pc-10 | 58 | 7.6 | 1.30 | — | hollow |
| Pc-11 | 60 | 5.3 | 1.41 | 1500 | hollow |
| Pc-12 | 64 | 3.0 | 1.55 | 450 | hollow |

It can be seen that by coating the surface of the hollow silica particle with antimony oxide, can be obtained an inorganic fine particle having a decreased amount of adsorbed water.

[Preparation of Inorganic Fine Particles Dispersion (A-10)]

500 parts of sol of hollow silica fine particles (Pc-10) prepared in Preparation Example 10 (silica concentration 20%, ethanol dispersion) was subjected to solvent replacement by vacuum distillation at 20 kPa while adding isopropyl alcohol for substantially keeping the silica content constant. To 500 parts of the silica dispersion thus obtained (silica concentration 20%) were added 10 parts of acrylolyoxypropyl trimethoxysilane "KBM5103" (manufactured by Shinetsu Kagaku Kogyo (Shinetsu chemical industry) Co., Ltd.) and 1.5 parts of diisopropoxyaluminumethyl acetate, which were mixed. Then 3 parts of ion-exchanged water was added thereto. The resulting mixture was reacted at 60° C. for 8 hours and cooled to room temperature. Then 1.8 parts of acetyl acetone were added thereto. 500 g of this dispersion was subjected to solvent replacement by vacuum distillation at 20 hPa while adding cyclohexanone for substantially keeping the silica content constant. No foreign matters were generated in the dispersion. When the solid content concentration of the dispersion was adjusted to 20% with cyclohexanone, the dispersion showed a viscosity of 5 mPa·s at 25° C. A remaining amount of isopropyl alcohol in the inorganic fine particle dispersion obtained (A-10) was determined by gas chromatography. The remaining amount was 1.5%.

[Preparation of Inorganic Fine Particles Dispersion (A-11) and (A-12)]

(Pc-11) and (Pc-12) prepared in the foregoing preparation of inorganic fine particles were also treated according to the preparation manner of inorganic fine particles dispersion (A-10), whereby inorganic fine particles dispersion (A-11) and (A-12) were prepared.

{Preparation of a Coating Solution for Forming a Low Refractive Index Layer (Ln-18)}

To 4.48 g of a thermally crosslinkable fluorine-containing polymer (thermally setting fluorine-containing silicone polymer described in Example 1 of JP-A-11-189621), 1.13 g of a curing agent (Cymel 303: trade name, manufactured by Japan Cytec Industries Co., Ltd.), 0.11 g of a curing catalyst (Catalyst 4050: trade name, manufactured by Japan Cytec Industries Co., Ltd.), 20.0 g of an inorganic fine particle dispersion (A-11) (antimony oxide-coated silica particle, average particle diameter 60 nm, 20% as solid concentration of inorganic fine particle+surface-treating agent), 1.4 g of the sol solution a and 118 g of methylethylketone were added. The resulting solution was stirred and filtered through a polypropylene filter having a pore size of 1 μm to prepare a coating solution (Ln-18) for forming a low refractive index layer.

{Preparation of Coating Solution for Forming A Low Refractive Index Layer (Ln-19)}

Coating solution (Ln-19) for forming a low refractive index layer was prepared in absolutely same manner as in preparation of the coating solution (Ln-18) for forming a low refractive index layer except for using the dispersion (A-10) in place of the inorganic fine particle dispersion.

{Preparation of Coating Solution for Forming A Low Refractive Index Layer (Ln-20)}

Coating solution (Ln-20) for forming a low refractive index layer was prepared in absolutely same manner as in preparation of the coating solution (Ln-18) for forming a low refractive index layer except for using the dispersion (A-9) in place of the inorganic fine particle dispersion.

[Preparation of an Antireflection Film 501]

The foregoing coating solution (HC-5) for forming a hard coat layer was coated on a triacetyl cellulose film of 80l m in thickness "TAC-TD80U" (manufactured by Fuji Photo Film Co., Ltd.) according to micro-gravure coating system at a conveying speed of 15 m/min and, after drying at 100° C. for 150 seconds, the coated layer was cured by irradiating with UV rays of 400 mW/cm² in illuminance and 100 mJ/cm² in irradiation amount using a 160 W/cm, air-cooled metal halide lamp (manufactured by Eyegraphics Co., Ltd.) while purging with nitrogen (oxygen concentration: 0.5% or less), thus a 5.0-μm thick hard coat layer being formed.

On the thus-formed hard coat layer was coated the foregoing coating solution (Ln-18) for forming a low refractive index layer so that the thickness of the low refractive index layer became 90 nm, thus an antireflection film sample (501) being prepared. The drying conditions for the low refractive index layer were 90° C. and 150 seconds, followed by thermal curing at 100° C. for 10 minutes. Thereafter, UV-curing was effected at 120 mW/cm² in illuminance and 240 mJ/cm² in irradiation amount using a 240 W/cm, air-cooled metal halide lamp (manufactured by Eyegraphics Co., Ltd.) while purging with nitrogen so that oxygen concentration may be 0.01% by volume or less. Cured low refractive index layer had a refractivity of 1.43.

[Preparation of Antireflection Films (502) and (503)]

Antireflection films (502) and (503) were prepared in the same manner as with the antireflection film (501) except for using, respectively, the coating solutions (Ln-19) and (Ln-20) for forming low refractive index layers in place of the coating solution (Ln-18) for forming a low refractive index layer.

[Preparation of Antireflection Film (504)]

A hard coat film was prepared according to the same manner as in the preparation of the antireflection film (501) except for changing the thickness of the hard coat layer to 3.8 μm.

On the thus-formed hard coat layer was coated the foregoing coating solution (AS-1) for forming an antistatic layer according to micro-gravure coating system at a conveying speed of 15 m/min and, after drying at 60° C. for 150 seconds, the coated layer was cured by irradiating with UV rays of 400 mW/cm² in illuminance and 100 mJ/cm² in irradiation amount using a 160 W/cm, air-cooled metal halide lamp (manufactured by Eyegraphics Co., Ltd.) while purging with nitrogen (oxygen concentration: 0.5% or less), thus a 1.2-μm thick antistatic layer being formed.

On the thus-formed antistatic layer was coated the foregoing coating solution (Ln-20) for forming a low refractive index layer so that the thickness of the low refractive index layer became 90 nm, thus an antireflection film sample (504) being prepared. The drying and curing conditions were the same as those of (501).

Structures of respective layers in the resulting antireflection films (501) to (504) are shown in Table 15. Sample (501) has the structure of the present invention wherein the low refractive index layer also functions as the antistatic layer.

TABLE 15

| | Antireflection Film | | | | |
|---|---|---|---|---|---|
| | Coating Solution No. For Each Layer | | | | |
| | | | | Low Refractive Index Layer | |
| Sample No. | Hard Coat Layer | Antistatic Layer | Low Refractive Index Layer | Inorganic Fine Particles No. | Dispersion No. |
| Example 5-1 | 501 | HC-5 | — | Ln-18 | Pc-11 | A-11 |
| Comparative Example 5-1 | 502 | HC-5 | — | Ln-19 | Pc-10 | A-10 |
| Comparative Example 5-2 | 503 | HC-5 | — | Ln-20 | Pc-9 | A-9 |
| Comparative Example 5-3 | 504 | HC-5 | AS-1 | Ln-20 | Pc-9 | A-9 |

Antireflection films obtained were evaluated according to the manner as in Example 1. Results of the evaluations are shown in Table 16.

TABLE 16

| | | Antireflection Film | | | | | | |
|---|---|---|---|---|---|---|---|---|
| | Sample No. | Refractive Index of Low Refractive Index Layer | Average Reflectance (%) | Trace of Deposited Water Droplet (ΔE) | LogSR | Dust Removability | SW Scratch Resistance | Limit Load with Wet Cotton Swab After Exposure to Ozone |
| Example 5-1 | 501 | 1.42 | 1.20 | 0.07 | 9.6 | ○ | ○○ | 1000 |
| Comparative Example 5-1 | 502 | 1.39 | 0.99 | 3.05 | >14.0 | X | X | 300 |
| Comparative Example 5-2 | 503 | 1.44 | 1.60 | 0.07 | >14.0 | X | ○ | 1000 |
| Comparative Example 5-3 | 504 | 1.44 | 1.60 | 0.07 | 9.9 | ○ | ○ | 600 |

From the results shown in Table 16, the following will be clarified. Sample (501) wherein particles (Pc-11) which have a reduced amount of water absorption by coating the surface of silica having a large amount of water absorption with antimony oxide are used in the low refractive index layer shows a reduced surface resistance and has improved dust-proof properties. Thus, it is to be an antireflection film having a low reflectance and excellent scratch resistance. Sample (501) has such a structure that the low refractive index layer also functions as the antistatic layer. Namely, Sample (501) comprises a small number of layers for constituting the film and, therefore, is excellent in film productivity.

Example 6

{Preparation of a Coating Solution (AS-3) for Forming an Antistatic Layer}

To 110 parts of the foregoing inorganic fine particle dispersion (A-12) were added 8 parts of a mixture of dipentaerythritol pentacrylate and dipentaerythritol hexaacrylate, "DPHA" (manufactured by Nippon Kayaku) and 0.8 parts of a polymerization initiator "Irgacure 184" (manufactured by Nippon Ciba Geigy). The resulting mixture was stirred. Thus, a coating solution (AS-3) for forming an antistatic layer was prepared. The coating obtained by the coating solution showed a refractive index of 1.54.

In the preparation of antireflection films in Examples 3-1 to 3-8, the coating solution (AS-2) for forming an antistatic layer was changed to (AS-3) and the thickness of the antistatic layer after curing was adjusted to 1.5 μm. Thereafter, a hard coat layer and a low refractive index layer were coated as in Examples 3-1 to 3-8 to prepare an antireflection film.

Evaluations according to Example 3 were effected. As the result, it could be found that an antireflection film having further low refractive index was obtained, which were excellent in trace of deposited water droplet, SW scratch resistance, and limit load with wet cotton swab after exposure to ozone.

<Preparation of a Polarizing Plate Having an Antireflection Film>

Example 7

Iodine was adsorbed by a stretched polyvinyl alcohol film to prepare a polarizing film. Subsequently, the antireflection film of Example 1 having been saponification-treated was stuck onto one side of the polarizing film using a polyvinyl alcohol series adhesive so that the support side (triacetyl cellulose) of the antireflection film faced the polarizing film. A viewing angle-enlarging film having an optical compensatory layer, "Wide View Film SA 12B" (manufactured by Fuji Photo Film Co., Ltd.), was saponification-treated and stuck to the other side of the polarizing film using a polyvinyl alcohol series adhesive. Thus, a polarizing plate was prepared. As a result of evaluating the antireflection film in this polarizing plate state, it was found that the antireflection film of the invention having a layer containing fine pores as a low refractive index layer, containing porous or hollow inorganic fine particles adsorbing less amount of water, having ΔE of 0.45 or less and having an antistatic layer had a low reflectance and showed less traces of deposited water droplets.

Example 8

When each of the antireflection film samples of Examples 1 to 4 was laminated on a glass plate constituting the surface of an organic EL display device via an adhesive, there was obtained a display devices showing reduced reflection on the glass surface and showing a high viewability. Also, it was confirmed that samples containing porous or hollow inorganic fine particles adsorbing less amount of water showed less traces of water droplets.

The antireflection film of the invention has a low refractive index, difficultly leaves traces of water droplets and is excellent in dust removability. Further, the polarizing plate and the display device using the antireflection film of the invention less reflect external light and background, thus having an extremely high viewability.

The entire disclosure of each and every foreign patent application from which the benefit of foreign priority has been claimed in the present application is incorporated herein by reference, as if fully set forth.

What is claimed is:

1. An antireflection film comprising:
   a low refractive index layer containing fine pores; and
   an antistatic layer,
   wherein the low refractive index layer is in direct contact with the antistatic layer,
   wherein, when a surface of the antireflection film is brought into contact with water for 15 minutes, a wiped portion of the surface shows a chromaticity change, ΔE, of 0.45 or less in the CIE 1976 L*a*b* color space measured under a standard illuminant D65; and
   wherein the low refractive index layer containing fine pores comprises inorganic fine particles having an adsorbed water amount of 6.1% by weight or less and having a particle size of from 5 to 100 nm,
   wherein the inorganic fine particles comprise porous inorganic fine particles, hollow inorganic fine particles or a combination thereof,
   wherein said low refractive index layer is formed from at least a polymer having an alkyl fluoride moiety, a monomer having two or more ethylenically unsaturated groups in one molecule, and the inorganic fine particles,
   wherein a limit load after exposure to ozone of the antireflection film is at least about 1000 g.

2. The antireflection film as described in claim 1, wherein the inorganic fine particles comprise hollow silica fine particles having a refractive index of 1.40 or less.

3. The antireflection film as described in claim 1, wherein the inorganic fine particles have surfaces covered with an electrically conductive compound.

4. The antireflection film as described in claim 1, wherein the low refractive index layer further comprises a component having at least one of a fluoroalkyl moiety and a dialkylsiloxane moiety.

5. A polarizing plate comprising:
   a polarizing film; and
   a protective film,
   wherein the protective film is the antireflection film described in claim 1.

6. An image display device comprising a polarizing plate described in claim 5.

7. An image display device comprising an antireflection film described in claim 1.

8. An antireflection film described in claim 1,
   wherein said inorganic fine particles having an adsorbed water amount of 6.1% by weight or less and a particle size of from 5 to 100 nm, are present in an amount of 30% by weight or more, based on a total amount of porous and hollow inorganic fine particles.

9. An antireflection film described in claim 1,
   wherein the low refractive index layer comprises said inorganic fine particles in an amount of 5 to 90% by weight of the low refractive index layer.

10. The antireflection film as described in claim 1, wherein the limit load after exposure to ozone of the antireflection film is about 1000 g.

* * * * *